(12) United States Patent
Aita et al.

(10) Patent No.: US 9,855,871 B2
(45) Date of Patent: Jan. 2, 2018

(54) VEHICLE SEAT

(71) Applicant: TS TECH CO., LTD., Saitama (JP)

(72) Inventors: Shinya Aita, Tochigi (JP); Hirotaka Takei, Tochigi (JP); Masahiko Yamamoto, Tochigi (JP); Shingo Kimata, Tochigi (JP); Shigekazu Otake, Tochigi (JP); Takahiro Mitsui, Tochigi (JP); Masashi Yamashita, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 15/108,006

(22) PCT Filed: Dec. 16, 2014

(86) PCT No.: PCT/JP2014/006274
§ 371 (c)(1),
(2) Date: Jun. 24, 2016

(87) PCT Pub. No.: WO2015/098042
PCT Pub. Date: Jul. 2, 2015

(65) Prior Publication Data
US 2016/0318426 A1   Nov. 3, 2016

(30) Foreign Application Priority Data

Dec. 27, 2013  (JP) ................................ 2013-271954
Dec. 27, 2013  (JP) ................................ 2013-271955
(Continued)

(51) Int. Cl.
*A47C 7/50*      (2006.01)
*A47C 20/00*    (2006.01)
(Continued)

(52) U.S. Cl.
CPC ........... *B60N 2/3075* (2013.01); *B60N 2/065* (2013.01); *B60N 2/0881* (2013.01);
(Continued)

(58) Field of Classification Search
CPC .... B60N 2/3013; B60N 2/3047; B60N 2/065; B60N 2/4495; B60N 2/0881;
(Continued)

(56) References Cited

U.S. PATENT DOCUMENTS

| 2,543 | A | * | 4/1842 | Bauder | ................. | A47C 7/506 |
| | | | | | | 297/423.22 |
| 161,887 | A | * | 4/1875 | Lambert | ................ | A47C 7/506 |
| | | | | | | 297/423.22 |

(Continued)

FOREIGN PATENT DOCUMENTS

| DE | 3409787 A1 | * | 10/1985 | ............. | A47C 7/506 |
| EP | 534908 A1 | * | 3/1993 | ............... | A47C 7/50 |

(Continued)

OTHER PUBLICATIONS

International Search Report PCT/JP2014/006274, dated Mar. 19, 2015 (4 pages).
Japanese Office Action dated Nov. 14, 2017.

*Primary Examiner* — Rodney B White
(74) *Attorney, Agent, or Firm* — Dority & Manning, P.A.

(57) ABSTRACT

A vehicle seat having a seat cushion and ottoman pillars attached to the seat cushion, the seat cushion can be formed in a compact manner. The vehicle seat (S) comprises a cushion frame (F1) including a pair of cushion side frames (85), a cushion front member (86) connecting front ends of the cushion side frames with each other and a cushion rear member (87). The cushion front member is provided with a pair of recesses (143) extending in a fore and aft direction, and a pair of pillar support portions (141) extending in the fore and aft direction are received in and bonded to the (Continued)

Figure 1:
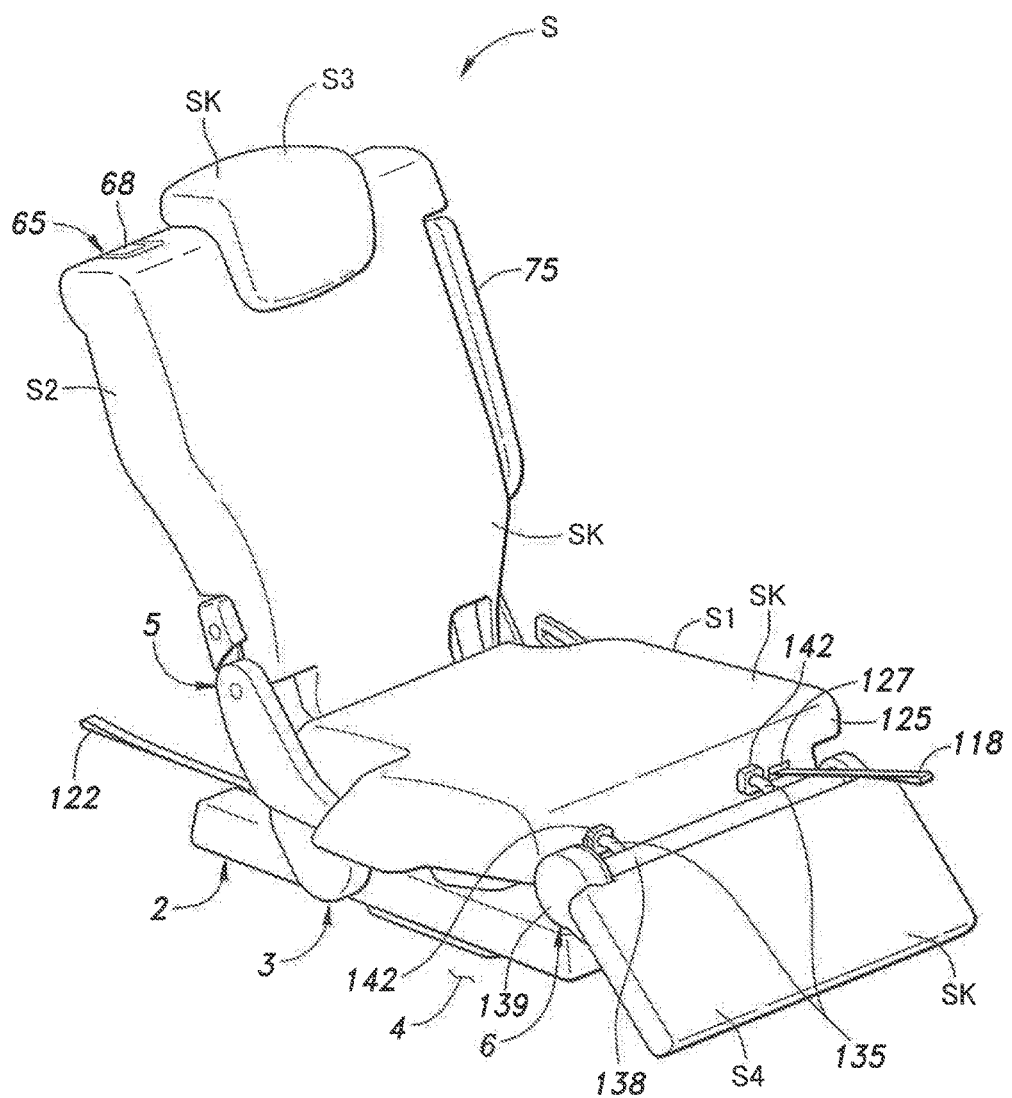

respective recesses, the ottoman including a pair of ottoman pillars (135) inserted into the respective pillar support portions.

18 Claims, 27 Drawing Sheets

(30) Foreign Application Priority Data

Dec. 27, 2013 (JP) .................................. 2013-272574
Dec. 27, 2013 (JP) .................................. 2013-272580

(51) Int. Cl.
| | |
|---|---|
| A47C 20/04 | (2006.01) |
| B60N 2/30 | (2006.01) |
| B60N 2/06 | (2006.01) |
| B60N 2/44 | (2006.01) |
| B60N 2/08 | (2006.01) |

(52) U.S. Cl.
CPC .......... B60N 2/3013 (2013.01); B60N 2/3034 (2013.01); B60N 2/3047 (2013.01); B60N 2/442 (2013.01); B60N 2/4495 (2013.01); B60N 2002/445 (2013.01)

(58) Field of Classification Search
CPC .... B60N 2/3075; B60N 2/3034; B60N 2/442; B60N 2002/445
USPC .............. 297/423.19, 423.2, 423.22, 423.23, 297/423.24
See application file for complete search history.

(56) References Cited

U.S. PATENT DOCUMENTS

| | | | | |
|---|---|---|---|---|
| 184,305 | A * | 11/1876 | Snyder .................. | A47C 1/025 297/423.2 X |
| 360,454 | A * | 4/1887 | Maguire ................ | A47C 1/026 297/423.24 X |
| 418,677 | A * | 1/1890 | Benesh .................. | A47C 9/002 297/423.19 X |
| 665,005 | A * | 1/1901 | Harmon ................. | A47C 3/027 297/423.2 X |
| 668,268 | A * | 2/1901 | Streit ...................... | A47C 7/506 297/423.22 X |
| RE11,906 | E * | 4/1901 | Harmon ................. | A47C 3/027 297/423.2 X |
| 806,678 | A * | 12/1905 | Kelly ...................... | A47C 7/506 297/423.2 |
| 822,163 | A * | 5/1906 | Tarwater et al. ...... | B60N 2/203 297/423.2 X |
| 917,184 | A * | 4/1909 | Tate ........................ | A47C 7/506 297/423.2 |
| 961,715 | A * | 6/1910 | Christiansen .......... | A47C 7/506 297/423.24 X |
| 975,188 | A * | 11/1910 | Williams ................ | A47C 7/506 297/423.2 |
| 1,125,167 | A * | 1/1915 | Pepper ................... | A47C 1/03255 297/423.2 X |
| 1,151,099 | A * | 8/1915 | Greilick ................. | A47C 1/03255 297/423.2 X |
| 1,211,909 | A * | 1/1917 | Battaglia ................ | A47C 3/029 297/423.2 X |
| 1,212,808 | A * | 1/1917 | Pepper ................... | A47C 1/03255 297/423.2 X |
| 1,435,744 | A * | 11/1922 | Santaniello ............ | A47L 23/16 297/423.2 X |
| 1,984,281 | A * | 12/1934 | Poggendorf ........... | A47C 1/032 297/423.2 X |
| 2,127,020 | A * | 8/1938 | Carlson .................. | A47K 13/06 297/423.19 |
| D152,200 | S * | 12/1948 | Luketa .................... | 297/423.19 |
| 2,458,185 | A * | 1/1949 | McDonald .............. | B60N 2/62 297/423.22 |
| 2,480,300 | A * | 8/1949 | Luketa ................... | A47C 1/037 297/423.2 X |
| 2,484,803 | A * | 10/1949 | Bell ...................... | B60N 2/4495 297/423.21 |
| 2,499,884 | A * | 3/1950 | Singleton ............... | A47K 13/06 297/423.22 X |
| 2,670,785 | A * | 3/1954 | Machet ................... | A47C 17/16 297/423.19 X |
| 4,564,238 | A * | 1/1986 | Wolpert, Jr. ............ | A47C 7/52 297/423.19 |
| 4,715,654 | A * | 12/1987 | Laskowitz ............ | A47C 1/0248 297/423.2 X |
| 5,507,562 | A * | 4/1996 | Wieland ................. | A47C 7/506 297/423.2 |
| 6,086,157 | A * | 7/2000 | Toso ...................... | A47C 9/005 297/423.19 X |
| 6,454,353 | B1 * | 9/2002 | Knaus ................... | A47C 31/02 297/423.28 X |
| 7,108,322 | B2 * | 9/2006 | Erker .................... | B60N 2/4495 297/423.2 X |
| 8,646,842 | B2 * | 2/2014 | Barfuss ................... | A47C 1/06 297/423.2 X |
| 2013/0099543 | A1 * | 4/2013 | An ......................... | A47C 7/506 297/423.22 X |
| 2015/0359343 | A1 * | 12/2015 | Wang .................... | A47C 7/506 297/423.2 |

FOREIGN PATENT DOCUMENTS

| | | |
|---|---|---|
| JP | S6036339 | 3/1985 |
| JP | H0523959 | 3/1993 |
| JP | 2002119376 | 4/2002 |
| JP | 2006026011 | 2/2006 |
| JP | 2007261350 | 10/2007 |
| JP | 2009067309 | 4/2009 |
| JP | 2012121465 | 6/2012 |

* cited by examiner

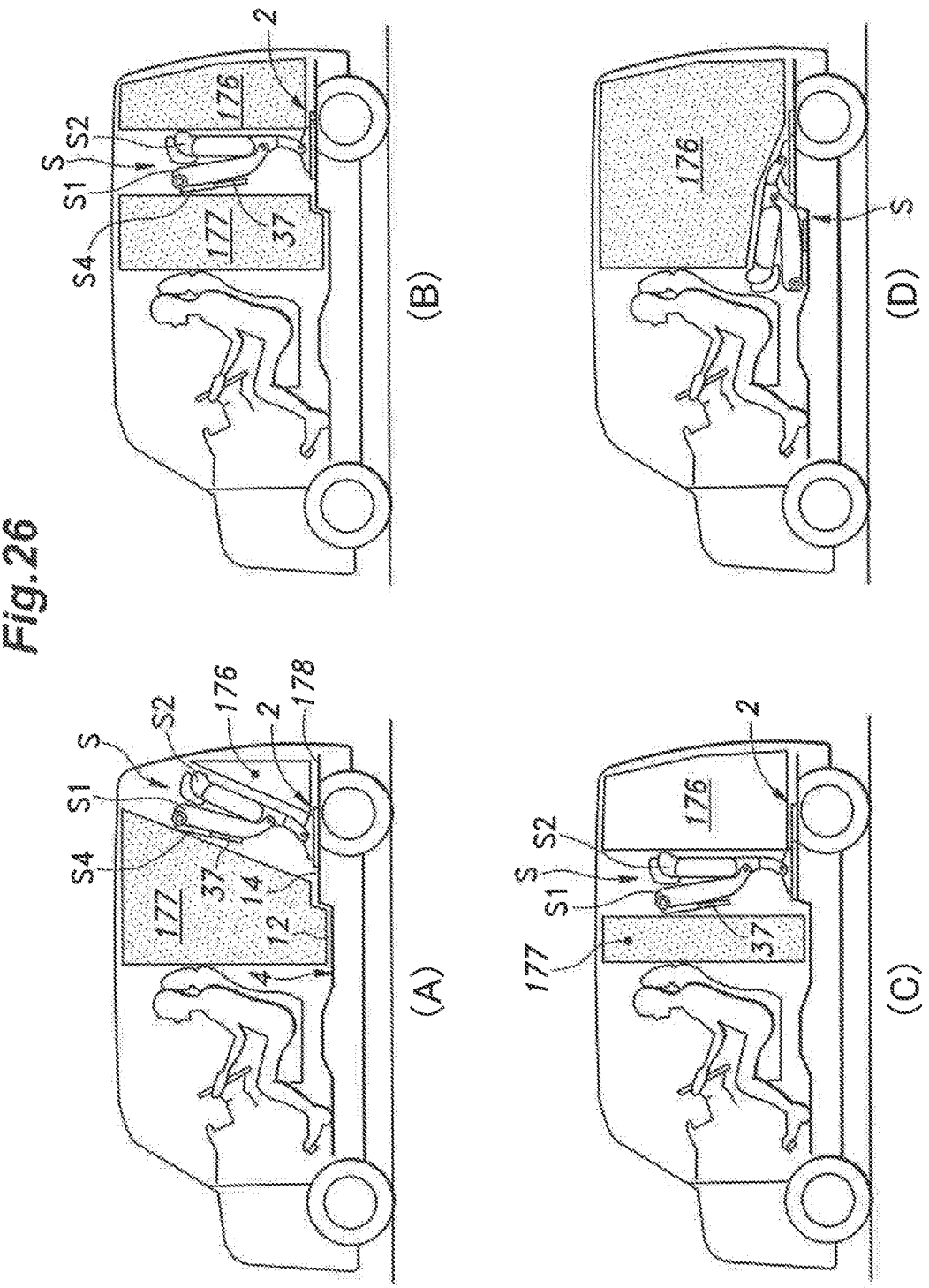

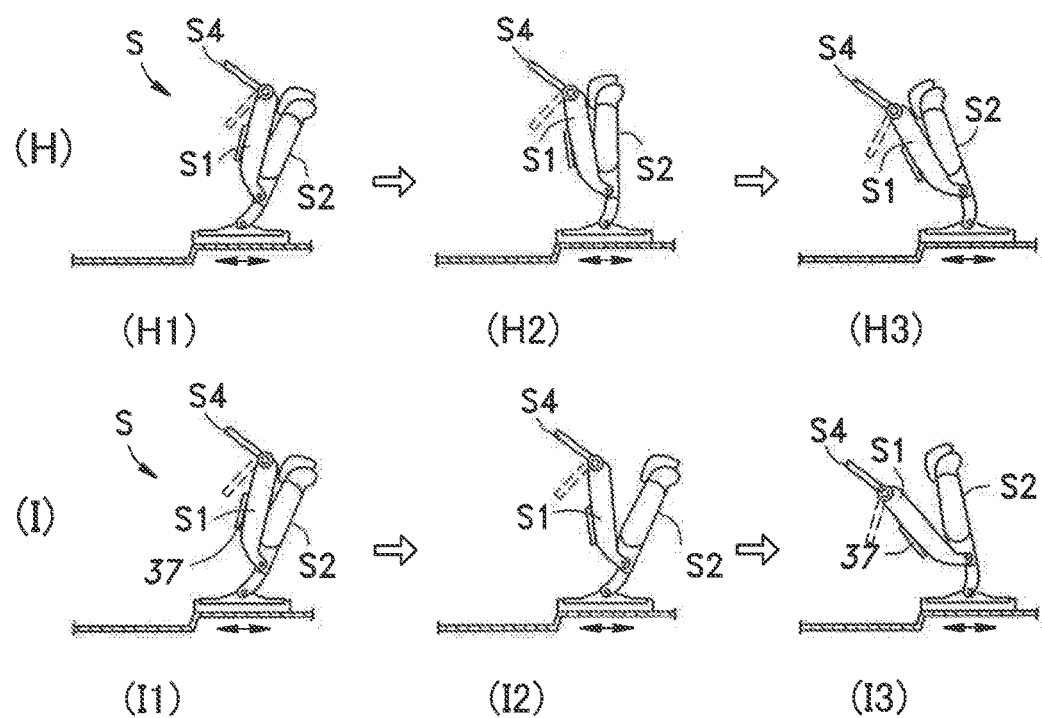

VEHICLE SEAT

TECHNICAL FIELD

The present invention relates to a vehicle seat configured to be installed on a vehicle such as a motor vehicle, and in particular to a vehicle seat fitted with an ottoman.

BACKGROUND ART

It is known in a vehicle seat for an automobile to detachably attach an ottoman to a front part of a seat cushion. See Patent Document 1, for instance. This ottoman includes a pair of ottoman pillars provided on either side thereof, and a pair of tubular pillar support portions are fixedly attached to the seat frame of the seat cushion to receive the respective ottoman pillars so that the ottoman may be supported by the seat cushion. By adjusting the length of the ottoman pillars received in the corresponding pillar support portions, the position of the ottoman relative to the seat cushion can be adjusted.

PRIOR ART DOCUMENT(S)

Patent Documents(s)

Patent Document 1: JP2002-119376A

SUMMARY OF THE INVENTION

Task to be Accomplished by the Invention

According to this ottoman support structure, the pillar support portions are required to be attached to the frame of the seat cushion so that the thickness and the size of the overall frame structure including the pillar support portions and the seat cushion frame become undesirably great. In particular, when the pillar support portions are passed above or below the seat cushion frame, the vertical dimension or the thickness of the overall frame structure tends to be unacceptably great.

The present invention was made in view such problems of the prior art, and has a primary object to provide a vehicle seat including a pair of ottoman pillars attached to the seat cushion frame thereof which allows the seat cushion to be compact.

Means for Accomplishing the Task

To achieve such an object, the present invention provides a vehicle seat comprising a seat hack (S2), a seat cushion (S1) and an ottoman (S4) fitted to the seat cushion, wherein: the seat cushion is provided with a cushion frame (F1) including a pair of cushion side frames (85) extending along either side of the seat cushion and pivotally attached to the seat hack at base ends thereof, a cushion front member (86) connecting front ends of the cushion side frames with each other and a cushion rear member (87) connecting rear parts of the cushion side frames with each other; and wherein the cushion front member is provided with a pair of recesses (143) extending in a fore and aft direction, and a pair of pillar support portions (141) each consisting of a tubular member extending in the fore and aft direction are received in the respective recesses, the ottoman including a pair of ottoman pillars inserted into the respective pillar support portions.

According to this arrangement, each pillar support portion crosses the cushion front member in such a manner that the pillar support portion fits into the corresponding recess. Therefore, the vertical dimension (thickness) of this part is minimized, and the thickness of the seat cushion can be reduced.

In this invention, preferably, the recesses are formed on a lower side of the cushion front member, and upper parts of the pillar support portions are received in and connected to the respective recesses.

According to this arrangement, because the pillar support portions cross under the cushion front member, the legs of the vehicle occupant seated in the seat are supported by the cushion front member via the seat cushion in a comfortable manner. If the pillar support portions were provided on top of the cushion front member, the vehicle occupant would sense the irregular surface caused by the presence of the pillar support portions, and could experience some discomfort.

In this invention, the cushion front member may comprise a pipe having a circular cross section, and define a planar surface in each recess.

Thereby, the bonding of the pillar support portions onto the recesses is facilitated.

In this invention, each recess is preferably complementary in shape to the upper part of the corresponding pillar support portion.

Thereby, the upper part of each pillar support portion can be brought into close contact with the corresponding recess, and a surface contact with a large surface area can be achieved so that a wide area is ensured for welding. Therefore, the stiffness of the bonded parts between each pillar support portion and the corresponding part of the cushion front member can be enhanced.

In this invention, preferably, the ottoman includes a base member (130) extending laterally, base ends of the ottoman pillars being connected to the base member in such a manner that the ottoman pillars curve downward toward front ends thereof, and connected to the base member at front sides of vertically extending sections of the base ends thereof when the seat cushion is in a seating position.

According to this arrangement, the contact area between the base member and each ottoman pillar is maximized so that a large area is available for welding. Thereby, the stiffness of the bonded part between the base member and each ottoman pillar can be enhanced. Further, because the ottoman pillars are not passed above the base member, the legs of the vehicle occupant placed on the ottoman is prevented from touching the ottoman pillars. By properly selecting the curved shape of the front ends of the ottoman pillars and the bonding positions of the front ends of the ottoman pillars onto the base member, the vertical position of the base member (the ottoman) can be suitably determined with ease.

In a preferred embodiment of this invention, the seat back and the seat cushion are attached to a floor via a slide mechanism (2), and the ottoman is fitted to the seat cushion so as to be selectively deployed in a forward direction from the seat cushion. Furthermore, the slide mechanism is provided with a lock mechanism (17) for prohibiting a slide movement of the seat relative to the floor, and an operation member (31, 118) for releasing the lock mechanism by being pulled is provided with a free end (118) projecting from a front end surface (125) of the seat cushion to an upper or a side position of the ottoman.

According to this arrangement, in a vehicle seat, the ottoman and the operation member can be arranged on the front end surface of the seat cushion without interfering with each other. The operation member may project from the seat cushion so that the lock mechanism may be released simply by pulled the operation member. The free end of the operation member projects above or on either side of the ottoman so that the vehicle occupant is enabled to grip the operation member easily without being hampered by the ottoman. As the operation member may be pulled by the vehicle occupant from a position displaced from the ottoman, the ottoman does not obstruct the handling of the operation member.

In this invention, preferably, the ottoman includes a pair of connecting members (135) attached to the cushion frame and a main body (131, 132, 134, P4) supported by the connecting members in a vertically rotatable manner, and the free end of the operation member is positioned in a higher position than the main body when the main body is in an upwardly rotated deployed position.

According to this arrangement, because the operation member is located above the main body of the ottoman even when the rotatably supported main body of the ottoman is in the uppermost deployed position, the operation member is always located above the ottoman main body without regard to the anular position of the ottoman main body. Therefore, the vehicle occupant is able to operate the operation member at all times without being obstructed by the ottoman.

In this invention, preferably, the free end of the operation member is passed through a pulling opening (127) in the front end surface of the seat cushion, and projects out of the pulling opening, the pulling opening being located higher than the main body of the ottoman.

The pulling opening is thus located higher than the main body of the ottoman so that the operation member projecting from the pulling opening out of the seat cushion can be made to project prominently above the main body of the ottoman. Also, even when the operation member is pulled in the horizontal direction, the operation member does not interfere with the main body of the ottoman, and the angular range of the direction from which the operation member may be pulled can be widened.

In this invention, preferably, the vehicle seat is a rear seat of a motor vehicle, and the pulling opening is located on an inboard side of the front surface of the seat cushion.

Thereby, the operation member is located on the side of the seat which is near the adjoining seat which may be adjoining the subject seat either from the right or from the left so that the vehicle occupant seated in the adjoining seat can easily operate the operation member. According to this seat, because the operation member is located on the inboard side of the seat, the vehicle occupant seated in the driver's seat or in the assistant's seat can easily operate the operation member. Furthermore, because the operation member is positioned on the side of seat remote from the door opening, the operation member is prevented from interfering with the vehicle occupant getting into or getting off the vehicle, and is therefore prevented from being inadvertently operated.

According to a preferred embodiment of the present invention, the seat back is attached to a seat base (26) provided on the floor in a rotatable manner, and the seat cushion is attached to the seat back in a rotatable manner so that the seat cushion performs a dive down action by moving in an obliquely downward and forward direction toward the floor (4) from a position suitable for seating in response to a forward rotating movement of the seat back. Furthermore, when the seat cushion is in the position suitable for seating, the ottoman can take a first retracted position where the ottoman droops down (depends) from a front part of the seat cushion, and a deployed position where the ottoman extends forward from the front part of the seat cushion, the ottoman being enabled to take a second retracted position where the ottoman is not interfered by the floor when the seat cushion is caused to perform the dive down action from the first retracted position.

According to this arrangement, in the vehicle seat capable of a dive down action and having an ottoman attached to the seat cushion, the seat may be put into the dive down action while the ottoman is placed in the deployed position with a highly simple operation. Because during the dive down action, the ottoman originally in the first retracted position is put into the second retracted position that does not obstruct the dive down action. Therefore, the dive down action may be carried out without requiring the ottoman to be put into the second retracted position in advance so that the operation of putting the seat into the dive down condition is facilitated.

In this invention, preferably, the ottoman is provided on the seat cushion in a rotatable manner around a laterally extending axial line, and is configured to rotate toward the second retracted position by a force applied from the floor when the ottoman in the second retracted position abuts the floor as a result of the dive down action.

According to this arrangement, as there is no need to provide a mechanism for displacing the ottoman independent from the dive down action, the seat can be formed as a simple and economic unit.

In the present invention, the second retracted position may be positioned so as to be closer to a bottom side of the seat cushion than the first retracted position.

According to this arrangement, it becomes easier to rotate the ottoman in the first retracted position to the second retracted position with the force received from the floor. Therefore, the angular position of the ottoman in the first retracted position may be brought to a vertical position or a rearwardly tilted position so that the vehicle occupant may be more free from obstruction.

In this invention, a biasing device (156) may urge the ottoman toward the second retracted position when the ottoman is beyond a prescribed angular position toward the second retracted position.

Thereby, when returning the seat from the dive down condition to the normal use condition, the ottoman may be maintained in the second retracted position.

In this invention, the ottoman may be configured to rotate to the second retracted position while sliding over the floor when the dive down action is performed with the ottoman placed in the first retracted position.

Thereby, the seat in which the ottoman rotates to the second retracted position facing the bottom side of the seat cushion while sliding over the floor can be realized by using a highly simple structure.

In this invention, a projection (173) may be formed on a free end side of a leg support surface (171) of the ottoman.

According to this arrangement, when the seat is in the dive down condition, the support surface of the ottoman, except for the projection on the support surface, does not touch the floor so that the support surface other than the projection is prevented from being smeared by foreign matters that may be deposited on the floor.

In this invention, preferably, the seat cushion is attached to the seat back so as to be rotatable between a seating position and a tip up position where the seat cushion is tilted upward toward the seat back, and the vehicle seat further comprises a tip up mechanism (5) for retaining the seat cushion at least in the tip up position and a seat back angle adjustment mechanism (3) for selectively setting the seat back at least in a rearward inclined position suitable for seating and a forwardly inclined position.

According to this arrangement, the vehicle seat allows luggage to be stowed in a space created by swinging up the seat cushion in a convenient way. The angular position of the seat cushion can be adjusted by using the seat back angle adjustment mechanism while the seat cushion is held in the tip up position by using the tip up mechanism so that the luggage stowed in the front space of the seat can be held with the seat cushion from behind, and the luggage can be effectively secured in this position.

In the present invention, preferably, the seat cushion is attached to the seat back so as to be rotatable between a seating position and a tip up position where the seat cushion is tilted upward toward the seat back, and the vehicle seat further comprises a tip up mechanism for retaining the seat cushion at least in the tip up position, the tip up mechanism being configured to retain the seat cushion at least in an angular position intermediate between the seating position and the tip up position (by providing two or more of the engagement notches 101).

According to this arrangement, the seat cushion can be retained at the intermediate angular position while the seat cushion is swung upward to an angular position different from the tip up position so that the luggage stowed in the front space can be held with the bottom surface of the seat cushion from behind, and the luggage can be effectively secured in this position.

In this invention, the seat back angle adjustment mechanism may be configured to retain the seat back in an upright position when the seat cushion is in the tip up position.

According to this arrangement, a space is created behind the seat that has a vertical front wall surface defined by the back side of the seat back. Therefore, a luggage space having a convenient height can be created behind the seat.

In this invention, the ottoman may be provided on the seat cushion so as to be deployable in a forward direction from a retracted position along a bottom surface of the seat cushion.

According to this arrangement, the luggage can be held by the leg support surface of the ottoman so that the luggage is protected from damage.

In this invention, projections (172) may be formed along either edge of a leg support surface (171) of the ottoman from a rotational axial line side to a free end side thereof.

According to this arrangement, the luggage may be held from either side by using the projections of the ottoman.

Effect of the Invention

According to such arrangements, in a vehicle seat having a seat cushion and ottoman pillars attached to the seat cushion, the seat cushion can be formed in a compact manner.

BRIEF DESCRIPTION OF THE DRAWING(S)

Figure 2:
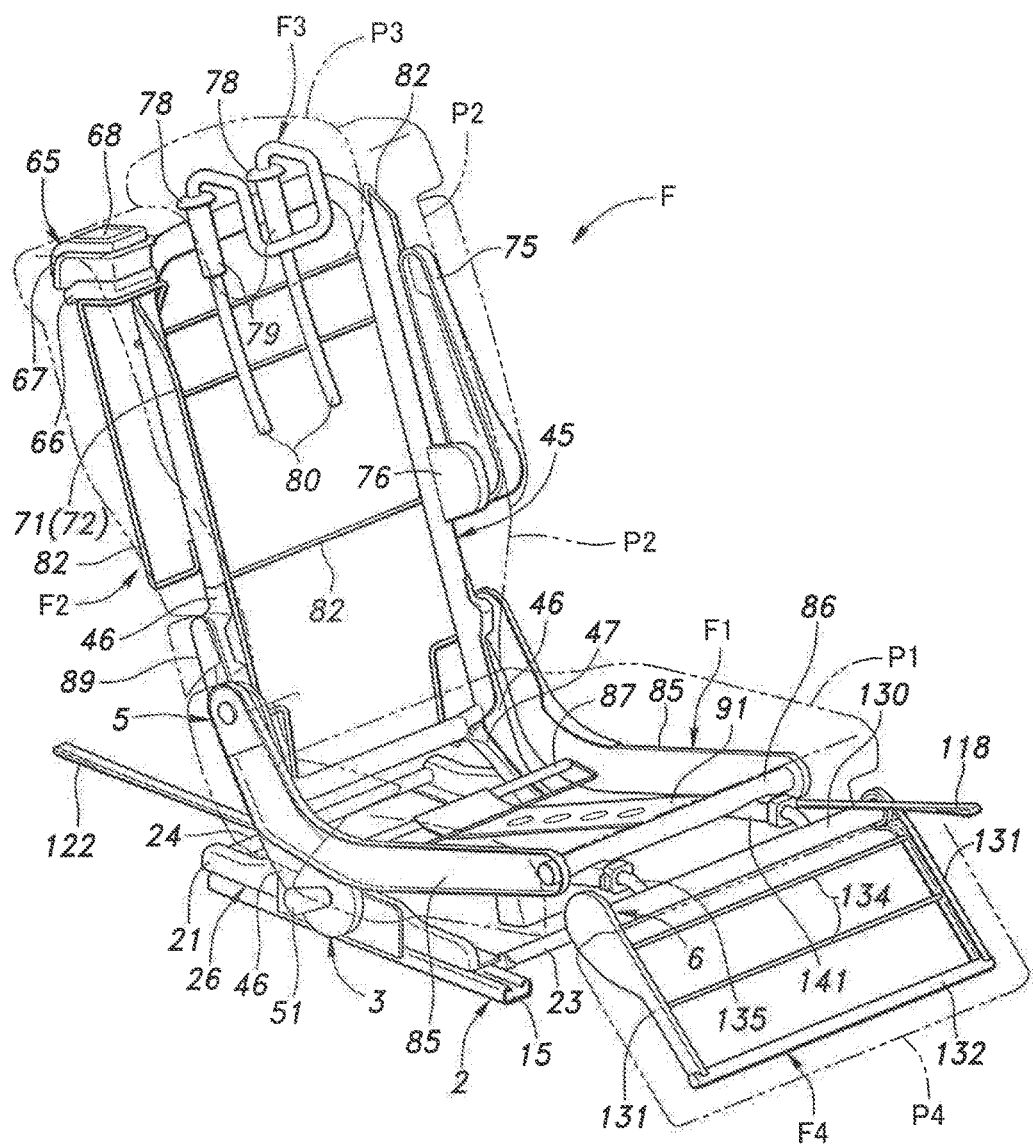
Figure 3:
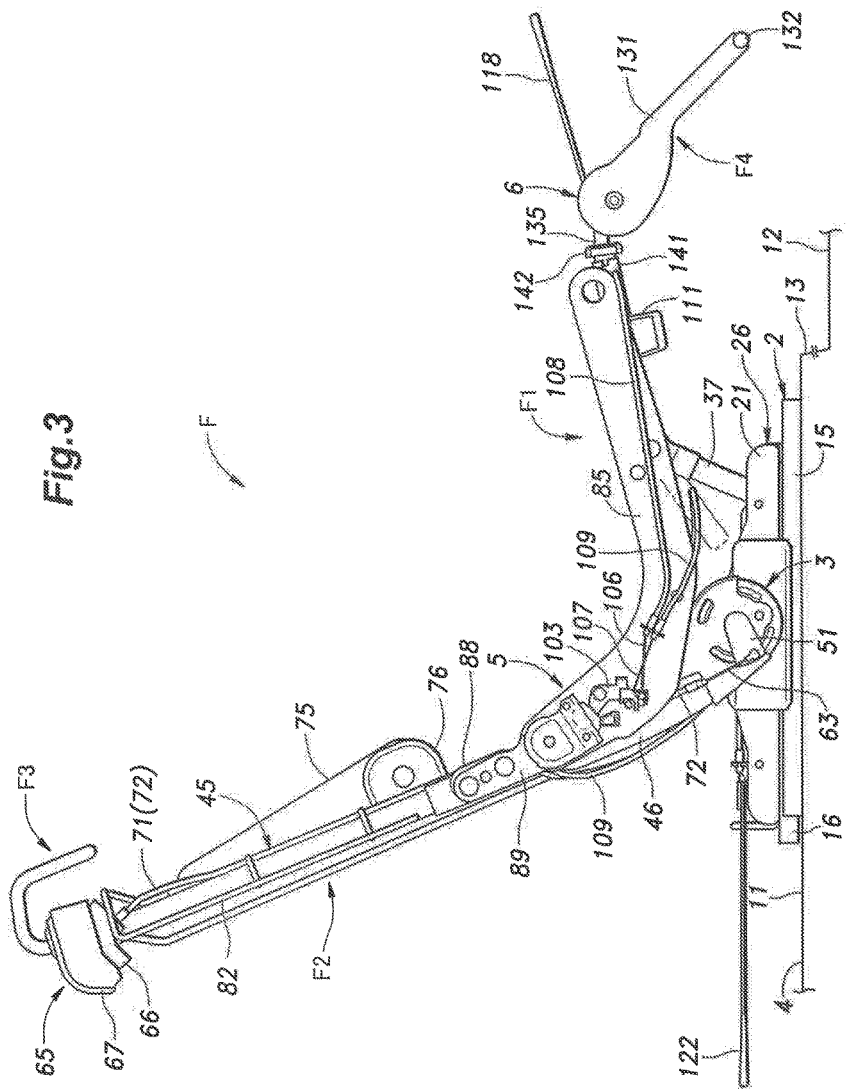
Figure 4:
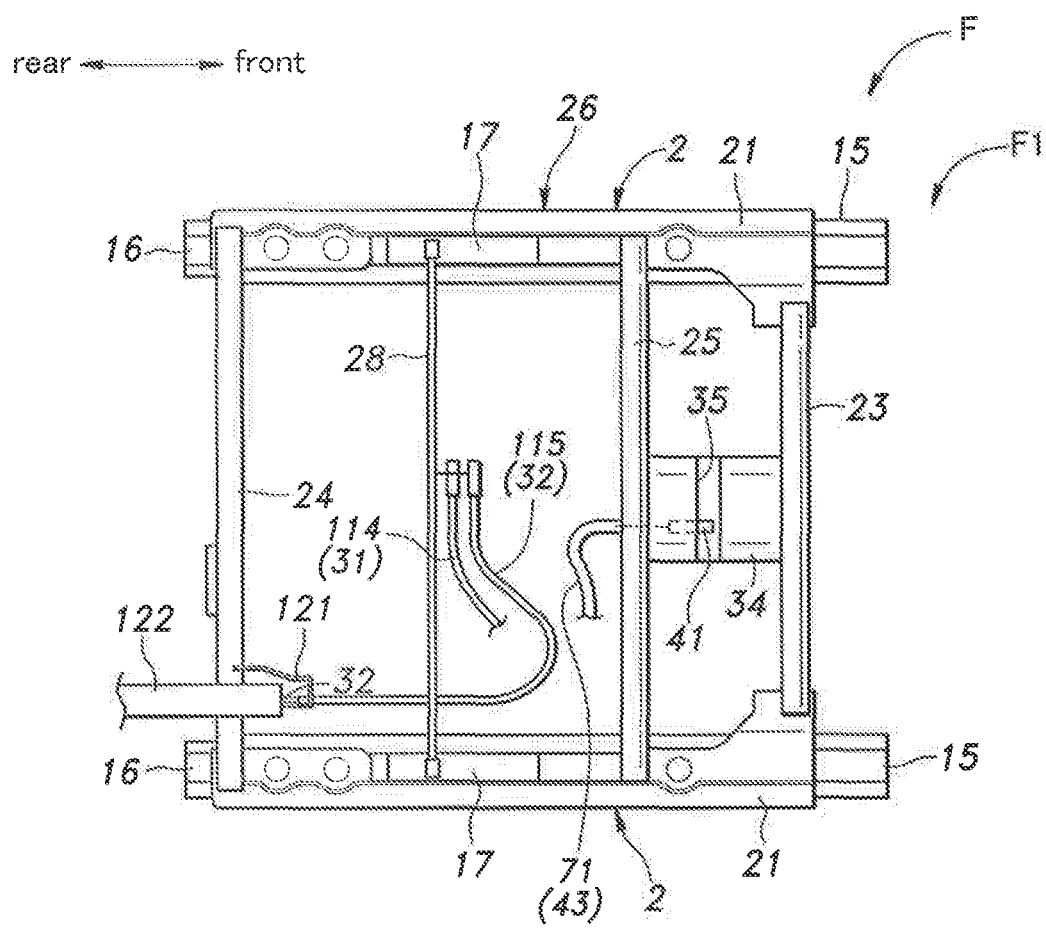
Figure 5:
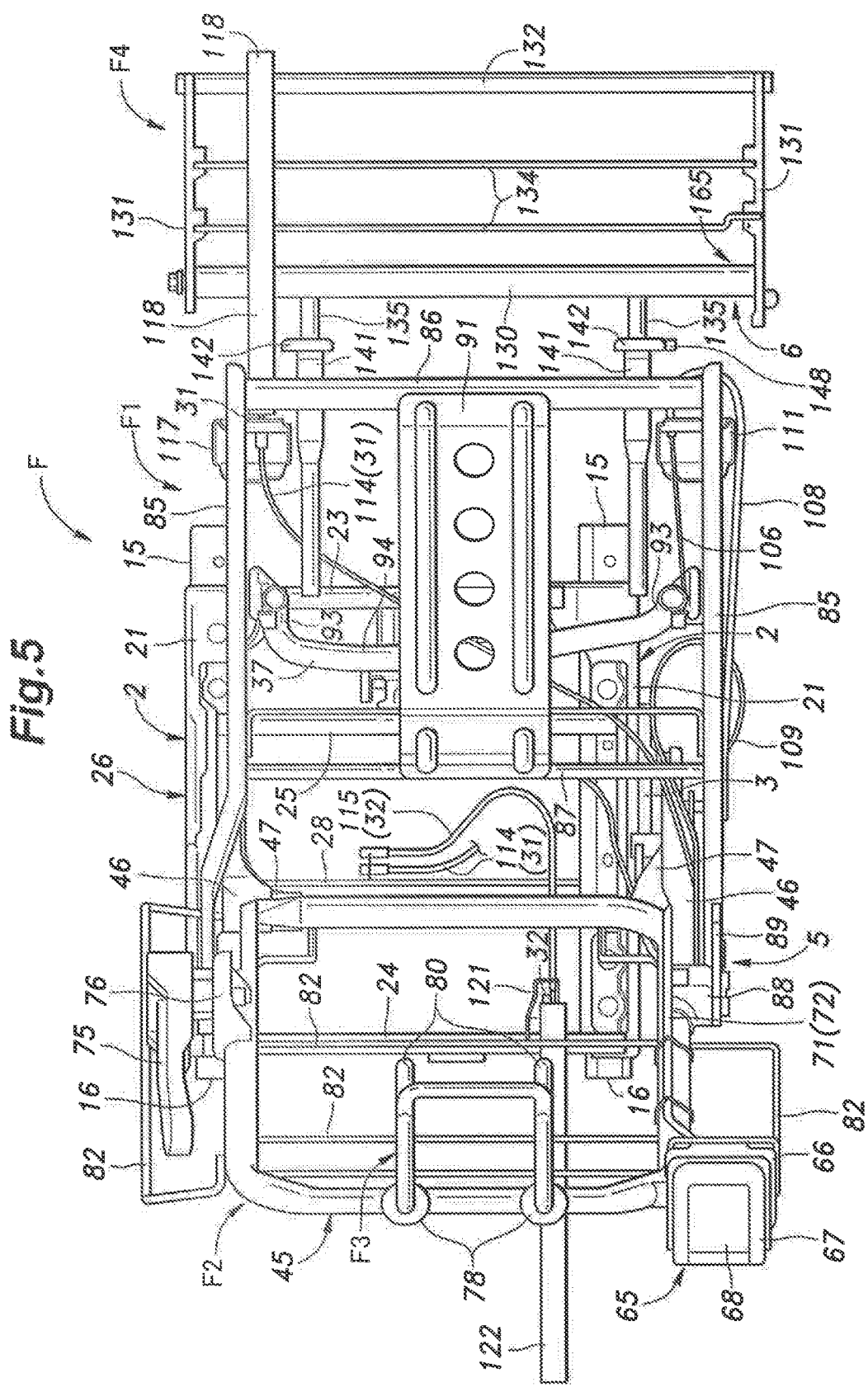
Figure 6:
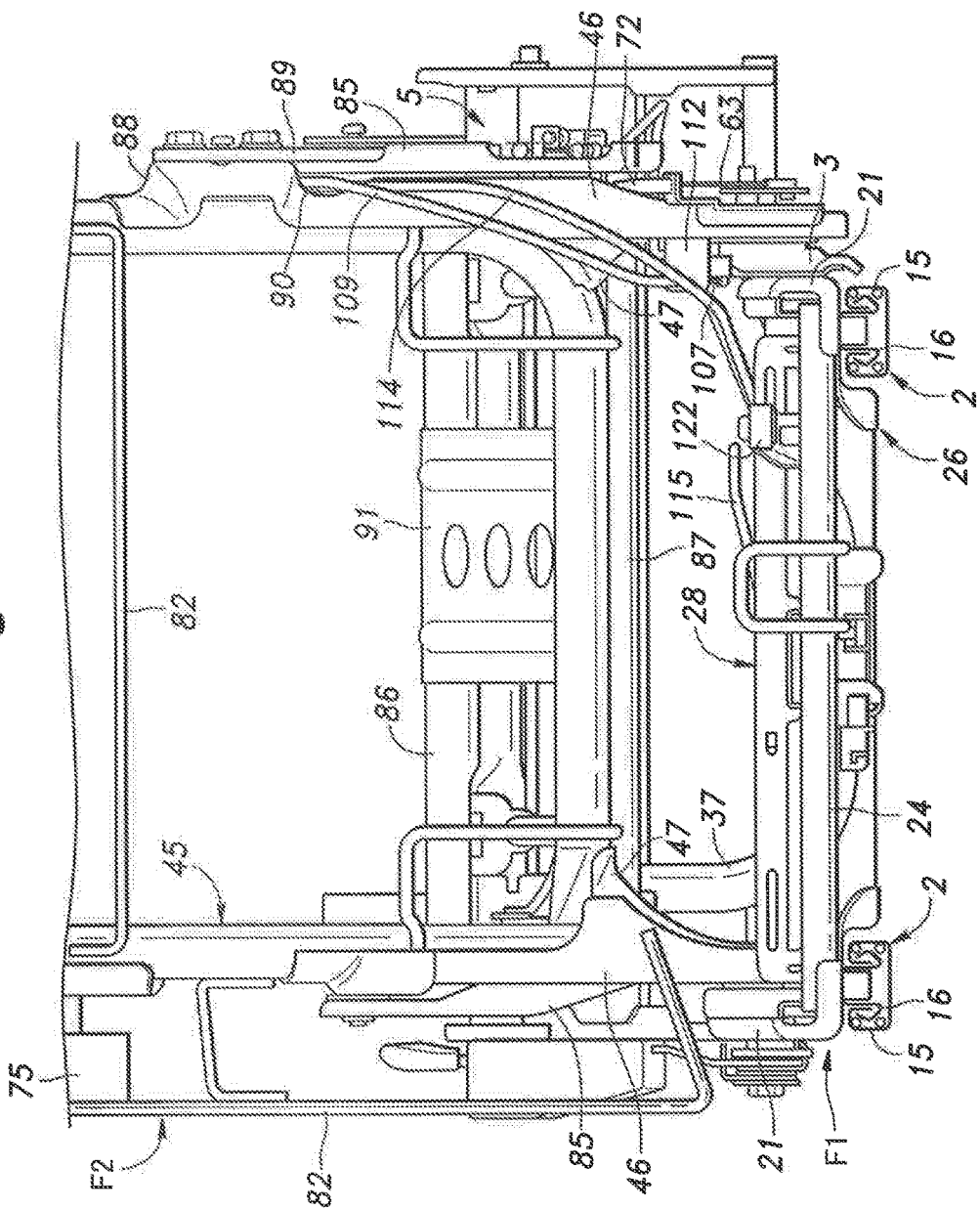
Figure 7:
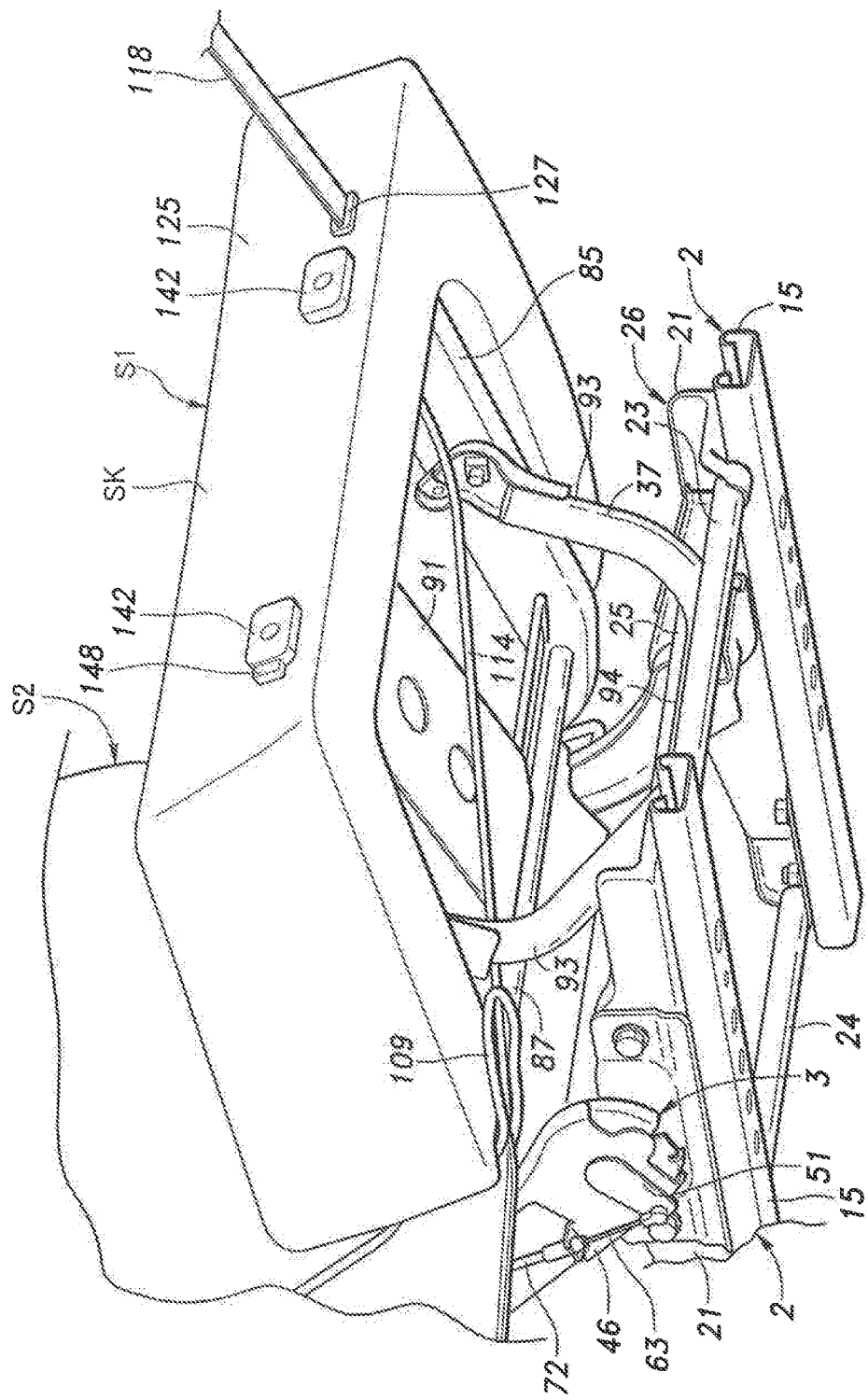
Figure 8:
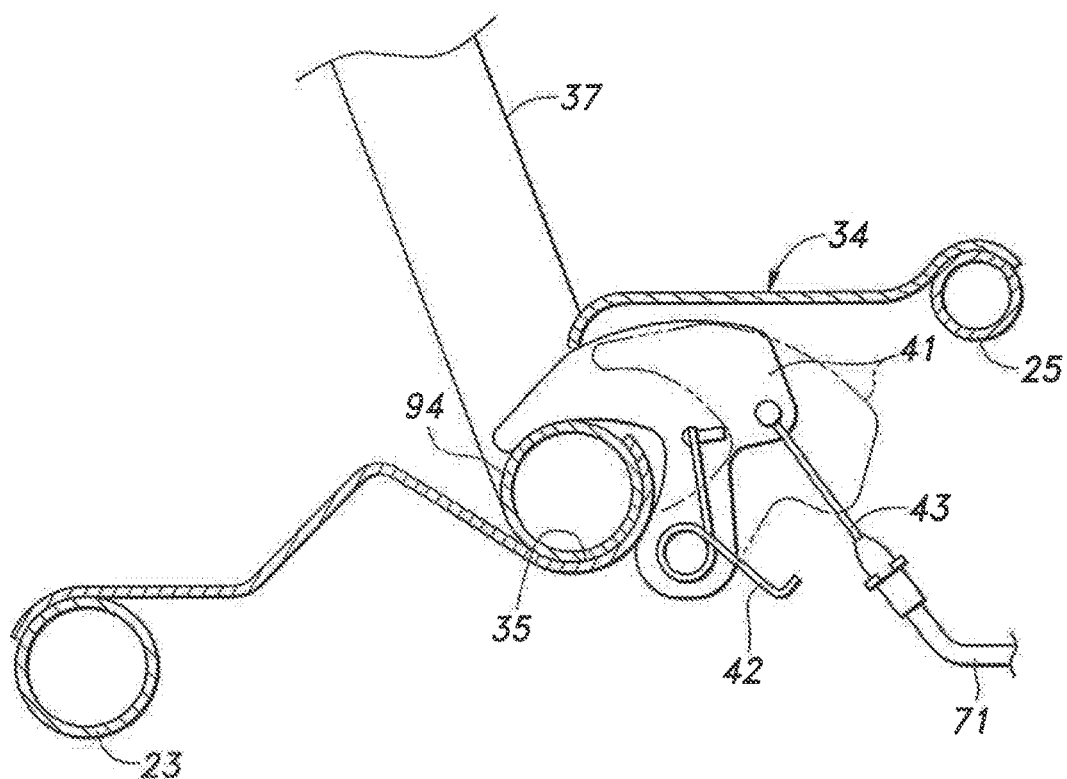
Figure 9:
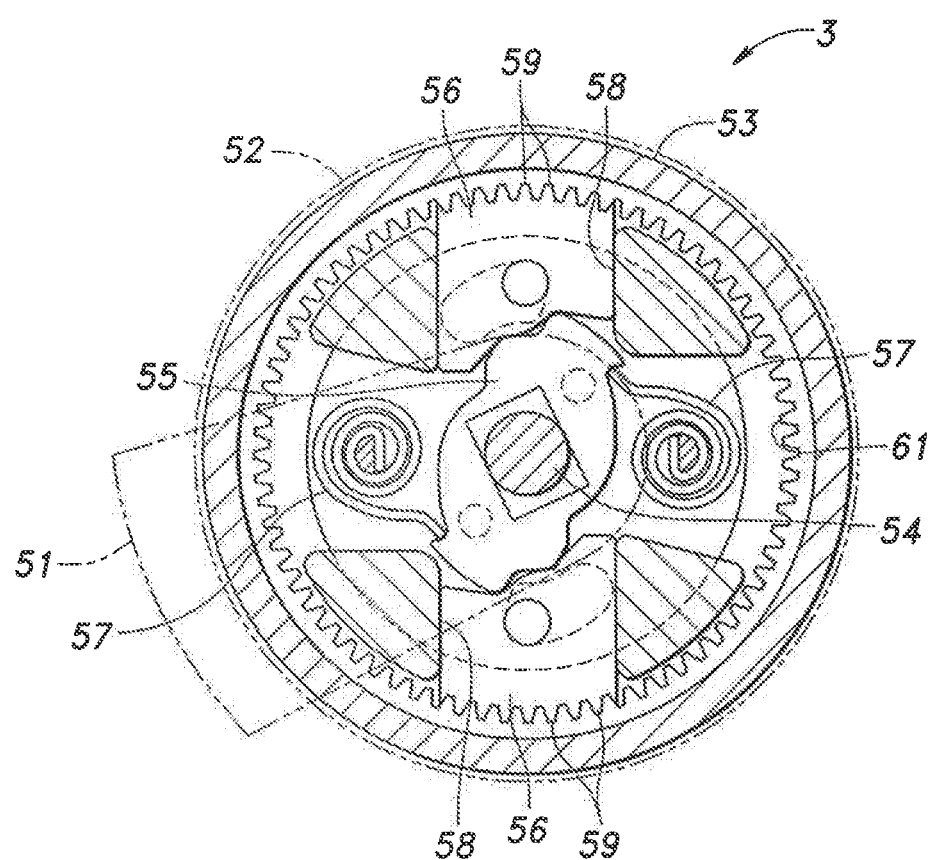
Figure 10:
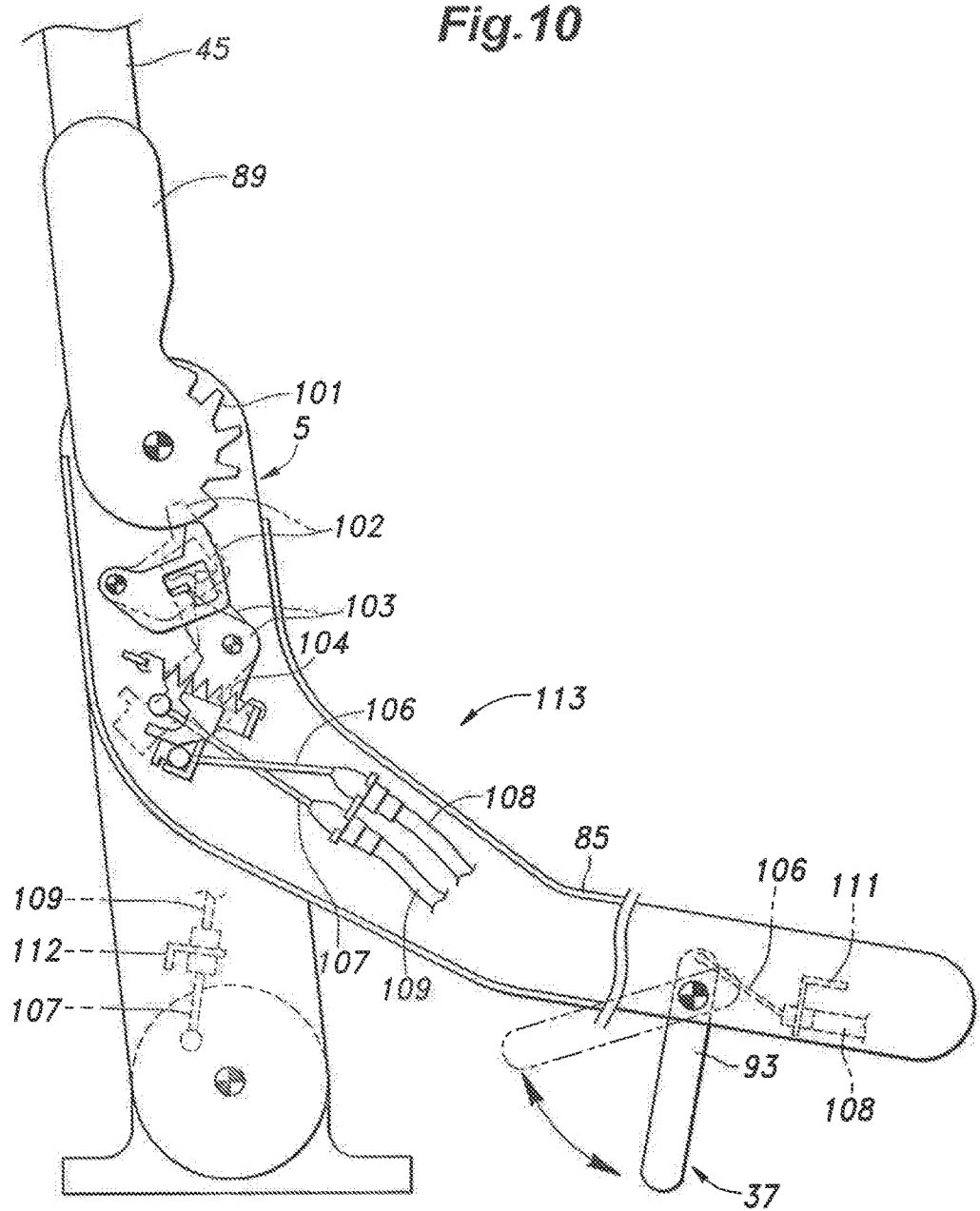
Figure 11:
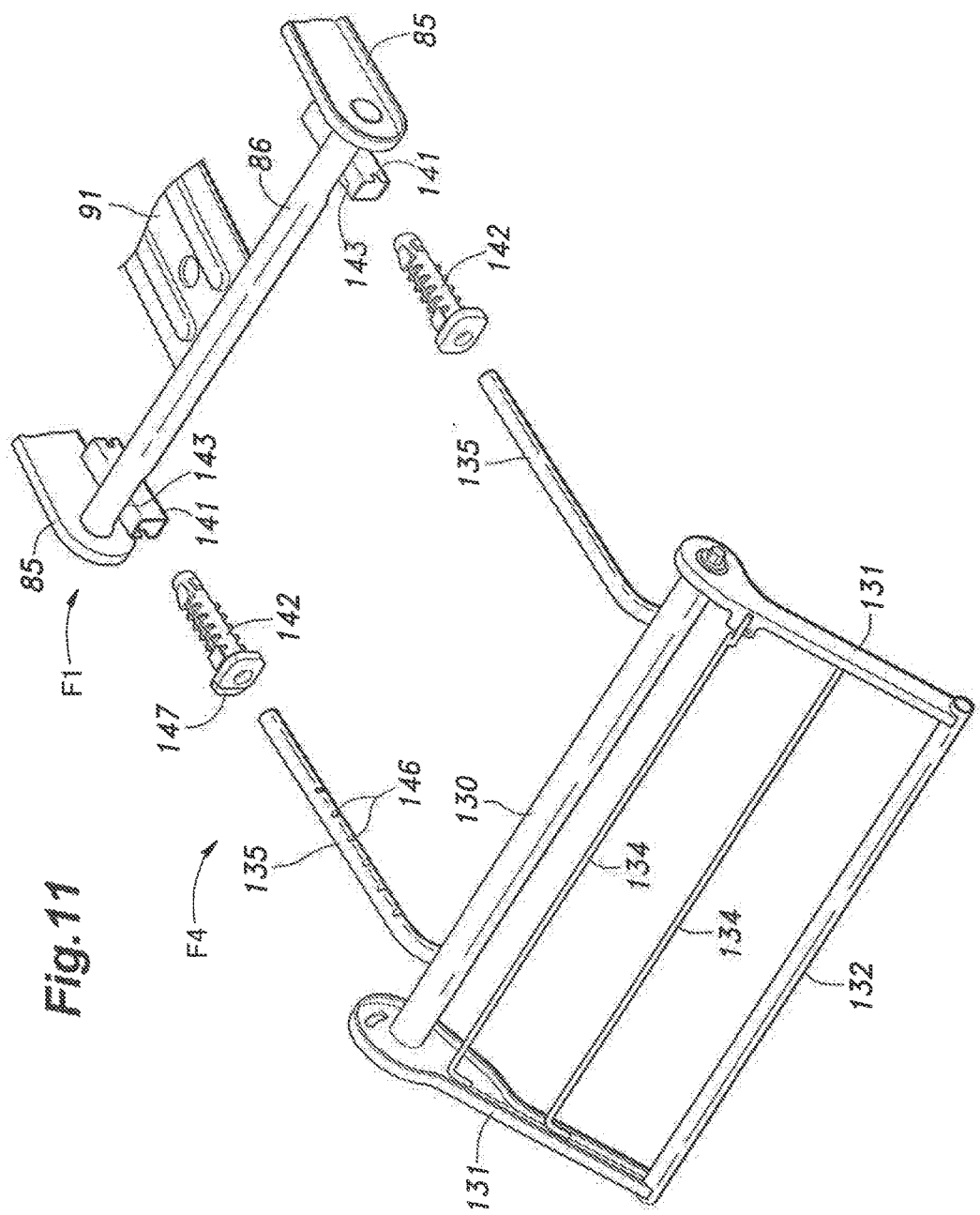
Figure 12:
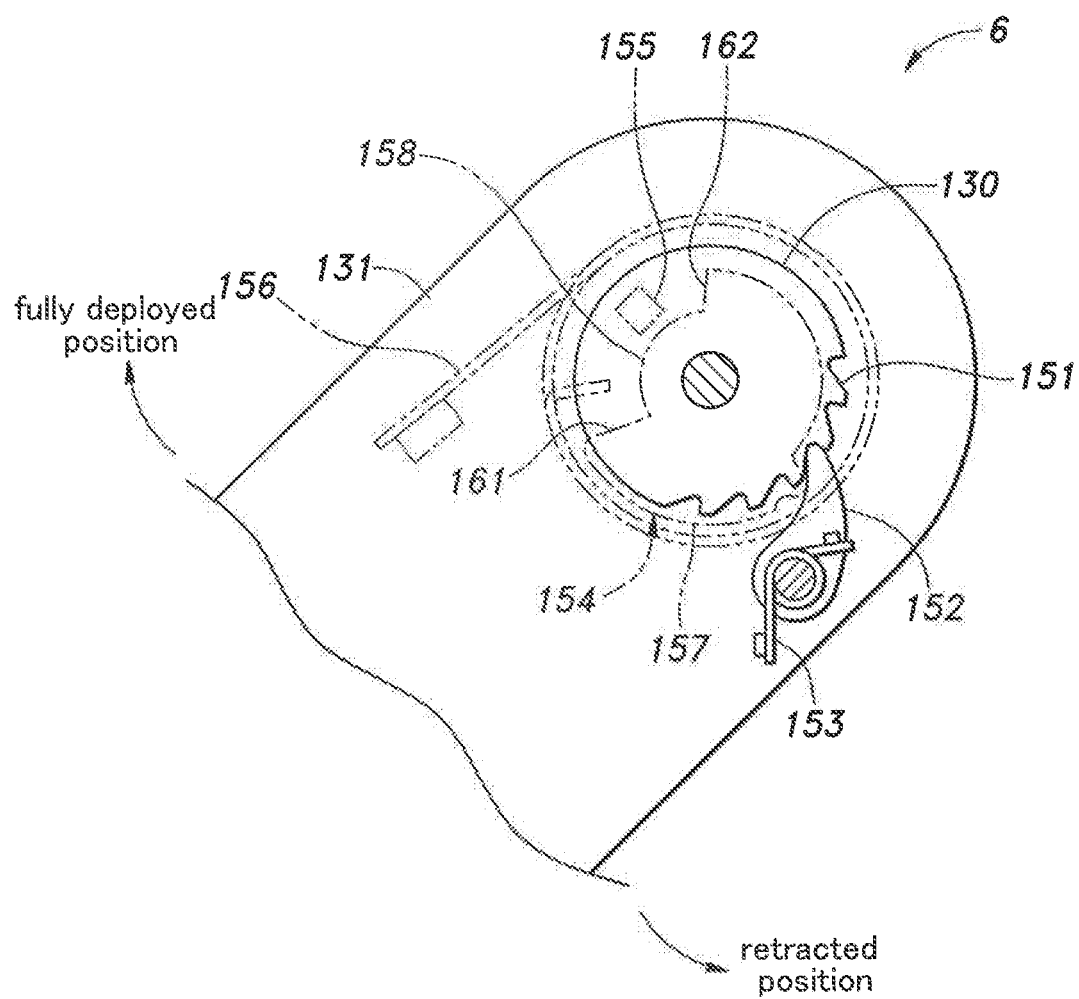
Figure 13:
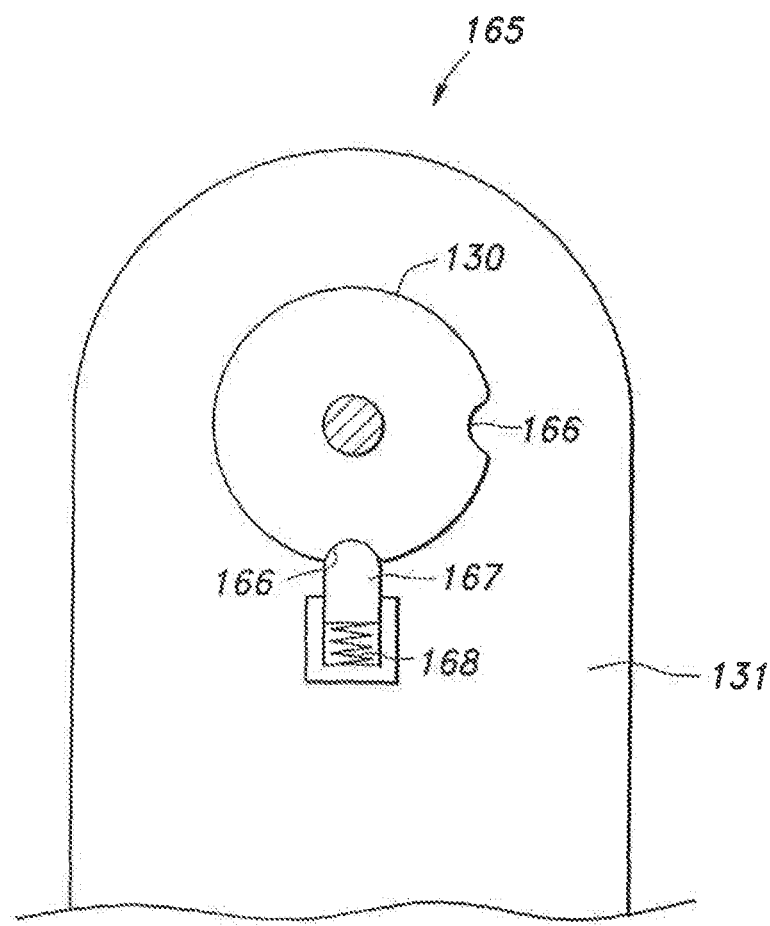
Figure 14:
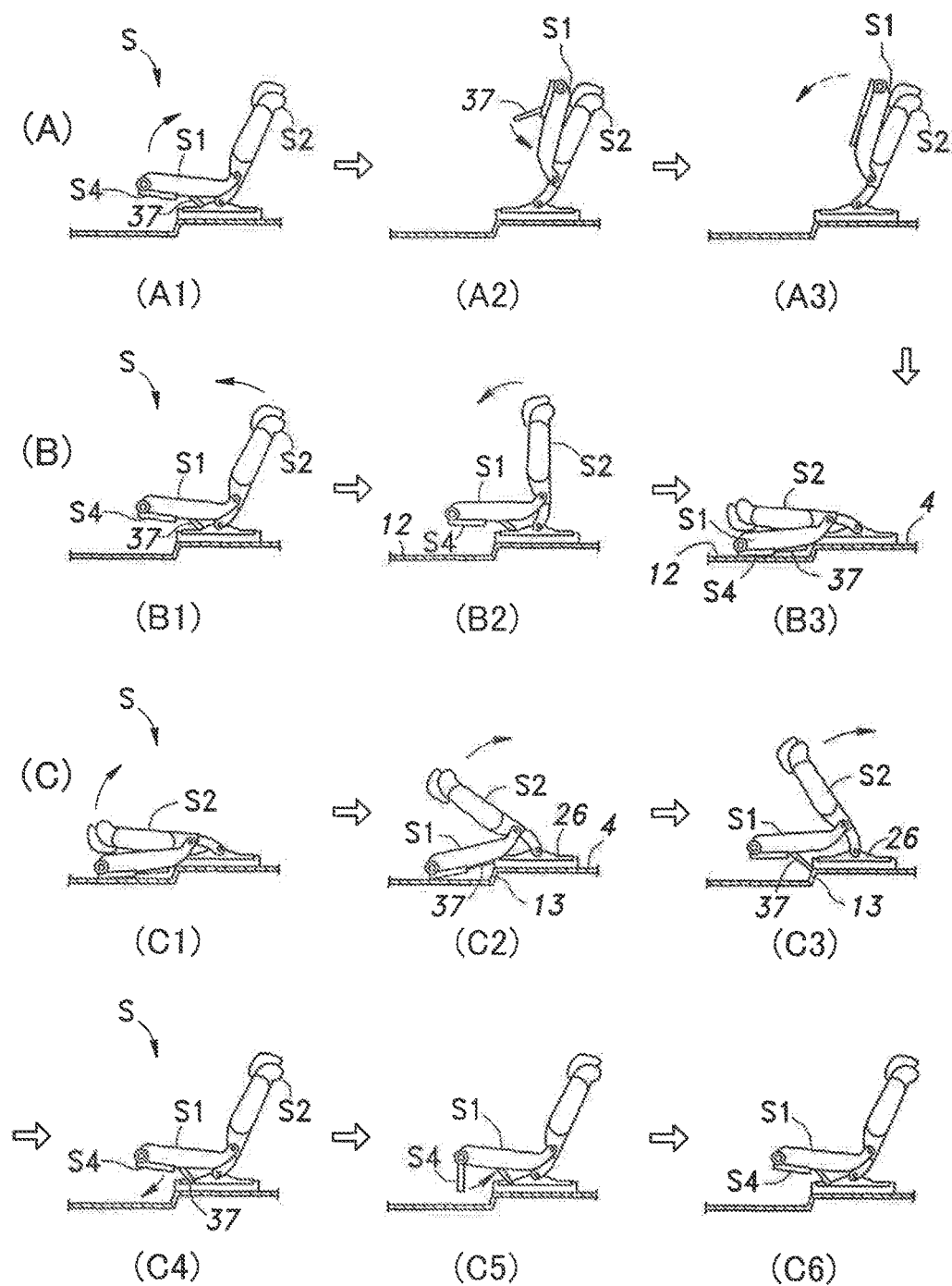
Figure 15:
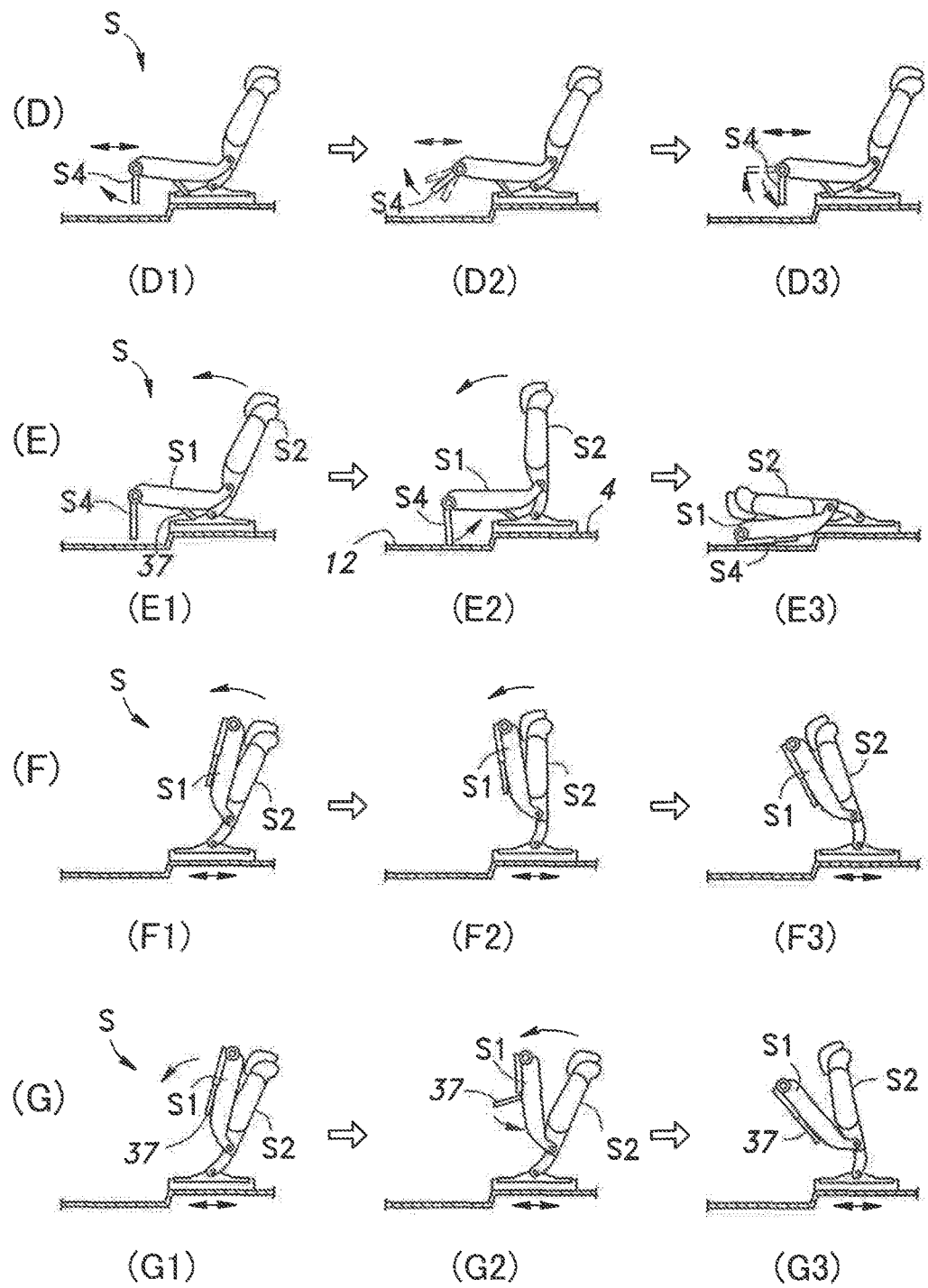
Figure 16:
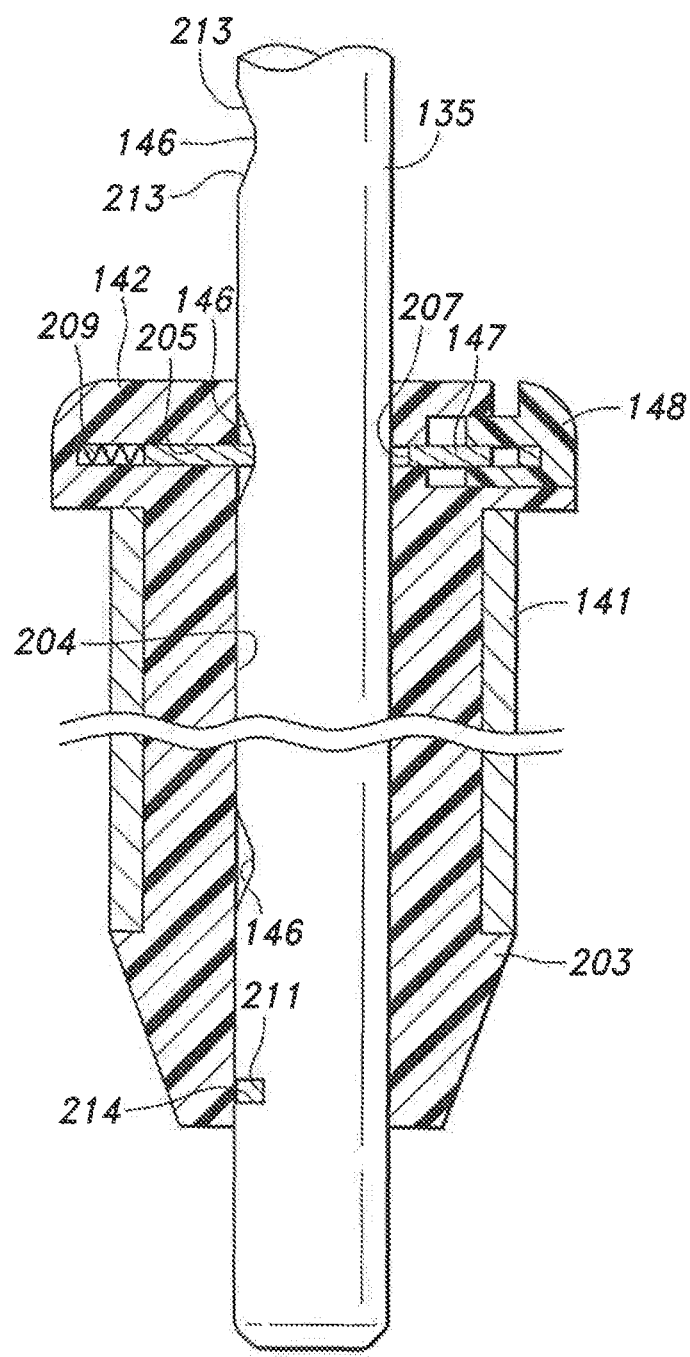
Figure 17:
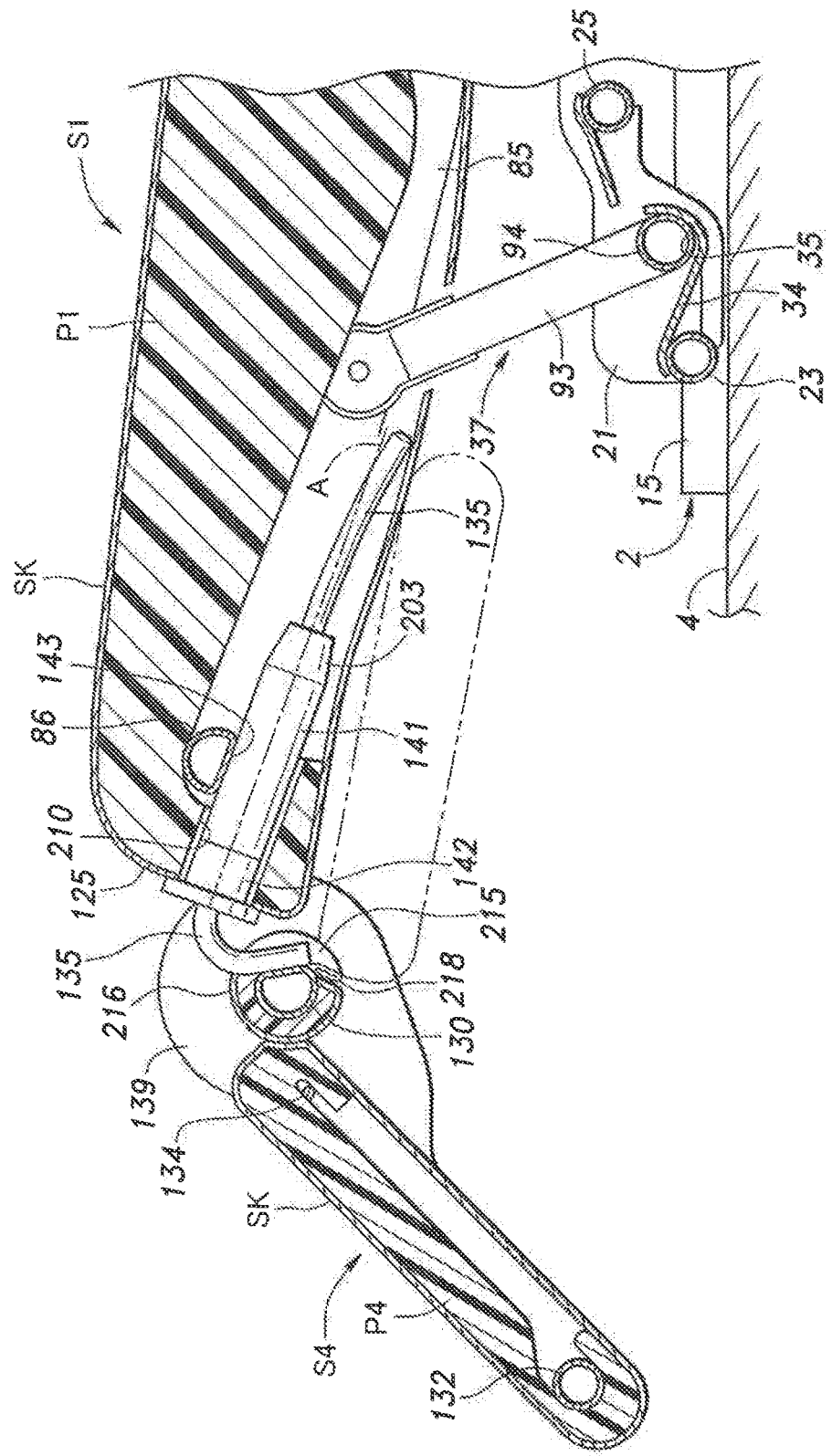
Figure 18:
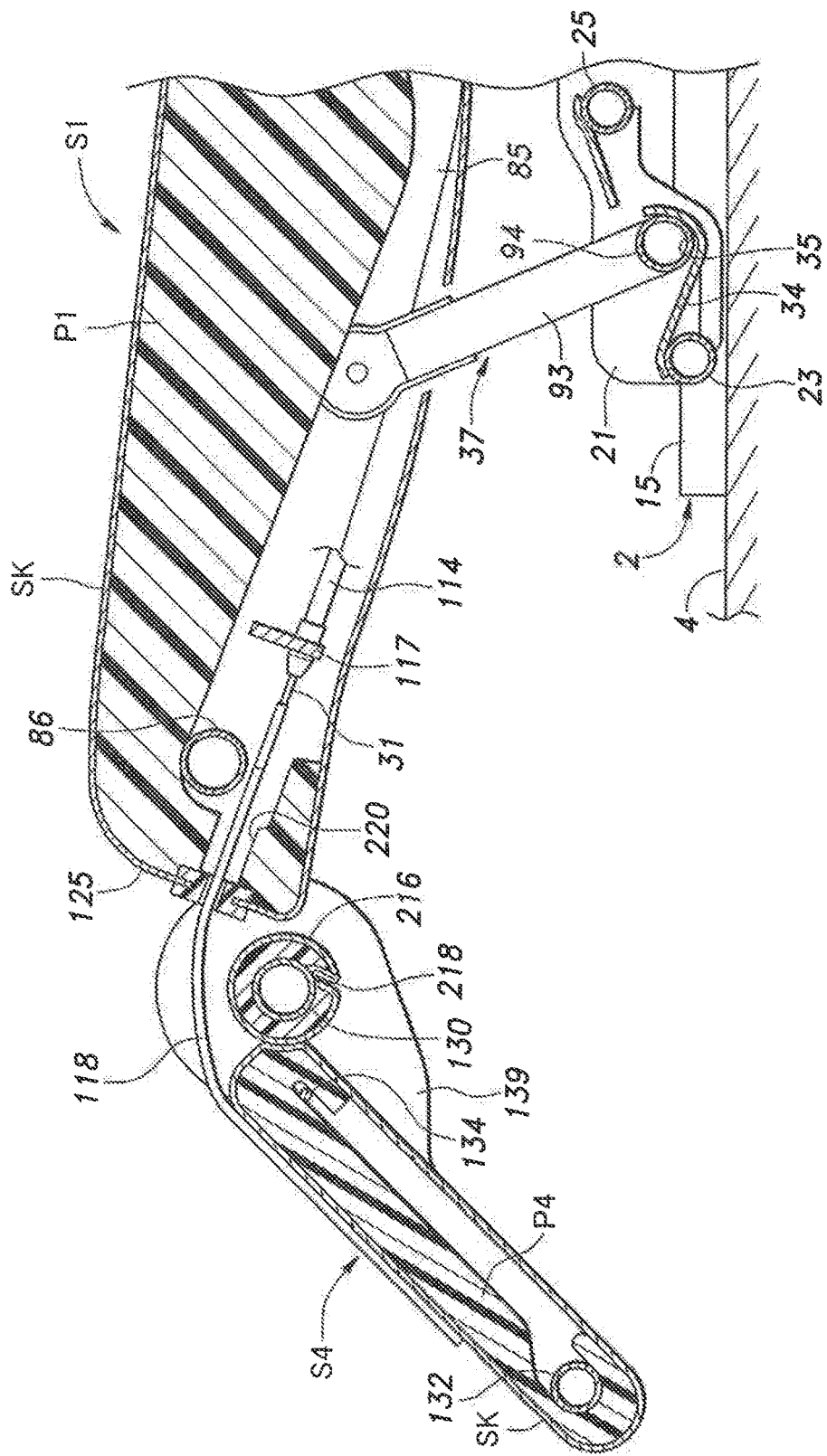
Figure 19:
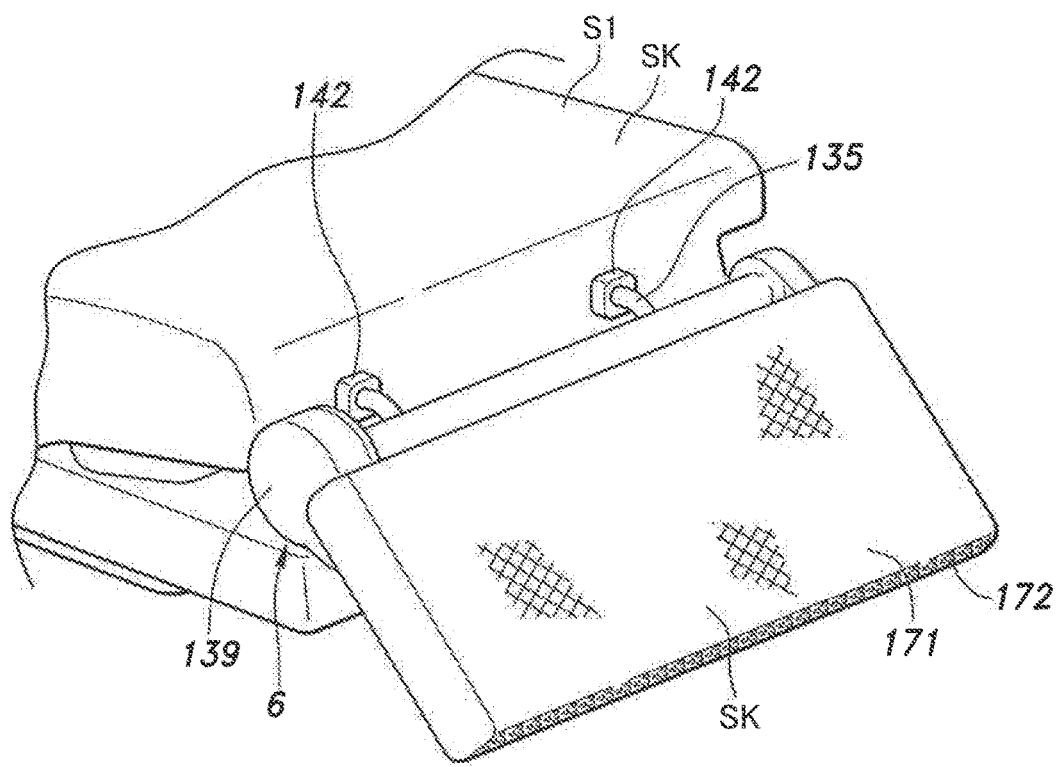
Figure 20:
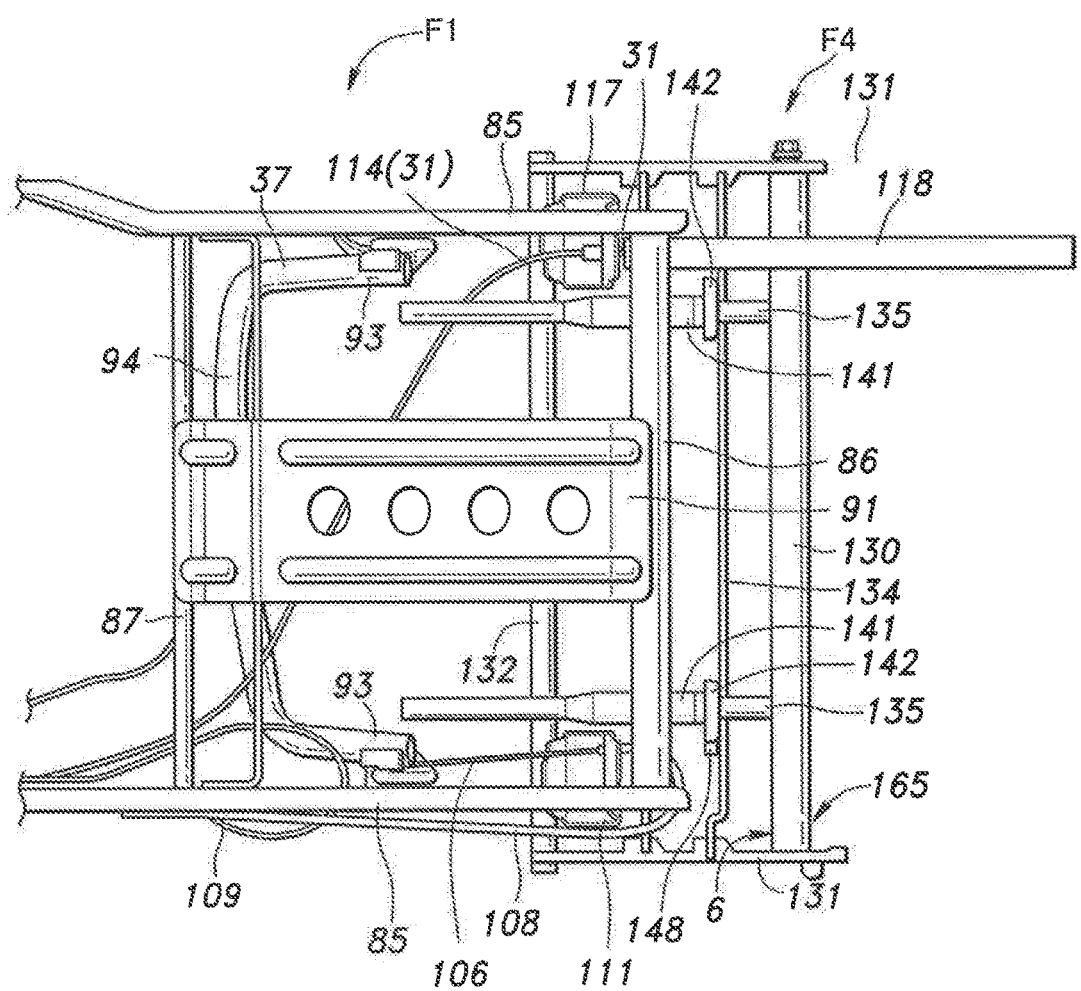
Figure 21:
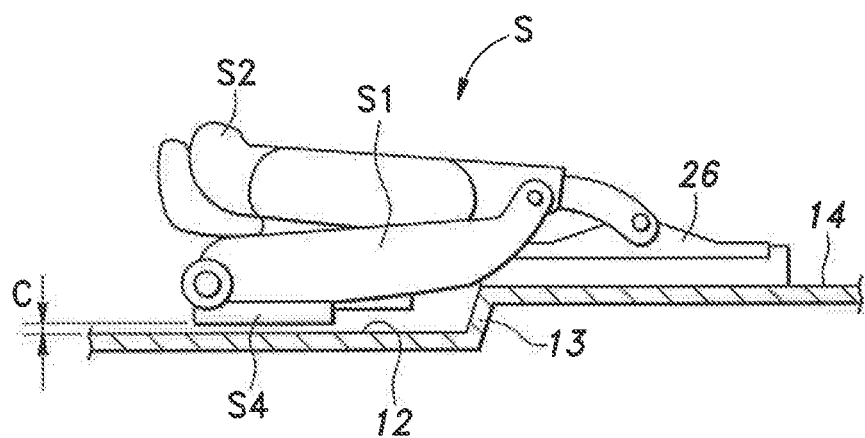
Figure 22:
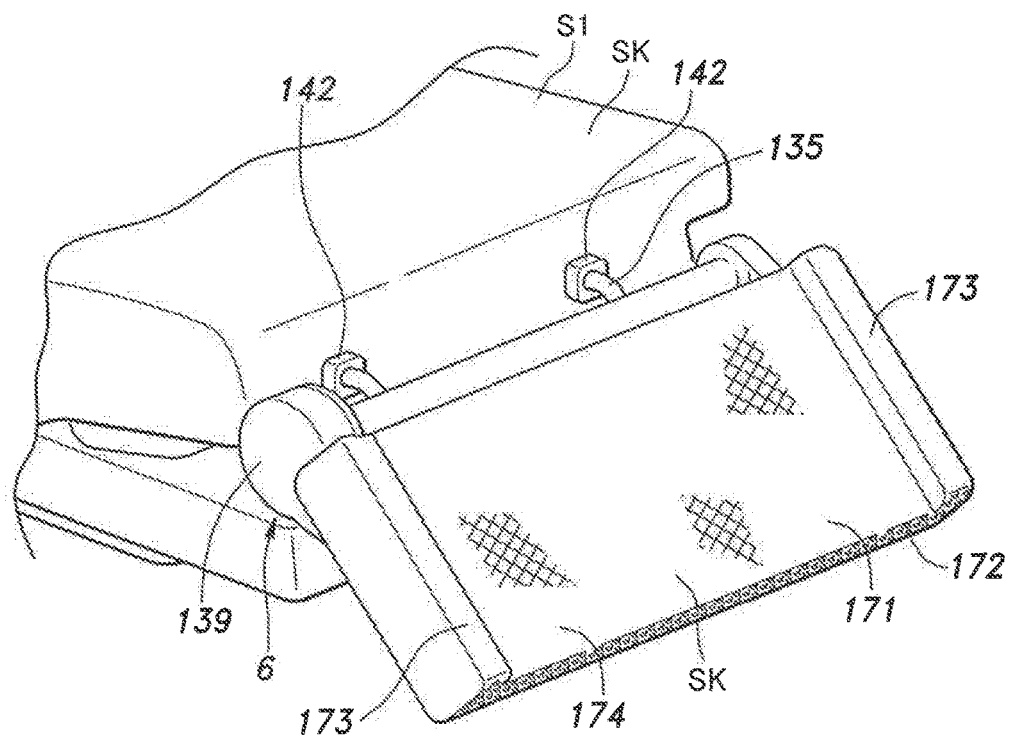
Figure 23:
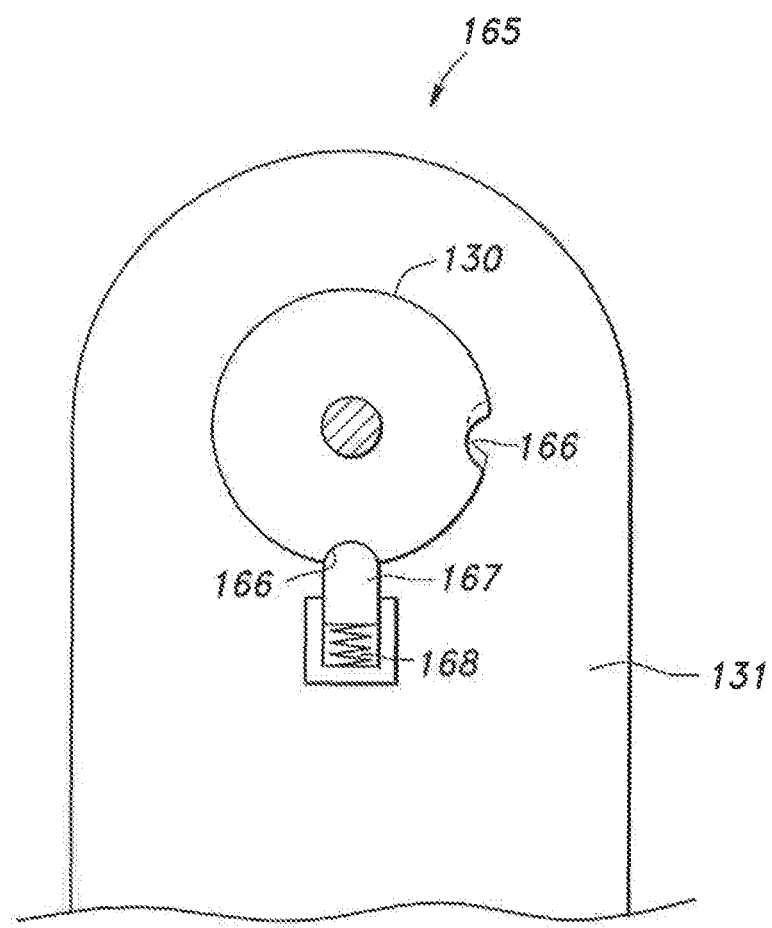
Figure 24:
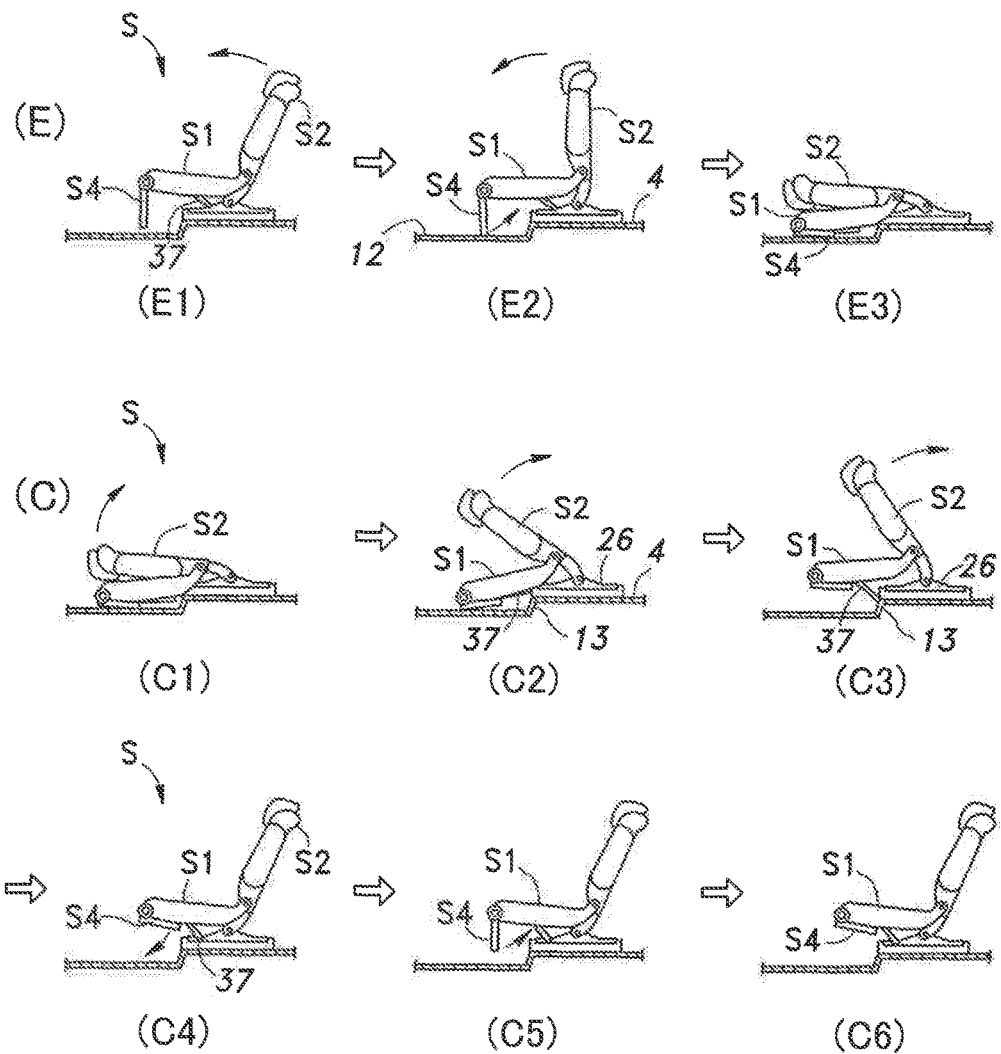
Figure 25:
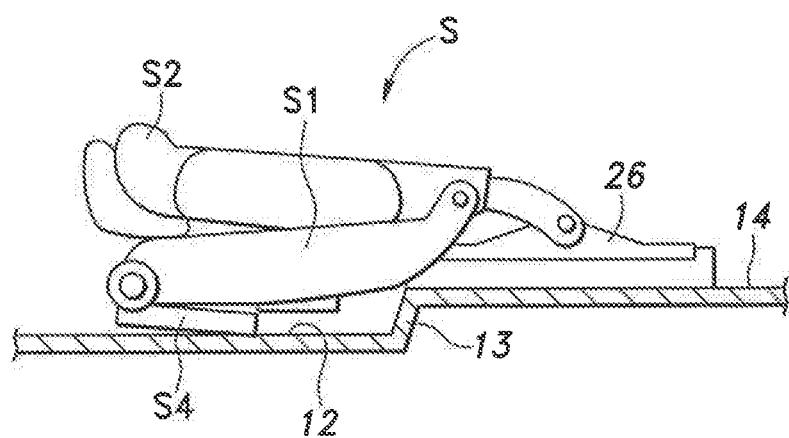

FIG. 1 is a perspective view of a vehicle seat embodying the present invention;
FIG. 2 is a perspective view of the seat frame of the vehicle seat;
FIG. 3 is a right side view of the seat frame of the vehicle seat;
FIG. 4 is a plan view of the base frame of the vehicle seat;
FIG. 5 is a plan view of the seat frame of the vehicle seat;
FIG. 6 is a rear view of the seat frame of the vehicle seat;
FIG. 7 is a perspective view of the seat frame of the vehicle seat as seen from a lower front direction;
FIG. 8 is a fragmentary sectional view of the stand base;
FIG. 9 is a fragmentary view of the reclining mechanism;
FIG. 10 is a fragmentary view of the tip up mechanism;
FIG. 11 is an exploded perspective view of the ottoman;
FIG. 12 is a fragmentary view of the angle adjustment mechanism of the ottoman;
FIG. 13 is a fragmentary view of the detent mechanism of the ottoman;
FIG. 14 are diagrams illustrating the mode of operation of the vehicle seat;
FIG. 15 are further diagrams illustrating the mode of operation of the vehicle seat;
FIG. 16 is a sectional view showing the mounting structure for the ottoman pillar;
FIG. 17 is another sectional view showing the mounting structure for the ottoman pillar;
FIG. 18 is a sectional view showing the positional relationship between the first grip member and the ottoman;
FIG. 19 is a perspective view of the ottoman;
FIG. 20 is a fragmentary plan view of the seat frame when the stand legs and the ottoman are retracted;
FIG. 21 is a side view of the vehicle seat in the dive down position;
FIG. 22 is a perspective view of the ottoman of a modified embodiment;
FIG. 23 is a fragmentary view of the detent mechanism of the ottoman in the modified embodiment;
FIG. 24 are diagrams illustrating the mode of operation of the vehicle seat of the modified embodiment;
FIG. 25 is a side of the vehicle seat of the modified embodiment in the dive down position;
FIG. 26 are diagrams illustrating the various forms of space created by the vehicle seat; and
FIG. 27 are further diagrams illustrating the mode of operation of the vehicle seat of the modified embodiment.

DESCRIPTION OF THE PREFERRED EMBODIMENT(S)

A preferred embodiment of the present invention is described in the following with reference to the appended drawings. In the following description, the directions are based on the view of the person seated in the seat S. The directions associated with various parts of the seat S are based on the seat S in the state suitable for seating an occupant. Those component parts that are provided in pairs on either side are denoted with common numerals, and may be referred to as being on the left or on the right as required.

(Overall Structure)

As shown in FIG. 1, the vehicle seat S is used as a rear seat (of a second row or a third row) of an automobile, and includes a seat cushion S1, a seat back S2, a head rest S3 and an ottoman (leg rest) S4. In some cases, only the component parts on one side of the seat are described as the seat is generally symmetric with respect to a center line extending in the longitudinal direction.

Referring to FIG. 2 also, the seat cushion S1, the seat back S2, the head rest S3 and the ottoman S4 are internally provided with a seat frame F. The seat frame F includes a cushion frame F1 forming a frame for the seat cushion S1, a back frame F2 forming a frame for the seat back S2, a head rest frame F3 forming a frame for the head rest S3, and an ottoman frame F4 forming a frame for the ottoman S4.

The seating side of the cushion flame F1, the back resting side of the back frame F2, the head supporting side of the head rest frame F3 and the leg supporting side of the ottoman frame F4 are fitted with a seat cushion pad P1, a seat hack pad P2, a head rest pad P3 and the ottoman pad P4 respectively, and each pad is made of cushion material such as polyurethane foam and covered by a skin member SK. The skin member SK is made of sheet material such as synthetic leather and fabric. The bottom side of the cushion frame F1, the back side of the hack frame F2 and the reverse side of the ottoman frame F4 are fitted with respective covers made of plastic material, and the bottom surface, the back surface and the reverse surface of these frames may be defined by these covers.

The hack frame F2 is attached to a floor 4 of the vehicle via a slide mechanism 2 and a reclining mechanism 3 so that the back frame F2 is slidable with respect to the floor 4, and rotatable (tiltable) with respect to the slide mechanism 2. The cushion frame F1 is rotatably attached to the hack frame F2 via a tip up mechanism 5. The head rest frame F3 is slidably attached to the back frame F2. The ottoman frame F4 is slidably attached to the cushion frame F1. The ottoman frame F4 is provided with an angle adjustment mechanism 6 so as to be tiltable.

As shown in FIG. 3, the floor 4 includes a high level part 11 having the slide mechanism 2 attached thereto and a low level part 12 located in front of the high level part 11 at a lower level. An upright wall 13 is provided between the high level part 11 and the low level part 12 as a transitional part. The floor 4 is covered by an upholstery material such as unwoven fabric made by needle punching, for instance. The low level part 12 of the floor 4 is covered by a floor mat which may be laid over the upholstery material.

As shown in FIGS. 4 to 7, the slide mechanism 2 includes a pair of slide mechanism parts positioned on either side of the seat S, and each slide mechanism part includes a lower rail 15, an upper rail 16 slidably mounted on the lower rail 15 and a rail lock member 17 for fixedly securing the upper rail 16 on the lower rail 15. The slide mechanism 2 may consist of any per se known type. The lower rails 15 extend in the fore and aft direction laterally spaced from each other on the high level part 11 (FIG. 3) of the floor 4. Each lower rail 15 is attached to the floor 4 by using screws or the like. Each upper rail 16 is engaged by the corresponding lower rail 15 in a slidable manner in the fore and aft direction. Only one of the slide mechanism parts is described in the following description as the two parts are essentially identical to each other.

The lower rail 15 is formed with a plurality of lock holes (not shown in the drawings) arranged in the lengthwise direction. The rail lock member 17 is pivotally attached to the upper rail 16 so as to be engageable with a selected one of the lock holes. The rail lock member 17 prevents the movement of the upper rail 16 and a slide member 21 attached thereto relative to the lower rail 15. The rail lock member 17 is urged by a biasing means consisting of a spring (not shown in the drawings) into engagement with a selected one of the lock holes. Normally, the rail lock member 17 is kept engage by the lock hole under the biasing force of the spring, and prevents the movement of the slide member 21. When the rail lock member 17 is pivoted by the operation of a vehicle occupant against the biasing force of the spring, the rail lock member 17 is disengaged from the lock hole, and the upper rail 16 is rendered moveable.

The slide member 21 which is attached to the upper rail 16 is made by welding a plurality of stamp formed sheet metal pieces together. The slide member 21 extends along the length of the upper rail 16. The two slide members 21 are connected to each other by a slider front member 23 at the front ends, by a slider rear member 24 at the rear ends, and by a slider middle member 25 at the middle parts. These cross members 23, 24 and 25 are made of metallic pipe stock, and are connected to the slide members 21 by welding or by using screws, and extend laterally parallel to one another. Thus, the slide members 21 and the cross members 23, 24 and 25 jointly form a frame structure serving as a seat base 26. The seat base 26 and the two upper rails 16 are thus designed to move in the fore and aft direction as a single body.

The right and left rail lock members 17 are connected to each other via a link mechanism 28 (FIGS. 4 to 6). The link mechanism 28 can change between a locked condition and a released condition, and is normally placed in the locked condition under the biasing force of the spring urging the rail lock members 17. In the locked condition, the link mechanism 28 permits the engagement of the rail lock member 17 with the selected lock hole. When the link mechanism 28 is changed from the locked condition to the released condition by the operation of the vehicle occupant, the link mechanism 28 keeps the rail lock member 17 disengaged from the lock hole against the biasing force of the spring. As will be described hereinafter, an end of a first rail cable 31 and an end of a second rail cable 32 are connected to the link mechanism 28 for transmitting force thereto. The link mechanism 28 is disengaged when at least one of the first rail cable 31 and the second rail cable 32 is pulled.

As shown in FIGS. 4 and 8, a stand base 34 is placed across the slider front member 23 and the slider middle member 25. The stand base 34 is made by stamp forming sheet metal, and is welded to a laterally middle part of the slider front member 23 at the front end and to a laterally middle part of the slider middle member 25 at the rear end. A support groove 35 extends laterally on the upper side of the stand base 34 over the entire width of the stand base 34. The support groove 35 opens out in an upper and forward direction for supporting a stand leg 37 which will be described hereinafter.

The stand base 34 is provided with a pivotable engagement claw 41 having a rotational center line extending in parallel with the (laterally extending) axial line of the support groove 35, and can take a projecting position projecting from a side of the support groove 35 into the support groove 35 as shown by the solid lines in FIG. 8 and a retracted position cleared from the support groove 35 as shown by the imaginary lines in FIG. 8. A torsion spring 42 is interposed between the stand base 34 and the engagement claw 41 to urge the engagement claw 41 into the projecting position. In the projecting position, the engagement claw 41 engages a cross member 94 of the stand leg 37 to prevent the cross member 94 from leaving the support groove 35. The outer side of the engagement claw 41 or the side of the engagement claw 41 facing the open side of the support groove 35 when the engagement claw 41 is in the projecting position is formed as an inclined surface.

As will be discussed hereinafter, an end of an engagement claw cable 43 is connected to the engagement claw 41 to transmit force thereto. By pulling the engagement claw cable 43, the engagement claw 41 is caused to pivot from the projecting position to the retracted position.

As shown in FIGS. 2, 5 and 6, the back frame F2 includes a pipe frame 45 formed as an elongated rectangular frame and a pair of back side frames 46 welded to either vertically extending lower side part of the pipe frame 45. The hack side frames 46 are formed by stamp forming sheet metal. Each back side frame 46 is provided with a concave surface surrounding the outer side surface of the lower part of the corresponding side part of the pipe frame 45. The lower part of each back side frame 46 extends downward beyond the corresponding side part of the pipe frame 45. A part of each back side frame 46 extends to a lower part of the pipe frame 45, and is welded thereto. A reinforcement plate 47 extends across each hack side frame 46 and the adjoining lower part of the pipe frame 45, and welded to these components for the reinforcement of the back frame F2. The upper part of each reinforcement plate 47 forms a hollow, three-dimensional structure in cooperation with the corresponding hack side frame 46 and the pipe frame 45, and the lower part thereof extends downward along the corresponding back side frame 46.

Each back side frame 46 defines a pair of side surfaces facing either lateral direction. The left side surface of the lower part of the left back side frame 46 opposes the right side surface of the left slide member 21, and is connected thereto in a rotatable manner. As shown in FIGS. 5 to 7, the left side surface of the lower part of the right back side frame 46 opposes the right side surface of the reclining mechanism 3 attached to the right slide member 21, and is connected to the right slide member 21 in a rotatable manner, via the reclining mechanism 3. The rotational center lines of the right and left back side frames 46 are coaxially disposed.

The reclining mechanism 3 is configured to keep the rotational (tilting) angle of the right back side frame 46 relative to the right slide member 21 at a selected angle. The reclining mechanism 3 is provided with a release lever 51 (FIG. 7) that can be operated to change the rotational angle of the right back side frame 46 relative to the right slide member 21. The reclining mechanism 3 may consist of any per se known mechanism.

As shown in FIG. 9, the reclining mechanism 3 used in the illustrated embodiment includes a lower plate 52 attached to the right slide member 21, an upper plate 53 attached to a lower part of the right side frame opposite to the lower plate 52 so as to be rotatable relative to the lower plate 52, a connecting shaft 54 passed through the rotational centers of the lower plate 52 and the upper plate 53, a cam plate 55 positioned in an inner space defined between the upper plate 53 and the lower plate 52 and rotationally fast with the connecting shaft 54, a plurality of lock members 56 positioned in the inner space and a torsion spring 57 urging the cam plate 55 in a rotational direction. The lock members 56 are engaged by respective guide grooves 58 formed in the lower plate 52 so as to be movable in the radial direction of the lower plate 52. Each lock member 56 is provided with a cam in the radially inner end thereof and external teeth 59 in the radially outer end thereof, the external teeth 59 engaging internal teeth 61 formed on the inner peripheral part of the upper plate 53 (defining the inner space) when the lock member 56 is displaced to the radially outer position thereof. The cam plate 55 engages the can followers of the lock members 56 such that the lock members 56 are displaced radially outward when the cam plate 55 is turned in one direction, and the lock members 56 are displaced radially inward when the cam plate 55 is turned in the other direction. An end of the connecting shaft 54 is passed through the upper plate 53 and the right back side frame 46, and is connected to the radially extending release lever 51 (FIGS. 3 and 7) at the terminal end of the connecting shaft 54.

In the reclining mechanism 3, normally, the cam plate 55 is urged in the one rotational direction by the torsion spring 57 so that the lock member 56 is displaced to the radially outward position, and the external teeth 59 of the lock members 56 engage the internal teeth 61 of the upper plate 53. As a result, the lock member 56 prevents the relative rotation between the lower plate 52 and the upper plate 53. In other words, the reclining mechanism 3 is normally placed under a locked condition where the relative rotation between the lower plate 52 and the upper plate 53 is prohibited owing to the biasing force of the torsion spring 57. When the release lever 51 is turned in the release direction by the vehicle operator so that the connecting shaft 54 and the cam plate 55 are turned in the other direction against the biasing force of the torsion spring 57, the lock member 56 is displaced to the radially inward position, and the external teeth 59 of the lock member 56 are disengaged from the internal teeth 61 of the upper plate 53. As a result, the relative rotation between the lower plate 52 and the upper plate 53 is enabled. An end of a reclining cable 63 (FIGS. 3 and 7) is connected to the release lever 51 for transmitting the operating force. When the reclining cable 63 is pulled, the release lever 51 rotates in the release direction.

As shown in FIGS. 2, 3 and 5, a bracket 66 for supporting a handle unit 65 is attached to the upper end of the right side part of the pipe frame 45 by welding. The handle unit 65 includes a case 67 with an upwardly and rearwardly facing opening and a handle 68 pivotally attached to the case 67 therein. As shown in FIGS. 1 and 2, the part of the seat back pad P2 corresponding to the handle unit 65 and the corresponding part of the skin member SK are removed so that the handle 68 may be exposed in the upper right part of the seat back S2 for a vehicle occupant to operate.

The handle 68 is connected to an end of the engagement claw cable 43 whose other end is connected to the engagement claw 41 (FIG. 8) and an end of the reclining cable 63 whose other end is connected to the release lever 51 (FIG. 3). The engagement claw cable 43 and the reclining cable 63 are encased in respective outer tubes 71, 72 in a slidable manner. Referring to FIG. 5, although not shown in any great detail, an end of the engagement claw outer tube 71 encasing the engagement claw cable 43 is attached to the stand base 34, and extends along the right slide member 21 and upward along the right back side frame 46 and the right side part of the pipe frame 45 before being attached to the bracket 66 at the other end. As shown in FIG. 3, an end of the reclining outer tube 72 encasing the reclining cable 63 is attached to the right side surface of the right back side frame 46, and extends upward along the right back side frame 46 and the right side part of the pipe frame 45 before being attached to the bracket 66 at the other end. The engagement claw outer tube 71 and the reclining outer tube 72 are bundled together by a band tie, and attached to the right side part of the pipe frame 45.

When the vehicle occupant pulls the handle 68 to cause the handle 68 to tilt in a prescribed direction, the engagement claw cable 43 is pulled toward the handle 68 so that the engagement claw 41 (FIG. 8) rotates from the projecting position to the retracted position, and the engagement claw 41 that locks the stand leg 37 is released. At the same time, the reclining cable 63 is pulled toward the handle 68 so that the release lever 51 is tilted in the release direction, and the lock on the reclining mechanism 3 is released.

As shown in FIGS. 2 and 3, an armrest bracket 76 for supporting an armrest 75 is attached to the left side part of the pipe frame 45 by welding. The armrest bracket 76 projects forward from the left side part of the pipe frame 45. The armrest 75 is attached to the armrest bracket 76 so as to be rotatable within a prescribed angular range.

As shown in FIGS. 2 and 5, a pair of head rest retaining portions 78 for supporting the head rest S3 are attached to the upper end part of the pipe frame 45. Each head rest retaining portion 78 consists of a tubular member which receives a support 79 consisting of a tubular member made of plastic material. The head rest S3 is mounted on the top end part of the pipe frame 45 via a pair of head rest pillars 80 included in the head rest frame F3 which are inserted in the respective supports 79 of the head rest retaining portion 78.

A plurality of auxiliary frames 82 each consisting of a metallic rod member are attached to respective suitable parts of the pipe frame 45. The auxiliary frames 82 include those extending between the right and left side parts of the pipe frame 45 and those extending rightward and leftward from the right and left side parts of the pipe frame 45, respectively. The auxiliary frames 82 fill the gaps in the pipe frame 45 so that the seat hack pad P2 may be supported in a stable manner.

As shown in FIGS. 2 and 5, the cushion frame F1 includes a pair of cushion side frames 85 extending in the fore and aft direction along either side of the cushion frame F1, a cushion front member 86 connected between the front ends of the cushion side frames 85, and a cushion rear member 87 connected between the rear ends of the cushion side frames 85. Each cushion side frame 85 is made by stamp forming sheet metal, and has a major plane facing in the lateral direction. The peripheral part of each cushion side frame 85 is bent in the outboard direction. While the front end of each cushion side frame 85 extends in the fore and aft direction, the rear end of each cushion side frame 85 is bent upward and rearward relative to the front part. The cushion rear member 87 is attached to the bent part of the corresponding cushion side frame 85.

The rear end part of the left cushion side frame 85 is rotatably attached to the left back side frame 46 such that the right side surface of the left cushion side frame 85 opposes the upper part of the left side surface of the left back side frame 46.

As shown in FIG. 6, a fastening seat 88 is formed in an upper part of the right back side frame 46. The fastening seat 88 projects rightward, and defines a flat projecting end. A support plate 89 is attached to the listening seat 88 by using threaded bolts. A part of the right back side frame 46 immediately below the fastening seat 88 is provided with a recess 90, and a gap is defined between the recess 90 and the support plate 89. The support plate 89 is a vertically extending metallic plate having a laterally directed major plane, and is attached to the fastening seat 88 at the upper end thereof. The lower part of the support plate 89 is spaced from the right side surface of the right back side frame 46. The rear end of the right cushion side frame 85 is positioned between the right back side frame 46 and the support plate 89, and is attached to the support plate 89 in a rotatable manner. The rotational center lines of the right and left cushion frames F1 extend laterally in a coaxial relationship.

Referring to FIGS. 2 and 5 once again, a center support member 91 extending in the fore and aft direction is connected between the cushion front member 86 and the cushion rear member 87. The center support member 91 supports the seat cushion pad P1 and the hip of the vehicle occupant from below in the central part of the cushion frame F1 and is preferably provided with a resiliency. In the illustrated embodiment, the center support member 91 consists of a plate member (center plate) formed by stamp formed sheet metal, and is provided with a vertically facing major plane. The front end of the center support member 91 is welded to the laterally central part of the cushion front member 86, and the rear end thereof is welded to the laterally central part of the cushion rear member 87. The lateral width of the center support member 91 is about one third (⅓) of that of the cushion front member 86. The center support member 91 may be provided with beads for reinforcement and openings for reducing the weight. Alternatively, the center support member 91 may be made of elastic members such as wire spring, and may be provided in a plurality of locations along the lateral direction.

As shown in FIG. 7 also, the stand leg 37 is pivotally attached to the two cushion side frames 85. The stand leg 37 includes a pair of arms 93 each having a base end pivotally attached to the corresponding cushion side frame 85 and a cross member 94 connected between the other ends of the arms 93 so that the stand leg 37 is provided with the shape of letter U. The most part of the arms 93 and the cross member 94 are made by bending a metallic pipe in the shape of letter U. The one end of each arm 93 is formed by a bracket welded to the metallic pipe in side view (FIG. 3), the stand leg 37 is pivotable between a retracted position where the cross member 94 adjoins the lower surface of the center support member 91 and the arms 93 extend along the respective cushion side frames 85 as shown by the imaginary lines and a use position or a deployed position where the arms 93 project downward from the respective cushion side frames 85 as shown by the solid lines. In either position, the stand leg 37 is located on the outside of the cover defining the bottom surface of the seat cushion S1.

When the stand leg 37 is in the use position, the stand lea 37 can fit into the support groove 35 of the stand base 34. When the stand leg 37 is engaged by the support groove 35, the seat cushion S1 is retained by the stand lea 37 from below, and is kept in the seating position where the seat surface (upper surface) thereof extends substantially horizontally. When engaged by the support groove 35, the stand leg 37 is prevented from pivoting from the use position to the retracted position. In other words, by being engaged by the support groove 35, the angular position of the seat cushion S1 relative to the seat back S2 is determined.

When inserting the cross member 94 of the stand leg 37 into the support groove 35, the cross member 94 is pushed against the inclined surface of the engagement claw 41 to cause the engagement claw 41 to rotate from the projecting position to the retracted position against the biasing force of the torsion spring 42. Once the cross member 94 is forced into the support groove 35, the engagement claw 41 rotates back into the projecting position under the biasing force of the torsion spring 42. When placed in the projecting position, the engagement claw 41 engages the cross member 94, and prevents the cross member from being detached from the support groove 35. When the cross member 94 is desired to be disengaged from the support groove 35, the vehicle occupant operates the handle 68 (FIG. 1), and displaces the engagement claw 41 to the retracted position via the engagement claw cable 43.

As shown in FIGS. 3, 5 and 6, the tip up mechanism 5 is interposed between the right cushion side frame 85 and the support plate 89. The tip up mechanism 5 fixedly secures the right cushion side frame 85 to the support plate 89 to fix the angular position of the seat cushion S1 relative to the seat back S2 such that the seat cushion S1 is tilted upward from the seating position. The tip up mechanism 5 may consist of any per se known mechanism.

As shown in FIG. 10, the tip up mechanism 5 of the illustrated embodiment includes a plurality of engagement notches 101 formed in the lower edge of the support plate 89, a lock member 102 pivotally attached to the right side surface of the right cushion side frame 85 and moveable between an engagement position engaging one of the engagement notches 101 indicated by the imaginary lines and a release position disengaged from the engagement notches 101 indicated by the solid lines, a rubber member (not shown in the drawings) urging the lock member 102 to the engagement position, a cam member 103 pivotally attached to the right side surface of the right cushion side frame 85 and configured to pivot between a first position for engaging the lock member 102 to position the lock member 102 in the engagement position as indicated by the solid lines and a second position for disengaging the lock member 102 as indicated by the imaginary lines, and a tension coil spring 104 positioned between the cam member 103 and the right side surface of the right cushion side frame 85 to urge the cam member 103 toward the second position.

The number of the engagement notches 101 may be one or greater. One of the engagement notches 101 is located so as to engage the lock member 102 when the seat cushion S1 is located in an upper limit position (tip up position) in the angular range of the seat cushion S1 or when the seat surface (upper surface) of the seat cushion S1 is closest from the support surface (front surface) of the seat back S2. When the seat cushion S1 is in the tip up position, the front part of the right cushion side frame 85 is substantially in parallel with the right side part of the pipe frame 45. The remaining engagement notches 101 may be provided in positions for engaging the lock member 102 at various angular positions between the seating position and the tip up position of the seat cushion S1. Therefore, owing to the tip up mechanism 5, when the right cushion side frame 85 is upwardly rotated relative to the support plate 89, the lock member 102 can engage the corresponding engagement notch 101 under the biasing force of the tension coil spring 104 at the selected angular position.

The engagement notches 101 may be configured such that the engagement with the lock member 102 is maintained when the right cushion side frame 85 is forced in the direction to tilt downward relative to the support plate 89 so as to prevent the rotation of the right cushion side frame 85 relative to the support plate 89, and the disengagement of the lock member 102 is permitted when the right cushion side frame 85 is forced to tilt upward relative to the support plate 89 so as to permit the rotation of the right cushion side frame 85 relative to the support plate 89. According to such an arrangement, even after the lock member 102 has been engaged by one of the engagement notches 101, the upward tiling of the right cushion side frame 85 is permitted. As the right cushion side frame 85 is further tilted upward, the lock member 102 is engaged by the succeeding engagement notch 101. Therefore, even when the can member 103 is in the second position indicated by the imaginary lines, the right cushion side frame 85 can be tilted upward to a desired angle.

When the cam member 103 is angularly displaced by the operation of the vehicle occupant to the first position indicated by the solid lines against the biasing force of the tension coil spring 104, the lock member 102 moves to the release position, and is prevented from being engaged by the engagement notches 101. An end of a first tip up cable 106 and an end of a second tip up cable 107 are connected to the cam member 103 for transmitting force. The first tip up cable 106 in encased in a first tip up outer tube 108, and the second tip up cable 107 is encased in a second tip up outer tube 109, each in a slidable manner.

An end of the first tip up outer tube 108 is attached to the right side surface of the right cushion side frame 85 such that the corresponding opening of the first tip up outer tube 108 faces the cam member 103. As shown in FIGS. 3 and 5, the first tip up outer tube 108 extends forward from the one end thereof along the right side surface of the right cushion side frame 85, and after being passed under the front end of the right cushion side frame 85, reaches the left side of the right cushion side frame 85. A bracket 111 is attached to the lower from end part of the right cushion side frame 85, and the other end of the first tip up outer tube 108 is fixedly secured to the bracket 111 so that the corresponding opening of the first tip up outer tube 108 faces rearward. The other end of the first tip up cable 106 is fixedly attached to an end part of the right arm 93 of the stand leg 37. As shown in FIG. 10, when the stand leg 37 is in the retracted position indicated by the imaginary lines, the other end of the first tip up cable 106 (on the side of the right arm 93) approaches the other end of the first tip up outer tube 108 so that the first tip up cable 106 slackens. When the stand leg 37 is in the use position indicated by the solid lines, the other end of the first tip up cable 106 (on the side of the right arm 93) moves away from the other end of the first tip up outer tube 108 so that the first tip up cable 106 is tensioned. In other words, when the stand leg 37 is in the use position, the cam member 103 is pulled by the first tip up cable 106 to be placed in the first position indicated by the solid lines in FIG. 10, and the lock member 102 is placed in the release position also indicated by the solid lines.

An end of the second tip up outer tube 109 is attached to the right side surface of the right cushion side frame 85 such that the corresponding opening of the second tip up outer tube 109 faces the cam member 103. As shown in FIGS. 3 and 5, the second tip up outer tube 109 extends from the one end thereof, and is passed under the longitudinally middle part of the right cushion side frame 85 to the left side of the right cushion side frame 85. The second tip up outer tube 109 then extends along the left side surface of the right cushion side frame 85, and reaches a part adjoining the rotational center of the right cushion side frame 85. Thereafter, as shown in FIGS. 3 and 6, the second tip up outer tube 109 is passed from the part adjoining the rotational center of the right cushion side frame 85 to the rear of the right hack side frame 46, and extends along the reinforcement plate 47 provided on the left side of the right hack side frame 46 before reaching a part adjoining the rotational center of the right back side frame 46. The other end of the second tip up outer tube 109 is fixedly attached to a projection 112 (FIG. 6) integrally formed with the reinforcement plate 47 so as to project inward from the left side surface of the reinforcement plate 47. The other end of the second tip up outer tube 109 is directed downward. The second tip up cable 107 is engaged by the left side surface of a lower plate 52 (FIG. 9) attached to the right slide member 21. The projection 112 functions not only as a fixing part for fixedly securing the other end of the second tip up outer tube 109 but also as a stopper for preventing further rearward rotation of the right back side frame 46 by engaging the right slide member 21 when the right back side frame 46 tilts rearward as the projection 112 projects to a position laterally overlapping with the right slide member 21.

The positions of the other end of the second tip up cable 107 and the other end of the second tip up outer tube 109 are determined such that the other end of the second tip up cable 107 moves away from the other end of the second tip up outer tube 109 as the seat back S2 tilts forward from an upright position relative to the floor 4. As a result, as the seat back S2 tilts forward, the second tip up cable 107 is pulled toward the other end thereof. Once the forward tiling angle of the seat back S2 exceeds a prescribed value, the cam member 103 (FIG. 10) reaches the first position indicated by the solid lines in FIG. 10 by being pulled by the second tip up cable 107, and the lock member 102 is positioned in the release position also indicated by the solid lines. In other words, the combination of the first tip up cable 106 and the first tip up outer tube 108, and the combination of the second tip up cable 107 and the second tip up outer tube 109 form tip up lock cancel mechanisms 113, respectively, for unlocking the tip up mechanism 5.

Because the first lip up cable 106 and the second tip up cable 107 are both connected to the cam member 103, the cam member 103 is brought to the first position when at least one of the first tip up cable 106 and the second tip up cable 107 is pulled toward the other end side, and the lock member 102 is placed in the release position. In other words, when the first tip up cable 106 and the second tip up cable 107 are both slackened, or when the forward tilt angle of the seat back S2 is below a prescribed value (or when the seat back S2 is in an upright position) and the stand leg 37 is in the retracted position, the cam member 103 is placed in the second position indicated by the imaginary lines in FIG. 10, and the lock member 102 is enabled to engage one of the engagement notches 101.

The layout of the first rail cable 31 and the second rail cable 32 is described in the following. As shown in FIG. 5, the first rail cable 31 is encased in a first rail outer tube 114 in a slidable manner, and the second rail cable 32 is encased in a second rail outer tube 115 in a slidable manner. An end of each of the first rail outer tube 114 and the second rail outer tube 115 is connected to an immobile part of the link mechanism 28, and a corresponding end of each of the first rail cable 31 and the second rail cable 32 is connected to the moveable part of the link mechanism 28. Alternatively, an end of each of the first rail outer tube 114 and the second rail outer tube 115 may be connected to the slider middle member 25 or the slider rear member 24.

The first rail outer tube 114 extends from the one end thereof along the left side surface of the right back side frame 46, and upward along the left side surface of the right back side frame 46 before reaching a part adjoining the rotational center of the right cushion side frame 85. Thence, the first rail outer tube 114 is passed behind the right back side frame 46, and reaches the right side surface of the right back side frame 46 before extending from the rotational center of the right cushion side frame 85 to the left side surface of the right cushion side frame 85. Thereafter, as shown in FIG. 5, the first rail outer tube 114 extends forward along the left side surface of the right cushion side frame 85, and is passed obliquely forward and leftward under the center support member 91 before reaching a bracket 117 attached to the lower part of the front end of the left cushion side frame 85. The other end of the first rail outer tube 114 is attached to the bracket 117 so as to direct the opening thereof forward. The corresponding end of the first rail cable 31 projects forward from the other end of the first rail outer tube 114, and is connected to a first grip member 118. The first rail cable 31, the first rail outer tube 114 and the first grip member 118 jointly form an operation member for unlocking the slide mechanism 2.

The second rail outer tube 115 forms a loop extending from the one end thereof, and extends rearward before reaching a bracket 121 attached to the slider rear member 24. The other end of the second rail outer tube 115 is secured to the bracket 121 so as to direct the opening thereof rearward. The corresponding end of the second rail cable 32 projects rearward from the other end of the second rail outer tube 115, and is connected to a second grip member 122. The second rail cable 32, the second rail outer tube 115 and the second grip member 122 jointly form an operation member for unlocking the slide mechanism 2.

The first grip member 118 and the second grip member 122 may each consist of a flexible strap made of fabric, string or rope. In the illustrated embodiment, each of the first grip member 118 and the second grip member 122 is made by folding a strip of fabric into a loop. As shown in FIGS. 1 and 7, a passage (not shown in the drawings) is passed through the front end of the seat cushion pad P1 (FIG. 2) in the fore and aft direction, and the part of the skin member SK corresponding to the passage in the from end of the seat cushion pad P1 is fitted with a grommet 127 defining a hole so that the front end of the first grip member 118 may project from the front end surface of the seat cushion S1 via the grommet 127.

Thus, the vehicle occupant is able to pull the first rail cable 31 by gripping the first grip member 118 and pulling the first grip member 118 forward away from the seat cushion S1. Also, the vehicle occupant is able to pull the second rail cable 32 by gripping the second grip member 122 and pulling the second grip member 122 rearward. Thus, by pulling at least one of the first rail cable 31 and the second rail cable 32, the link mechanism 28 can be released from the locked condition so that the two rail lock members 17 are disengaged from the corresponding lock holes, and the upper rails 16 become moveable relative to the respective lower rails 15.

As shown in FIGS. 2, 5 and 11, the ottoman frame F4 includes a laterally extending base member 130, a pair of ottoman side frames 131 each rotatably supported to the corresponding end of the base member 130 at the base end thereof and extending to the free end thereof and a laterally extending ottoman front member 132 connected between the free ends of the ottoman side frames 131 so as to form as rectangular frame. A plurality of ottoman auxiliary members 134 are connected between the two ottoman side frames 131 in the space between the base member 130 and the ottoman front member 132, the base member 130 and the ottoman front member 132 are made of metallic pipe. Each ottoman side frame 131 is made by stamp funning sheet metal so that the major plane thereof faces laterally. The peripheral edge of each ottoman side frame 131 is bent laterally inward. The base member 130 is provided with a pair of ottoman pillars 135 laterally spaced from each other, and extending in parallel to each other. The ottoman pillars 135 are each made of a solid metallic rod.

The base member 130 is covered by a tubular base member pad 138 (FIG. 1). The outer surface of the base member pad 138 is covered by a skin member SK. The ottoman pad P4 (FIG. 2) is provided with a rectangular outer profile, and fitted on the two ottoman side frames 131 except for the base end parts thereof so as to cover the ottoman front member 132 and the ottoman auxiliary members 134. The base ends of the ottoman side frames 131 projecting from the tubular base member pad 138 and the skin member SK are fitted with covers 139 (FIG. 1) so as to conceal the connecting parts of the ottoman side frames 131 with the base member 130.

As shown in FIG. 11, the cushion front member 86 is provided with a pair of pillar support portions 141 for supporting the respective ottoman pillars 135. Each pillar support portion 141 consists of a tubular member having a rectangular cross section and two open ends. The pillar support portions 141 are mounted on parts of the cushion front member 86 located between the left cushion side frame 85 and the left edge of the center support member 91 and between the right cushion side frame 85 and the left edge of the center support member 91, respectively. The pillar support portions 141 are positioned such that the pillar support portions 141 extend in the fore and aft direction under the cushion front member 86, and the upper parts of the pillar support portions 141 are received in and welded to recesses 143 formed in the lower part of the cushion front member 86, respectively. A support 142 consisting of a tubular member made of plastic material is fitted into each pillar support portion 141. The ottoman pillars 135 are inserted into the inner bores of the supports 142 fitted in the respective pillar support portions 141 so that the ottoman frame F4 is thereby attached to the cushion frame F1.

A side surface of at least one of the two ottoman pillars 135 is formed with a plurality of the engagement grooves 146 at a regular interval along the length thereof in the illustrated embodiment, the right ottoman pillar 135 is formed with the engagement grooves 146. As shown in FIG. 1, the front end of each support 142 is positioned on the exterior of the skin member SK of the seat cushion S1. Referring to FIG. 11 once again, the front end of the right support 142 is provided with a recess that receives an engagement member 147 in a moveable manner so that the engagement member 147 can be move between an entry position protruding into the inner bore of the support 142 and a retreat position displaced from the inner bore of the support 142. The engagement member 147 is normally urged by a biasing member not shown in the drawings to the entry position. An end of the engagement member 147 projects outward from a side of the front end of the corresponding support 142 so as to serve as an operation member 148 (FIG. 7) for the vehicle occupant to operate. By pushing the operation member 148, the vehicle occupant can displace the engagement member 147 from the entry position to the retreat position. The engagement member 147 maintains the current position of the ottoman pillar 135 relative to the support 142 by being engaged by one of the engagement grooves 146.

The two ottoman side frames 131 can be tilted relative to the base member 130 between a retracted position shown in FIG. 14(A1) and a fully deployed position sown by imaginary lines in FIG. 15(D3). A half retracted position as shown in FIG. 15 (D1) is defined between the retracted position and the fully deployed position. In the retracted position, a most part of the ottoman S4 is stowed under the seat cushion S1, and the back side of the ottoman S4 opposes the lower surface of the seat cushion S1. In the half retracted position, the ottoman S4 is held vertically dependent from the base member 130. In the fully deployed position, the ottoman S4 projects forward from the seat cushion S1, and the support surface of the ottoman S4 faces a substantially same direction as the upper surface of the seat cushion S1.

A detent mechanism 165 (FIG. 5) as well as the angle adjustment mechanism 6 (FIG. 5) is interposed between the right end of the base member 130 and the right ottoman side frame 131. The angle adjustment mechanism 6 permits the clockwise rotation (toward the fully deployed position) of the right ottoman side frame 131 relative to the base member 130 as seen from the left hand side, and prohibits the counter clockwise rotation (toward the retracted position) of the right ottoman side frame 131 relative to the base member 130 as seen from the left hand side when the right ottoman side frame 131 is in any position between the half retracted position and the fully deployed position. Once the right ottoman side frame 131 has rotated relative to the base member 130 until the fully deployed position is reached, the angle adjustment mechanism 6 permits the clockwise rotation of the right ottoman side frame 131 relative to the base member 130 until the retracted position is reached. This angle adjustment mechanism 6 may consist of any per se known mechanism.

In the illustrated embodiment, as shown in FIG. 12, the angle adjustment mechanism 6 includes ratchet teeth 151 fixedly attached to a peripheral part of the base member 130, a pawl 152 rotatably attached to the left side surface of the right ottoman side frame 131 and engageable with the ratchet teeth 151, a torsion spring 153 provided between the pawl 132 and the left side surface of the right ottoman side frame 131 to urge the pawl 152 against the ratchet teeth 151, a cam member 154 rotatably attached to the base member 130 in a coaxial relationship, and a projection 155 provided on the base member 130. A torsion coil spring 156 for normally urging the right ottoman side frame 131 to the retracted position is interposed between the base member 130 and the right ottoman side frame 131. Owing to the engagement of the pawl 152 with the ratchet teeth 151, the rotation of the right ottoman side frame 131 relative to the base member 130 is prevented. When the right ottoman side frame 131 rotates toward the fully deployed position relative to the base member 130, the pawl 152 can disengage from the currently engaged ratchet tooth 151 and engage the adjoining ratchet tooth 151.

The cam member 154 is provided with a large diameter portion 157 extending radially outward beyond the projecting ends of the ratchet teeth 151 with respect to the base member 130 and a small diameter portion 158 extending short of the root circle diameter of the ratchet teeth 151 with respect to the base member 130. The pawl 152 can engage the ratchet teeth 151 when opposing the small diameter portion 158 of the cam member 154, but cannot engage the ratchet teeth 151 when opposing the large diameter portion 157 by being engaged by the large diameter portion 157. When the pawl 152 opposes the small diameter portion 158 of the cam member 154, the pawl 152 is engaged by a boundary part between the large diameter portion 157 and the small diameter portion 158 so that the cam member 154 is rotated in response to the rotation of the right ottoman side frame 131 toward the fully deployed position relative to the base member 130. When the rotation of the right ottoman side frame 131 toward the fully deployed position relative to the base member 130 has advanced to an angular position adjoining the fully deployed position, the rotation of the cam member 154 relative to the base member 130 is restricted by the engagement of the projection 155 with a first stopper surface 161 of the cam member 154. As a result, the pawl 152 is rotated relative to the cam member 154, and rides over the outer periphery of the large diameter portion 157. Under this condition, the pawl 152 cannot engage the ratchet teeth 151, and the right ottoman side frame 131 is enabled to rotate relative to the base member 130 toward the retracted position.

While the pawl 152 rides over the outer periphery of the large diameter portion 157, and the right ottoman side frame 131 rotates relative to the base member 130, the cam member 154 receives a frictional force from the pawl 152 so that the pawl 152 and the right ottoman side frame 131 rotate as a single body relative to the base member 130. Once the rotation of the right ottoman side frame 131 relative to the base member 130 toward the retracted position advances to such an extent that the pawl 152 does not oppose the ratchet teeth 151 any more, the rotation of the cam member 154 relative to the base member 130 is restricted by the engagement of the projection 155 with a second stopper surface 162 of the cam member 154. As a result, the pawl 152 is enabled to rotate relative to the cam member 154, and moves along the outer periphery of the large diameter portion 157 to a position opposing the small diameter portion 158. Under this condition, the pawl 152 is enabled to engage the ratchet teeth 151 once again, and as the right ottoman side frame 131 has rotated relative to the base member 130 until the fully deployed position is reached, the pawl 152 engages the ratchet teeth 151.

The detent mechanism 165 retains the ottoman S4 at a plurality of prescribed angular positions with a suitable retaining three. In other words, the retaining force for the ottoman S4 becomes greater at each of such prescribed angular positions than at adjoining angular positions so that the ottoman S4 can be maintained in a half locked state at each of such prescribed angular positions. The detent mechanism 165 of the illustrated embodiment retains the ottoman S4 at two positions or at the half retracted position and the retracted position. The detent mechanism 165 may consist of any per se known mechanism. In the illustrated embodiment, as shown in FIG. 13, two recesses 166 are formed on the outer periphery of the base member 130, and the ottoman side frame 131 is provided with a half lock member 167 that can slide over the periphery of the ottoman side frame 131 and can be engaged by the recesses 166 under the biasing force of a biasing means 168 urging the half lock member 167 against the base member 130. The engaging surfaces of the recesses 166 and the half lock member 167 are formed by curved surfaces or slanted surfaces. In this detent mechanism 165, the recesses 166 and the half lock member 167 are engaged with each other when the ottoman S4 is in the half retracted position and in the retracted position, but are disengaged from each other when a torque of a prescribed value is applied to the ottoman S4. This prescribed torque value is greater than the torque owing to the weight of the ottoman S4 and the torque owing to the biasing force of the torsion coil spring 156.

The possible actions and the positions which the seat S discussed above can take are described in the following with reference to FIGS. 14 and 15.

FIG. 14(A1) shows the seat S with the seat back S2 in the use position, the seat cushion S1 in the seating position, and the ottoman in the retracted position. If the vehicle occupant releases the lock of the stand leg 37 by operating the handle 68 (FIG. 1), and tilts up the seat cushion S1 toward the seat back S2 as indicated by the arrow, the seat cushion S1 can be tilted up to the upper limit position (tip up position) where the seat surface of the seat cushion S1 is placed upon the front surface of the seat hack S2 as shown in FIG. 14 (A2). Under this condition, the stand leg 37 is in the use position and projects from the bottom surface of the seat back S2, and the cam member 103 (FIG. 10) of the tip up mechanism 5 is being pulled by the first tip up cable 106 so that the lock member 102 is in the release position, and the angular position of the seat cushion S1 relative to the seat back S2 is not fixed. When the vehicle occupant collapses the stand leg 37 in the direction indicated by the arrow to the retracted position, the tip up mechanism 5 can be locked as shown in FIG. 14 (A3) so that the seat S is fixed in the tip up condition where the angular position of the seat cushion S1 is fixed, and the seat cushion S1 is in the tip up position.

Under the condition shown in FIG. 14 (B1) which is identical to that shown in FIG. 14 (A1), if the vehicle occupant operates the handle 68 (FIG. 1) to release the lock of the stand leg 37 and the lock of the reclining mechanism 3, the seat back S2 can be tilted forward. Under this condition, the tip up mechanism 5 cannot be locked, and the relative angle between the seat back S2 and the seat cushion S1 can be changed. If the seat back S2 is tilted forward, the stand leg 37 is disengaged from the support groove 35 (FIG. 8) of the stand base, and tilts forward. If the seat hack 82 is tilted forward, the stand leg 37 is caused to collapse so that the seat S is placed in the dive down condition where the seat cushion S1, the seat back S2 and the ottoman S4 are stowed in a low level part 12 of the floor 4 as shown in FIG. 14 (B3). Under this condition, because the stand leg 37 is retracted, the first tip up cable 106 (FIG. 10) slackens, but because the seat back S2 has tilted forward by more than the prescribed angle, the cam member 103 of the tip up mechanisms 5 is pulled by the second tip up cable 107, and the lock member 102 is placed in the release position so that the angular position of the seat cushion S1 is not fixed relative to the seat back S2.

When the seat S is in the tip up condition as shown in FIG. 14 (A3), the vehicle occupant can place the seat S in the dive down condition shown in FIG. 14 (B3) by releasing the lock of the reclining mechanism 3 via the handle 68, and causing the seat back S2 along with the seat cushion S1 to tilt forward as indicated by the broken line arrow.

When the seat S in the dive down condition is desired to be returned to the use condition, as shown in FIG. 14(C1), the vehicle occupant releases the lock of the reclining mechanism 3, and tilts up the seat back S2 as indicated by the arrow. Because the tilt up mechanism 5 is not locked at this time, the seat cushion S1 does not tilt upward with the seat back S2, but is dragged by the seat back S2 in the rearward direction until the front end of the stand leg 37 engages the upright wall 13 of the floor 4 or the seat base 26. As the vehicle occupant tilts the seat back S2 rearward from this condition as shown in FIG. 14 (C3), the stand leg 37 is engaged by the upright wall 13 of the floor 4 or the seat base 26 to be raised up to the use position thereof. As the vehicle occupant tilts the seat back S2 further rearward, the cross member 94 (FIG. 8) of the stand leg 37 is forced into the support groove 35 of the stand base 34, displacing the engagement claw 41 during this process with the result that the seat back S2 is fixed in the use position and the seat cushion is fixed in the seating position as shown in FIG. 14 (C4). Because the stand leg 37 is raised up, and the bottom surface of the seat cushion S1 leaves the floor 4, the ottoman S4 is not engaged by the upright wall 13 of the floor 4, and when the seat S is placed in the seated condition shown in FIG. 14(C4), the ottoman S4 is retained in the retracted position under the biasing force of the torsion coil spring 156 and the retaining force of the detent mechanism 165.

The vehicle occupant can tilt the ottoman S4 from the state shown in FIG. 14(C4) in the direction indicated by the arrow to the half retracted position where the ottoman D4 hangs down as shown in FIG. 14(C5). The ottoman S4 is detained in the half retracted position by the detent mechanism 165. When the angular position of the ottoman S4 is between the retracted position and the half retracted position, because the angle adjustment mechanism 6 does not retain the ottoman S4, the ottoman can be tilted in any desired direction. Therefore, by tilting the ottoman S4 from the state shown in FIG. 14(C5) in the direction indicated by the arrow once again, the ottoman S4 can be moved to the retracted position where the ottoman S4 opposes the bottom surface of the seat cushion S1 as shown in FIG. 14(C6).

When the vehicle occupant further tilts the ottoman S4 in the half retracted position in the direction indicated by the arrow as shown in FIG. 15 (D1), the ottoman S4 can be fixed at any angular position (deployed position) selected by the vehicle occupant via the angle adjustment mechanism (or is prevented from rotating toward the half retracted position). The vehicle occupant is able to release the lock of the ottoman pillar 135 relative to the seat cushion S1 by operating the engagement member 147 (FIG. 11), and move the ottoman S4 in the fore and aft direction to the desired position to be fixed therein. When the ottoman S4 is not needed any more, by tilting the ottoman S4 in the direction indicated by the arrow in FIG. 15 (D2) until the fully deployed position indicated by the broken lines in FIG. 15 (D3) is reached, the locking action by the angle adjustment mechanism 6 can be released. Once the locking action by the angle adjustment mechanism 6 is released, the ottoman 84 tilts downward under the own weight and the biasing three of the torsion coil spring 156, and is retained in the half retracted position.

When the ottoman 84 is in the half retracted position, the seat S in the use condition can be changed into the dive down condition by releasing the lock of the stand leg 37 and the lock of the reclining mechanism 3 via the handle 68 (FIG. 1) as shown in FIG. 15 (E1), and tilting the seat back S2 forward as indicated by the arrow. As a result, as shown in FIG. 15 (E2) the front end of the ottoman S4 abuts the low level part 12 of the floor 4, and the seat cushion S1 moves obliquely forward and downward so that a force directed obliquely rearward and upward is applied from the floor 4 to the front end of the ottoman S4, and the ottoman S4 tilts toward the retracted position. In the dive down condition of the seat S where the seat back S2 has completely tilted forward as shown in FIG. 15 (E3), the ottoman 84 is maintained in the retracted position under the biasing force of the torsion coil spring 156, and by the retaining action of the detent mechanism 165. Therefore, when the vehicle occupant has performed a series of operation shown in FIG. 14 (C) to return the seat S from the dive down condition to the use condition, the ottoman S4 remains in the retracted position even after the seat S has been put back to the use condition.

Other possible positions that the seat S can take are described in the following with reference to FIG. 15 once again. When the seat cushion S1 is in the tip up position as shown in FIG. 15 (F1), the seat back S2 along with the seat cushion S1 can be tilted forward by releasing the lock of the reclining mechanism 3 via the handle 68. The seat back S2 and the seat cushion S1 are fixed at the position where the handle 68 is released. For instance, as shown in FIG. 15 (F2), the reclining mechanism 3 can be locked when both the seat back S2 and the seat cushion S1 are tilted upright. Also, as shown in FIG. 15 (F3), the reclining mechanism 3 can be locked when the seat back S2 is tilted forward from the upright position. As can be readily appreciated, in any of the positions shown in FIG. 15 (F1) to FIG. 15 (F3), the vehicle occupant can tilt the seat back S2 and the seat cushion S1 in the fore and aft direction by releasing the lock of the slide mechanism 2 via the first grip member 118.

When the seat S is in the tip up condition as shown in FIG. 15 (G1), the vehicle occupant can tilt the stand leg 37 to the use position to release the lock of the tip up mechanism 5 to cause the seat cushion S1 to tilt relative to the seat back S2 as shown in FIG. 15 (G2). By returning the stand leg 37 to the retracted position, the vehicle occupant can lock the seat cushion S1 relative to the seat back S2 at any desired angular position. It is also possible for the vehicle occupant to release the lock of the reclining mechanism 3 via the handle 68 under this condition, and tilts the seat back S2 along with the seat cushion S1 forward to cause the seat S to be fixed in this forwardly tilted condition. The forwardly tilted condition of the seat S shown in FIG. 15 (G3) can also be accomplished by operating the stand leg 37 from the condition shown in FIG. 15 (F3) so as to release the lock of the tip up mechanism 5, and then tilting the seat cushion S1 forward.

(Details of the Structure Surrounding the Ottoman)

The mounting structure of the ottoman S4 is described in the following. As shown in FIGS. 2 and 11, the cushion front member 86 is made of metallic pipe with a circular cross section. The recesses 143 that extend in the fore and aft direction are formed in the bottom side of a part of the cushion front member 86 located between the left edge of the center support member 91 and the right side of the left arm 93 of the stand leg 37 and the bottom side of a part of the cushion front member 86 located between the right edge of the center support member 91 and the left side of the right arm 93 of the stand leg 37, respectively. The recess 143 may be formed by depressing the bottom surface of the cushion front member 86 by using a press, and each recess reaches the front side and the rear side of the cushion front member 86 at the front and rear ends thereof, respectively. As shown in FIGS. 11 and 17, the upper surface of the cushion front member 86 is generally provided with a cylindrical shape. Therefore, the parts of the cushion front member 86 formed with the recesses 143 are provided with a semicircular cross section with a flat bottom. The bottom surface of each recess 143 is planar.

The corresponding pillar support portion 141 is attached to each recess 143. Each pillar support portion 141 is formed by a tubular member with a rectangular cross section which is open at both ends. The upper side of a lengthwise middle part of each pillar support portion 141 is received by the corresponding recess 143. The upper surface of each pillar support portion 141 makes a surface contact with the bottom surface of the corresponding recess 143, and is welded to the cushion front member 86. The upper side of the each pillar support portion 14 is complementary in shape to the corresponding recess 143 so that a large contact area and hence a large welding area can be secured between them. In other words, the upper surface of each pillar support portion 141 and the bottom surface of the corresponding recess 143 are both planar so that a large contact area can be ensured. Because the upper part of each pillar support portion 141 is received in the corresponding recess 143, the overall height of the welded part can be reduced, and this contributes to a compact design of the seat cushion S1.

Thus, the two pillar support portions 141 extend in parallel with each other, and project both forward and rearward from the corresponding recesses 143. As shown in FIG. 17, each pillar support portion 141 extends linearly with a certain downward inclination from the front end to the rear end relative to a horizontal line in side view. Also, when the seat cushion S1 is in the seating position, the pillar support portions 141 extend substantially in parallel with the front parts of the cushion side frames 85 which are also inclined downward from the front part to the rear part thereof in side view. Also, when the seat cushion S1 is in the seating position, the pillar support portions 141 may extend substantially in parallel with the lower surface of the seat cushion pad P1 which is supported by the center support member 91 and the two cushion side frames 85, or may extend linearly so as be to progressively spaced apart from the lower surface of the seat cushion pad P1 from the front end to the rear end thereof. In either case, the front ends (rear ends) of the ottoman pillars 135 supported by the respective pillar support portions 141 are spaced apart from the lower surface of the seat cushion pad P1 so that the contact between the seat cushion pad P1 and the ottoman pillars 135 can be avoided even when the seat cushion pad P1 is caused to deflect downward under the weight of the vehicle occupant seated on the seat cushion S1, and the ride quality is prevented from being impaired.

As shown in FIGS. 11 and 16, each support 142 inserted in the corresponding pillar support portion 141 is provided with an irregular outer surface so as to fitted in the pillar support portion 141 without play. Each support 142 has a front end which is broader than the pillar support portion 141 and abuts the front end of the corresponding pillar support portion 141, and a rear end which extends rearward beyond the corresponding end of the pillar support portion 141. The rear end of each support 142 is positioned between the cushion front member 86 and the front end of the arm 93. The greater the length of each support 142 extending in the fore and aft direction is, the more the support stability for the ottoman pillar 135 increases. Therefore, the rear end of each support 142 is positioned in as a rearward position as possible without interfering with the corresponding arm 93. The rear end of each support 142 is provided with a claw 203 which engages the rear end of the corresponding pillar support portion. 141 so that the support 142 is securely fixed to the pillar support portion 141. The inner bore 204 of each support 142 that is fitted in the corresponding pillar support portion 141 is provided with a circular cross section and a linear axial line. The axial line of the inner bore 204 is coaxial with the pillar support portion 141, and the diameter of the inner bore 204 is slightly greater than the diameter of the ottoman pillar 135.

The front end of each support 142 is formed with a guide hole 205 extending perpendicularly to the inner bore 204 and having one end opening out on the outer surface of the support 142. The engagement member 147 consists of a plate member centrally provided with a through hole 207 and received in the guide hole 205. The operation member 148 extends out of the guide hole 205, and is located on the outer side of the support 142. The engagement member 147 is moveable into and out of the guide hole 205, and is prevented from completely coming off from the guide hole 205 by a stopper not shown in the drawings. A compression coil spring 209 is interposed between the engagement member 147 and the support 142 to urge the engagement member 147 in the projecting direction. As shown in FIGS. 7 and 17, the front end of the support 142 passes through a passage formed in the seat cushion pad P1 and the skin member SK, and extends further forward. The operation member 148 of the engagement member 147 is positioned on the exterior of the skin member SK or on the front end surface 125 of the seat cushion S1 so that the operation member 148 is readily accessible to the vehicle occupant.

As shown in FIG. 16, the diameter of the through hole 207 of the engagement member 147 is greater than the diameter of the inner bore 204 of the support 142. Normally, the engagement member 147 is urged by the compression coil spring 209 such that the edge of the through hole 207 presses upon the side surface of the ottoman pillar 135. When the operation member 148 of the engagement member 147 is depressed against the biasing force of the compression coil spring 209, the through hole 207 and the inner bore 204 are caused to align with each other so that the engagement member 147 is displaced away from the side surface of the ottoman pillar 135 or the ottoman pillar 135 is disengaged from the engagement member 147 so as to be freely moveable.

The engagement grooves 146 of the ottoman pillar 135 are arranged along the length of the ottoman pillar 135 at a regular interval. A lock groove 211 having a different configuration from the engagement grooves 146 is formed in a more front end side part of the ottoman pillar 135 than the engagement groove 146 located in the most front end side part, of the ottoman pillar 135. Each engagement groove 146 extends circumferentially by a prescribed length, and defines a slope 213 on each of the side walls on the base end side and the front end side. Therefore each engagement groove 146 is provided with a cross section which diverges from the bottom end to the open end. The lock groove 211 also extends circumferentially by a prescribed length, but defines an upright shoulder surface 214 on each of the side walls on the base end side and the front end side.

The inner edge of the through hole 207 of the engagement member 147 projects into a selected one of the engagement grooves 146 and the lock groove 211 depending on the insertion depth of the ottoman pillar 135 into the pillar support portion 141, and engages the engagement groove 146 or the lock groove 211 as the case may be. By virtue of the engagement of the engagement member 147 with the engagement groove 146 or the lock groove 211, the insertion depth of the ottoman pillar 135 into the pillar support portion 141 is maintained, or the position of the ottoman S4 relative to the seat cushion S1 is determined. As the side surfaces of each engagement groove 146 consist of the slopes 213, when a load exceeding a prescribed value is applied to the ottoman pillar 135 in the inserting direction or extracting direction when the engagement member 147 is engaged by one of the engagement grooves 146, the engagement member 147 slides over the corresponding slope 213, and is dislodged from the engagement groove 146 so that the ottoman pillar 135 becomes freely moveable both in the inserting direction and the extracting direction. In other words, the position of the ottoman pillar 135 can be maintained with a prescribed retaining force owing to the engagement between the engagement groove 146 and the engagement member 147.

On the other hand, as the shoulder surface 214 on each of the side walls of the lock groove 211 on the base end side and the front end side is perpendicular to the lengthwise direction of the ottoman pillar 135, even when a significant load is applied to the ottoman pillar 135 in the inserting direction or extracting direction when the engagement member 147 is engaged by the lock groove 211, the engagement member 147 is not dislodged from the lock groove 211. Thus, the ottoman pillar 135 is prevented from coming off completely from the pillar support portion 141 owing to the engagement between the engagement member 147 and the lock groove 211 which is provided in the more front side part of the ottoman pillar 135 than any of the engagement grooves 146. When the engagement member 147 is engaged by the lock groove 211, the engagement member 147 can be disengaged from the lock groove 211 by depressing the operation member 148 of the engagement member 147 against the spring force of the compression coil spring 209. Once the engagement member 147 is disengaged from the lock groove 211, the vehicle occupant can freely adjust the insertion depth of the ottoman pillar 135 or the position of the ottoman 84. Preferably, it is so arranged that the front (rear) end of the ottoman pillar 135 is located always ahead of the arm portion of the stand leg with respect to the fore and aft direction without regard to the insertion depth of the ottoman pillar 135.

As shown in FIGS. 11 and 17, when the seat cushion S1 is in the seating position, the base end of each ottoman pillar 135 is bent downward substantially at the right angle. The front side (outer peripheral side of the bent portion) of the vertically extending part of the base end of the ottoman pillar 135 is welded to the side surface of the base member 130 of the ottoman 84. In other words, the base end of the ottoman pillar 135 extends in the tangential direction of the base member 130, and is welded to the base member 130 over a certain length of the ottoman pillar 135. If desired, the base member 130 may be formed with a recess 143 in the part thereof welded to the ottoman pillar 135 so as to conform to the corresponding side part of the ottoman pillar 135. As the ottoman pillar 135 has a circular cross section, the recess 143 may be provided with a semicircular concave surface. The recess 143 may be formed for instance by depressing the base member 130 with a press.

In FIG. 17, the ottoman S4 in the retracted position is indicated by broken lines. When the ottoman S4 is in the retracted position, the ottoman pillars 135 are positioned between the cushion front member 86 and the main body of the ottoman S4 essentially consisting of the ottoman front member 132, the ottoman auxiliary members 134 and the ottoman pad P4. As shown in FIG. 17, each ottoman pillar 135 is curved so as to present a convex section facing upward, except for the base end part thereof. The curvature of each ottoman pillar 135 is so slight that the ottoman pillar 135 can pass through the linearly extending inner bore 204 of the support 142. In other words, the diameter of the inner bore 204 is greater than the diameter of the ottoman pillar 135 by such an amount that the ottoman pillar 135 can pass through the inner bore 204 in spite of the curvature of the ottoman pillar 135. The ottoman pillar 135 contacts the lower side of the inner bore 204 at the front and rear ends thereof, and contacts the upper side of the inner bore 204 at the middle part thereof. Therefore, the front end (rear end) of the ottoman pillar 135 is located below the axial line A of the inner bore 204 (pillar support portion 141). The ottoman pillar 135 displaces downward toward the rear part thereof so that the greater the rearward distance from the center support member 91 is, the greater the distance of the ottoman pillar 135 from the lower surface of the seat cushion pad P1 (supported by the cushion side frame 85 and the center support member 91) becomes. Therefore, when the seat cushion pad P1 deflects downward under the weight of the vehicle occupant seated in the seat cushion S1, the contact between the seat cushion pad P1 and the ottoman pillars 135 can be avoided, and a favorable ride quality can be achieved.

As shown in FIG. 5, the left ottoman pillar 135 extends in the fore and aft direction between the left side part of the center support member 91 and the right side part of the left arm 93, and the right ottoman pillar 135 extends in the fore and aft direction between the right side part of the center support member 91 and the left side part of the right arm 93. The length of the ottoman pillar 135 is determined such that the front end of the ottoman pillar 135 does not interfere with the cross member 94 of the stand leg 37 even when the ottoman pillar 135 is inserted most deeply in the pillar support portion 141 and the support 142. In other words, the length of each ottoman pillar 135 is determined such that the ottoman pillar 135 does not overlap with the cross member 94 of the stand leg 37 in the deepest inserted condition of the ottoman pillar 135. Therefore, the ottoman pillar 135 is arranged so as not to interfere with the stand leg 37 without regard to the state (retracted position and the use position) of the stand leg 37. When the stand leg 37 is in the retracted position, the stand leg 37 overlaps with the arms 93 over a significant length in side view so that the overall structure can be made highly compact in regard to the dimension in the thickness-wise direction of the seat cushion S1.

As shown in FIGS. 17 and 18, the base member 130 of the ottoman S4 is covered by a base member pad 138. The base member pad 138 is formed with a cutaway 215 in parts thereof corresponding to the ottoman pillars 135 for passing the base end parts of the ottoman pillars 135, and is circumferentially wrapped around the base member 130. The base member 130 includes a skin member 216 placed on the exterior and engagement portions 218 provided on either circumferential end of the skin member 216. The engagement portions 218 consist of hooks that can engage each other so that the base member pad 138 is formed into a cylindrical shape and wraps around the base member 130. The mutually engaged engagement portions 218 are located below the base member 130. Alternatively, the engagement portions 218 may be located on the side (the rear side) of the base member 130 that faces the front end surface 125 of the seat cushion S1. In other words, the two engagement portions 218 are located on the part adjoining the part of the base member 130 to which the base end part of the ottoman pillar 135 is welded to. As a result, the engagement portions 218 joining the two circumferential ends of the base member pad 138 is concealed from the view of the vehicle occupant, and the external appearance can be improved. Also, when the legs of the vehicle occupant are placed on the ottoman 84, the engagement portions 218 of the base member pad 38 are prevented from touching the legs of the vehicle occupant, and the comfort of the ottoman can be improved. Alternatively, the engagement portions 218 may consist of other engagement means such as surface fasteners and snap buttons.

If the seat S of the illustrated embodiment is a right rear seat S of an automobile, a grommet 127 is attached to a part of the skin member SK a certain distance to the left of the part of the front end surface 125 of the seat cushion S1 where the front end of the left support 142 is located. If the seat S of the illustrated embodiment is a left rear seat S of an automobile, a grommet 127 is attached to a part of the skin member SK a certain distance to the left of the part of the front end surface 125 of the seat cushion S1 where the front end of the right support 142 is located. The grommet 127 has the function to reinforce the part of the skin member SK surrounding a hole formed in the skin member SK, and is attached to the part of the skin member SK immediately surrounding the hole formed in the skin member SK. The grommet 127 centrally defines a through hole. The grommet 127 provides a hole through which the first grip member 118 forming the terminal end of the operation member extends. The grommet 127 may be made by molding plastic material. The seat cushion pad P1 is provided with a passage 220 extending linearly along a line connecting the other end of the first rail outer tube 114 engaged by the bracket 117 and the grommet 127. The passage 220 consists of a through hole extending in the fore and aft direction. The first grip member 118 extends through the passage 220 formed in the seat cushion pad P1 and the through hole of the grommet 127, and has a terminal end that extends out of the seat cushion S1.

As shown in FIG. 17, the base end of each ottoman pillar 135 curves downward, and is connected to the base member 130 so that the base member 130 is located below the front end of the support 142. As shown in FIGS. 1 and 18, each grommet 127 is located above the base member 130. Therefore, the first grip member 118 extending out of the seat cushion S1 is enabled to extend horizontally above the base member 130 covered by the base member pad 138. As a result, the first grip member 118 may be positioned on the upper surface of the ottoman S4.

Because the base member 130 serves as the rotational shaft for the ottoman S4, the base member 130 maintains the fixed position even when the ottoman S4 is rotated into the deployed position. Therefore, the first grip member 118 that is pulled out of the grommet 127 and is located above the base member 130 can extend above the ottoman S4 without regard to the deployed position of the ottoman S4.

In the seat S of the illustrated embodiment, the dimensions of the seat cushion S1 and the seat back S2, and the angular position of the seat cushion S1 relative to the seat back S2 are determined such that the front end surface 125 of the seat cushion S1 is located above the upper surface of the seat back S2 in the tip up position. Because the front end surface 125 of the seat cushion S1 is located above the upper surface of the seat back S2 in the tip up position, the grommet 127 is also located above the upper surface of the seat back S2.

The advantages of the seat S described above are discussed in the following. In the illustrated embodiment, because the first grip member 118 connected to the first rail cable 31 projects from the grommet 127 provided on the front end surface 125 of the seat cushion S1 above the base member 130 of the ottoman S4, the vehicle occupant is enabled to grip the operation member easily without being obstructed by the ottoman S4. The pulling operation of the first grip member 118 by the vehicle occupant can be performed at some distance from the ottoman S4 so that the ottoman S4 does not interfere with the operation of the first grip member 118.

The ottoman S4 is attached to the cushion front member 86 via the ottoman pillars 135 in such a manner that the ottoman side frames 131 and the ottoman pad P4 may be rotated around the base member 130. As the grommet 127 is positioned above the base member 130, the first grip member 118 may be projected above the ottoman S4 including the base member 130 thereof without any difficulty. Because the first grip member 118 can be extended above the base member 130 which serves as the center of rotation for the ottoman S4, the first grip member 118 can be extended above the base member 130 without regard to the angular position (deployed condition) of the ottoman S4.

Because the base member 130 is attached to the base ends of the ottoman pillars 135 that curve downward, the base member 130 is positioned in a downwardly offset relation to the front end surface 125 of the seat cushion S1. Therefore, the first grip member 118 can be easily positioned so as to extend above the ottoman 84, and the grommet 127 can be positioned on the front end surface 125 of the seat cushion S1 lower than otherwise possible.

When the seat of the illustrated embodiment is used as the rear right seat of an automobile, the first grip member 118 is positioned so as to be easily operated by the vehicle occupant seated in the rear left seat as well as by the vehicle occupant seated in the driver's seat or the assistant's seat. The vehicle occupant seated in the seat S of the illustrated embodiment typically gets into or off the vehicle from the right hand side door, and because the first grip member 118 is positioned on the left hand side of the vehicle occupant, the first grip member 118 does not obstruct the movement of the vehicle occupant getting into or off be vehicle in any way. Also, the first grip member 118 is prevented from being inadvertently caught by the vehicle occupant so that the inadvertent operation of the first grip member 118 may be avoided.

The ottoman pillars 135 extend out of the front end surface 125 of the seat cushion S1, and are supported by the cushion frame F1. The grommet 127 is located between one of the ottoman pillars 135 (or the pillar support portions 141) and the corresponding cushion side frame 85. Therefore, the first rail cable 31 and the first grip member 118 may be passed between the ottoman pillar 135 and the cushion side frame 85 so that the seat cushion S1 may be designed as a compact unit.

Because the first grip member 118 extends under the cushion front member 86, the load of the vehicle occupant seated on the seat S is prevented from being applied to the first grip member 118 so that any damage to the first grip member 118 may be avoided. Also, the load of the vehicle occupant does not clamp the first grip member 118 between the cushion front member 86 and the seat cushion pad P1 so that the first grip member 118 may be operated in an effortless manner at all times.

When the seat cushion S1 is in the tip up position, the grommet 127 is located above the seat back S2 so that the vehicle occupant is enabled to easily grip and operate the first grip member 118 from behind the seat S. Therefore, when the seat cushion S1 is in the tip up position, the vehicle occupant can grip the first grip member 118 from the luggage space behind the seat S, and move the seat S in the fore and aft direction.

Because the first grip member 118 is made of a flexible band member, the first grip member 118 may be extended above the ottoman S4 without being obstructed by the ottoman S4 without any difficulty. As the grip member 118 may rest upon the upper surface of the ottoman S4, the grip member 118 can be supported by the ottoman S4 is a stable manner. Even when the vehicle occupant has placed his legs on the ottoman S4, and the grip member 118 is position between the legs of the vehicle occupant and the ottoman S4, no discomfort is experienced by the vehicle occupant because the first grip member 118 consists of a flat band.

In the illustrated embodiment, because the grommet 127 is provided on the front end surface of the seat cushion S1, and the first grip member 118 is passed through the grommet 127, the first grip member 118 can bend at the edge of the through hole of the grommet 127 so that the vehicle occupant is enabled to pull the first grip member from different directions from the direction along which the grip member 118 normally extends. Therefore, the range of direction from which the first grip member 118 can be pulled is enlarged, and the convenience of the grip member 118 can be enhanced.

In the illustrated embodiment, each ottoman pillar 135 is positioned between the corresponding arm 93 and the center support member 91 with respect to the lateral direction so that the thickness (the vertical dimension) of the seat cushion S1 can be minimized, and the ottoman pillars 135 and the stand leg 37 can be arranged in a compact manner without interfering with each other.

Because each pillar support portion 141 crosses and abuts the lower side of the corresponding part of the cushion front member 86 via the recess 143 formed in the cushion front member 86, the vertical dimension (thickness) of the crossing part can be reduced. Because the upper part of the recessed part of the cushion front member 86 maintains the original circular configuration, a high stiffness is ensured for this part, and the vehicle occupant seated in the seat S is prevented from experiencing any discomfort at his legs.

Also, by forming the bottom surface of each recess 143 as a plane and the upper part of the corresponding pillar support portion 141 also as a plane in a complementary manner, the surface area of contact can be maximized, and a large surface area may be allocated for welding. Thereby, the stiffness of the welded part between each pillar support portion 141 and the cushion front member 86 can be maximized.

The base end of each ottoman pillar 135 curves downward toward the base end thereof, and is attached to the base member 130 at the front facing side of the ottoman pillar 135 so that the contact area between the base member 130 and the ottoman pillar 135 can be maximized, and the welded part may be given with a high stiffness. Because the ottoman pillars 135 do not extend above the base member 130, the legs of the vehicle occupant placed on the ottoman S4 are prevented from contacting any part of the ottoman pillars 135. Also, the vertical positioning of the base member 130 (ottoman S4) relative to the seat cushion S1 can be freely selected by changing the curving configuration of the front ends of the ottoman pillars 135 and the positions on the base member 130 to which the front ends of the ottoman pillars 135 are connected.

Because the free end of each ottoman pillar 135 is prevented from touching the lower surface of the seat cushion pad P1 of the seat cushion S1 by being curved progressively downward toward the free end (rear end) thereof. Because each pillar support portion 142 has an axial line which is parallel to the lower surface of the seat cushion pad P1 or is given with a downward tilt toward the rear end thereof relative to the lower surface of the seat cushion pad P1, the free ends of the ottoman pillars 135 supported by the respective pillar support portions 141 move away from the lower surface of the seat cushion pad P1 toward the free end parts thereof so that the contact between the seat cushion pad P1 and the ottoman pillars 135 can be avoided even when the seat cushion pad P1 has deflected downward under the weight of the vehicle occupant. Thereby, the vehicle occupant seated in the seat is prevented from experiencing any discomfort (owing to the presence of a hard object in the seat cushion S1) so that a high level of comfortability may be achieved.

In this seat S, the ottoman pillars 135 are supported by the respective pillar support portions 141 in a moveable manner in the fore and aft direction, and the operation member 148 of the engagement member 147 is positioned on the front end surface 125 of the seat cushion S1, the vehicle occupant seated in the seat S can operate the operation member 148 with ease. Thus, the positional adjustment of the ottoman S4 can be performed in an ergonomically favorable manner.

As the base member pad 138 is fitted on the base member 130, the base member 130 is enable to support the legs of the vehicle occupant in a comfortable manner. As the engagement portions 218 of the base member pad 138 are positioned under the base member 130 or on the side of the seat cushion S1, the engagement portions 218 are kept away from the legs of the vehicle occupant, and cause no discomfort. Also, the engagement portions 218 are concealed from the view of the vehicle occupant so that the external appearance of the ottoman S4 is favorably maintained.

The foregoing embodiment is only an example, and various other embodiments of the present invention are possible without departing from the spirit of the present invention. For instance, the first grip member 118 serving as the operation member may extend not only above the ottoman S4, but may also extend forward along either side of the ottoman S4. When the lateral dimension of the ottoman S4 is smaller than that of the seat cushion S1, an area that does not overlap with the ottoman S4 (in front view) is created on the left and/or right side of the front end surface 125 of the seat cushion S1. The grommet 127 may be provided in such an area. The recesses 143 were formed in the lower parts of the cushion front member 86, but, alternatively, may also be formed on the upper parts of the cushion front member 86 so that the pillar support portions 141 extend in the fore and aft direction on the upper parts of the cushion front member 86.

A modified embodiment is described in the following. Referring to FIG. 19, in this embodiment, the ottoman S4 is provided with a leg support surface 171 on the upper surface thereof in the deployed condition. This support surface 171 is covered by a skin member SK which may be made of synthetic leather or fabric similarly as in the previous embodiment. However, the front end surface 172 of the ottoman S4 is defined by plastic or other material having a higher stiffness. A large number of projections are formed on the front end surface 172 of the ottoman S4 so that the front end surface 172 provides a higher frictional coefficient with respect to the surface of the floor 4 than the support surface 171. The frictional coefficient in this case consists of dynamic frictional coefficient.

The ottoman frame F4 of this embodiment is described in the following with reference to FIG. 20. The ottoman frame F4 is formed as a rectangular frame similarly as in the previous embodiment, and further includes a pair of ottoman side frames 131. The ottoman frame F4 is provided with a greater width than the front part of the cushion frame F1. The ottoman side frames 131 are located laterally outwardly of the front parts of the respective cushion side frames 85.

A stand leg 37 is pivotally attached (at the ends thereof adjacent to the rotational center line thereof) to the cushion side frames 85 via a pair of brackets which are welded to the inwardly facing sides of the front parts of the respective cushion side frames 85. Therefore, the stand leg 37 has a narrower width than the outer lateral dimension of the front parts of the cushion side frames 85 (the distance between the outer sides of the cushion side frames 85). Therefore, as shown in FIG. 20, when the stand leg 37 is in the retracted position extending along the bottom surface of the seat cushion S1, and the ottoman 84 is in the retracted position, the stand leg 37 is arranged so as not to overlap any of the cushion side frames 85 and the ottoman side frames 131.

Because the seat S is constructed in this fashion, the advantages discussed in the following can be gained. When the dive down action of the seat S is performed from the half retracted position as discussed in conjunction with FIG. 5(E), as shown in FIG. 15(E2), the detent mechanism 165 (FIG. 13) is disengaged by the front end of the ottoman S4 coming into contact with the low level part 12 of the floor 4, and the ottoman 84 is rotated more rearwardly position (toward the retracted position) than the half retracted position. As a result, the ottoman S4 is rotated under the biasing force of the torsion coil spring 156 (FIG. 12) to the retracted position extending along the bottom surface of the seat cushion S1, and is retained in this position by the detent mechanism 165 once again.

When the seat S is put into the dive down position as shown in FIG. 21, because the seat cushion S1 is engaged by the seat base 26, the seat cushion S1 and the ottoman S4 are held in a position which is spaced from the low level part 12 of the floor 4 by a prescribed dimension (distance) C.

As discussed earlier, when the seat cushion S1 is in the seating position, the ottoman S4 can take either the half retracted position where the ottoman S4 depends from the front part of the seat cushion S1 or the retracted position where the ottoman S4 is brought closer to the bottom surface of the seat cushion S1. The ottoman S4 configured so as to be retained in either position. Therefore, when the seat S is brought to the dive down position, the ottoman S4 may be placed in the retracted position and concealed from view. Even during the normal use, as opposed to the dive down position, if the ottoman S4 is placed in the half retracted position, the vehicle occupant seated in the seat S in the seating position can readily deploy the ottoman S4 simply by reaching below the front part of the seat cushion S1 and pulling up the free end of the ottoman S4, instead of reaching the free end of the ottoman S4 in the retracted position along the bottom surface of the seat cushion S1.

As discussed above, because during the dive down action of the seat S, the ottoman S4 moves toward the retracted position that is not interfered by the floor so that if the ottoman S4 was in the half retracted position before the dive down action, the ottoman 84 can rotate to the position that does not interfere with the dive down action of the seat S. Therefore, if the ottoman S4 is in the half retracted position, changing the seat S to the dive down position is facilitated because no deliberate operation is required to change the position of the ottoman S4.

During the dive down action, the front end surface 172 of the ottoman S4 is brought into contact with the low level part 12 of the floor 4, and is rotated by the force received from the floor 4 as the seat cushion S1 is displaced in the forward and downward direction. Therefore, no extra mechanism is required for displacing the ottoman S4 so that the structure of the seat S is simplified, and the manufacturing cost of the seat S can be reduced.

Because the ottoman S4 can be rotated to the retracted position which is closer to the bottom surface of the seat cushion S1 than the half retracted position, and the retracted position is more adjacent to the bottom surface of the seat cushion S1 than the half retracted position, during the dive down action where the seat cushion S1 moves obliquely forward toward the floor 4, the rotation of the ottoman S4 from the half retracted position to the retracted position is facilitated owing to the engagement with the floor 4. Therefore, the angular position of the ottoman S4 in the half retracted position may be changed such that the ottoman S4 in the half retracted position is positioned to a vertical position or a more rearwardly tilted position, and may be kept clear from the vehicle occupant to an even further extent.

As discussed earlier, the front end surface 172 of the ottoman S4 comes into contact with the low level part 12 of the floor 4 during the dive down action. In the illustrated embodiment, the front end surface 172 of the ottoman S4 has a greater dynamic frictional coefficient than the support surface 171 with respect to the floor 4. Therefore, as the seat cushion S1 moves forward and obliquely downward, the dynamic frictional force created by the relative movement between the front end surface 172 of the ottoman S4 and the floor 4 is so great that the force applied to the ottoman S4 is adequate to rotate the ottoman S4 to the retracted position in a reliable manner.

In the illustrated embodiment, the ottoman S4 is retained at the half retracted position by the detent mechanism 165 (FIG. 13) with a retaining force which is greater than that experienced in the adjoining region. Therefore, the ottoman S4 is prevented from swinging to and fro from the vertically oriented angular position by the acceleration and/or deceleration of the vehicle or when the ottoman S4 is brought from the deployed position to the half retracted position without aiding the motion of the ottoman S4 with a hand. The ottoman S4 in the half retracted position is urged toward the retracted position by the torsion coil spring 156, but the retaining force of the detent mechanism 165 is strong enough to retain the ottoman S4 in the half retracted position.

Because the detent mechanism 165 can retain the ottoman S4 in the retracted position with an adequate retaining force to prevent the ottoman S4 from rotating downward under the own weight, it is possible to retain the ottoman S4 in the retracted position when the vehicle occupant has rotated the ottoman S4 to the retracted position, and to create a gap between the ottoman S4 and the floor 4 when the seat S is put into the dive down condition with the ottoman S4 placed in the retracted position. Also, when the vehicle occupant has put the seat S from the dive down condition back to the seating position, because the ottoman S4 can be retained in the retracted position, the vehicle occupant is prevented from being inadvertently caught by the ottoman S4.

In the illustrated embodiment, as shown in FIG. 12, the ottoman S4 is provided with the torsion coil spring 156 that urges the ottoman side frame 131 toward the retracted position, and receives the biasing force by the torsion coil spring 156 toward the retracted position over the entire range of the angular position of the ottoman S4. Therefore, during the dive down action, the ottoman S4 can rotate to the retracted position in a reliable manner. When the seat S undergoes the dive down action, the ottoman S4 is prevented from being dragged on the floor 4 by being palled by the seat cushion S1 so that the smearing of the support surface 171 of the ottoman S4 during the dive down action can be avoided. When the vehicle occupant returns the seat S from the dive down condition to the normal seating condition, because the ottoman S4 is retained in the retracted position, the vehicle occupant would not be inadvertently caught by the ottoman S4 in the leg.

In the illustrated embodiment, owing to the functions provided by the detent mechanism 165 and the torsion coil spring 156, the ottoman S4 is retained in the retracted position, and as shown in FIG. 21, in the dive down condition, a gap of a prescribed dimension C is created between the ottoman S4 in the retracted position and the floor 4. Thereby, even there are variations in the dive down condition of the seat S, the smearing of the ottoman S4 due to contact with the floor 4 during the dive down action can be avoided.

In the illustrated embodiment, as shown in FIG. 20, when the stand leg 37 is in the retracted position extending along the bottom surface of the seat cushion S1, and the ottoman S4 is also in the retracted position, the cushion side frames 85, the ottoman side frames 131 and the stand leg 37 are positioned so as not to overlap one another. Therefore, when the stand leg 37 and the ottoman S4 are retracted, the combined thickness of the seat cushion S1, the ottoman S4 and the stand leg 37 can be minimized. As a result, in the dive down condition of the seat S illustrated in FIG. 14(B3) and the tip up condition of the seat cushion S1 shown in FIG. 15(F2), the thickness of the seat S can be minimized, and the space above the seat in FIG. 14(B3) and the front and rear space of the seat S in FIG. 15(F2) can be maximized.

A modified embodiment of the ottoman S4 is described in the following. As shown in FIG. 22, a pair of projections 173 are formed on either lateral side of the support surface 171 of the ottoman S4, each projection 173 extending from the side of the rotational center line and the free end side. The central part 174 of the support surface 171 flanked by these projections 173 is covered by a skin member SK made of synthetic leather or fabric. On the other hand, each projection 173 is made of plastic and other harder material than synthetic leather and fabric, and has a smoother surface than the central part 174 of the support surface 171.

The front end surface 172 (or the free end surface) of the ottoman S4 is made of plastic and other harder material than synthetic leather and fabric similarly as in the previous embodiment. The front end surface 172 of the ottoman S4 is formed with a large number of projections so that the front end surface 172 provides a higher frictional coefficient with respect to the floor 4 than the top surfaces of the projections 173. These projections are formed on the front end surfaces of the projections 173 also so that the front end surfaces of the projections 173 also provide a higher frictional coefficient with respect to the floor 4 than the top surfaces of the projections 173.

In this embodiment, when the support surface 171 of the ottoman S4 is brought close to the floor 4, the projections 173 come into contact with the floor 4 so that the central part 174 covered by the skin member SK is prevented from contacting the floor 4. For instance, as shown in FIG. 15(E), when the dive down condition changes from the state shown in FIG. 15(E2) to the state shown in FIG. 15(E3), the front end surface 172 of the ottoman S4 contacts the low level part 12 of the floor 4 in the condition FIG. 15(E2), and as the central part 174 is brought close to the floor 4, the projections 173 then contact the floor 4, instead of the central part 174. Also, as shown in FIG. 14(C), during the action of the seat S changing from the dive down condition to the normal seating position, as the seat back S2 is raised, and the rotation of the seat cushion S1 is not restricted by the seat base 26 any more as shown in FIG. 14(C2), the support surface 171 of the ottoman S4 is brought close to the floor 4, but the projections 173 are brought into contact with the floor 4, instead of the central part 174.

Because the surfaces of the projections 173 are finished smoother than the central part 174 of the support surface 171, when the projections 173 are brought into contact with the floor 4, an excessive frictional resistance or the wear of the projections 173 can be avoided. Even when the projections 173 are smeared, it can be readily cleaned.

A modified embodiment of the seat S fitted with an ottoman S4 shown in any of the foregoing embodiments is described in the following. In the seat S of this embodiment, the angle adjustment mechanism 6 described in conjunction with FIG. 12 is not provided with a torsion coil spring 156 indicated by the imaginary lines so that the right ottoman side frame 131 is not biased toward the retracted position. In the seat S of this embodiment, as shown in FIG. 23, one of the two recesses 166 (on the right hand side in FIG. 23) of the detent mechanism 165 for retaining the ottoman S4 in the half retracted position and the retracted position which corresponds to the retracted position is formed somewhat lower than the counterpart in the previous embodiment (which is indicated by the imaginary line). In other words, in this embodiment, the retracted position of the ottoman S4 is set to a position (angular position) which is more spaced from the bottom surface of the seat cushion S1 in comparison with the retracted position of the previous embodiment.

With respect, to the seat S constructed in this manner, the action of changing the seat S from the normal use condition to the dive down condition as shown in FIG. 15(E), and the action of returning the seat S in the dive down condition to the normal use condition as shown in FIG. 14(C), with the ottoman S4 in the half retracted position in each case, are described in the following with reference to FIG. 24.

When changing the seat S from the normal use position to the dive down condition when the ottoman S4 is in the half retracted position, as shown in FIG. 24(E1), the vehicle occupant operates the handle 68 (FIG. 1) and tilts the seat back S2 forward by holding the seat back S2. As a result, as shown in FIG. 24(E2), the seat cushion S1 moves in the forward and downward direction until the front end of the ottoman S4 comes into contact with the low level part 12 of the floor 4. Then, the seat back 82 rotates forward, and the seat cushion S1 moves in the forward and downward direction so that the forward end of the ottoman S4 receives a force directed in the upward and rearward direction, thereby releasing the retaining action of the detent mechanism 165, and the ottoman S4 rotates to the retracted position. At this time, because the ottoman S4 does not receive the biasing force directed toward the retracted position, the free end of the ottoman S4 slides over the floor 4, thereby rotating the ottoman S4 toward the retracted position. When the seat S has reached the dive down condition, and the seat back S2 has been completely folded upon the seat cushion S1 as shown in FIG. 24(E3), the free end of the ottoman S4 is still in contact with the floor 4 as shown in FIG. 25, and this angular position of the ottoman S4 corresponds to the retracted position. Once this position is reached, the ottoman S4 is retained by the detent mechanism 165.

Meanwhile, when returning the seat S in the dive down condition with the ottoman S4 in the retracted position, as shown in FIG. 24(C1), the vehicle occupant operates the handle 68 and rotates the seat back S2 in the direction indicated by the arrow. Because the tip up mechanism 5 is not locked, as shown in FIG. 24(C1), the seat cushion S1 is dragged by the seat back S2 in the rearward direction, instead of being raised upright with the seat back S2. Meanwhile, the ottoman S4 is retained by the detent mechanism 165 so that the ottoman S4 is dragged over the floor 4 while maintaining the retracted position. Thereafter, the free end of the stand leg 37 is engaged by the upright wall 13 or the seat base 26, and then, as shown in FIG. 24(C3), as the vehicle occupant rotates the seat back S2 rearward, the stand leg 37 is pulled upright by being engaged by the upright wall 13 of the floor 4 or the seat base 26 so that the ottoman S4 is moved away from the floor 4, and the stand leg 37 moves to the use position.

As the vehicle occupant rotates the seat back S2 further rearward, the stand leg 37 is fitted into the support groove 35 of the stand base 34, and as shown in FIG. 24(C4), the seat back S2 is fixed to the use position, and the seat cushion S1 is fixed in the seating position in this state also, the ottoman S4 is retained in the retracted position by the retaining three of the detent mechanism 165. When the vehicle occupant pulls the ottoman S4 in the state shown in FIG. 24(C4) in the direction indicated by the arrow, the retaining force of the detent mechanism 165 is overcome, and the ottoman S4 rotates until the ottoman S4 is retained in the half retracted position where the ottoman depends from the front end of the seat cushion S1 as shown in FIG. 24(C5). When the ottoman S4 is not needed, the vehicle occupant applies a force to the ottoman S4 in the position shown in FIG. 24(C5) in the direction indicated by the arrow once again to rotate the ottoman S4 to the retracted position which is slightly spaced from the bottom surface of the seat cushion S1 as shown in FIG. 24(C6) and the ottoman S4 is retained in the retracted position by the detest mechanism 165.

In this modified embodiment, when the seat S is put to the dive down condition with the ottoman S4 in the half retracted position as described in conjunction with FIG. 24(E), the ottoman S4 is dragged along the floor 4 to the second retracted position. Therefore, the seat S may be configured to do away with the torsion coil spring 156 such that the ottoman S4 rotates to the retracted position on the bottom surface of the seat cushion S1 while kept in contact with the floor 4 as shown in FIGS. 24(E2) to 24(E3). In the seat S of this embodiment, because the support surface 171 of the ottoman S4 is dragged on the floor 4, it is preferred that the ottoman S4 is provided with the projections 173 which were discussed in the description of the preceding modified embodiment.

The foregoing embodiments were provided with the reclining mechanism 3 or the seat back angle adjustment mechanism that can retain the seat back S2 at any desired angle within a variable angular range of the seat back S2, but it is not essential for the present invention, and the seat S may be configured to be fixed in the normal use position, for instance, by fixing the seat back in the use position with a part of the vehicle body, instead of being provided with a reclining mechanism.

In the foregoing embodiments, the seat S included the engagement notches 101 and the lock member 102 forming the seat cushion angle adjustment mechanism that can retain the seat cushion S1 relative to the seat back S2 at a selected angle as shown in FIG. 10, but such a mechanism is not essential for the present invention.

In the foregoing embodiments, the ottoman S4 was rotatably attached to the seat cushion S1, but may also be attached to the seat cushion S1 via a per se known link mechanism so as to be selectively deployed. Also, for the present invention, it suffices if the ottoman S4 is moveable between the half retracted position depending from the front part of the seat cushion S1 and the deployed position, and is not necessarily required to be moveable in the rearward direction further than the half retracted position.

For instance, when interference with the front seat is not a concern, the seat S may move away from the floor or in a forward and upward direction (which is the deploying direction for the ottoman S4) during the dive down action of the seat S. Such a motion can be achieved, for instance, by using a mechanism for moving the ottoman S4 to the deployed position in synchronism with the rotation of the seat back S2 or a mechanism for moving the ottoman S4 to the deployed position in synchronism with the angular position of the seat cushion S1 relative to the seat back S2. In an alternate arrangement, the seat S is provided with an electric power unit for moving the ottoman S4 and a detector for detecting the approach or contact of the ottoman S4 to the floor 4, and the electric power unit is configured to move the ottoman S4 away from the floor 4 when the approach or contact of the ottoman S4 to the floor 4 is detected by the detector.

It may also be arranged such that when the ottoman S4 has contacted the floor 4, the ottoman S4 is rotated forward by the force of contact with the floor 4. Such an embodiment can be achieved by setting the retracted position (half retracted position) of the ottoman S4 depending from the front part of the seat cushion such that the lower part of the ottoman S4 protrudes forward with respect to the vertical line, and configuring the lower end (free end) of the ottoman S4 as defining as low friction surface having a downward slant toward the front so that the lower end of the ottoman S4 engages the floor 4 with a shallow angle.

In the foregoing embodiments, the torsion coil spring 156 applied a biasing force directed toward the retracted position without regard to the angular position of the ottoman S4, but it may be arranged such that the biasing force is applied to the ottoman S4 only when the ottoman S4 is positioned in the angular position nearer the retracted position than the half retracted position or a position near the half retracted position.

The projections 173 of the ottoman S4 in the foregoing embodiments extended from the rotational center line to the free end side, hut may also be provided only in the free end side. For instance, only a single or a pair of projections 173 may be positioned on the free end side, or a series of discrete projections 173 may be arranged on either side of the support surface 171. Alternatively, discrete projections 173 may be arranged only on the rotational center line side and the free end side. Furthermore, the front end surface 172 of the ottoman S4 may be made of felt made by a needle punch process so that a greater frictional coefficient may be presented with respect to the floor 4 than the projections 173 of the support surface 171.

The various components, and the structures, the number, the angles and the materials of the various components may be changed freely without departing from the spirit of the present invention. Also, all of the various components of the seat S in each of the foregoing embodiments may not be entirely essential to the present invention, but may be substituted and/or omitted without departing from the present invention.

How the luggage space can be configured by changing the condition and the position of the seat S is described in the following with reference to FIG. 26. In the following description, it is assumed that the seat S is used a rear seat of a small automobile.

FIG. 26(A) shows the tip up condition of the seat S where the seat cushion S1 is raised from the normal seating position to the tip up position. The seat S is placed in the rearmost position by using the slide mechanism 2. The luggage space 176 behind the seat S is partly defined by the back side of the seat back S2. Because the seat back S2 is in the use position, the luggage space 176 consists of a relatively narrow space presenting a triangular shape having a greater fore and aft dimension toward the lower part thereof in side view. On the other hand, the space (hereinafter referred to a front space 177) defined between the seat S and the front row seat consists of a relatively wide space presenting a trapezoidal shape with the rear side defined by the bottom surface of the seat cushion S1 having an increasing greater fore and aft dimension toward the upper part thereof in side view. As the low level part 12 of the floor 4 is lower than the floor surface 178 of the luggage space 176, a piece of luggage having a height too great to be accommodated in the luggage space 176 may be accommodated in the front space 177.

FIG. 26(B) shows the condition of the seat S where the seat cushion S1 is fixed in the tip up position, and the seat back S2 is fixed in the upright position. In this case also, the seat S is placed in the rearmost position by using the slide mechanism 2. In this case, the front side of the luggage space 176 is defined by the back side of the seat back S2 and extends substantially vertically so that the space extending along the base side of the seat back S2 all the way to the ceiling is available as the luggage space 176. Therefore, a number of paper boxes can be piled up in the luggage space 176, and the capacity of the luggage space 176 can be increased as compared to the case shown in FIG. 26(A). Meanwhile, the front space presents a rectangular shape with a vertical hack side extending along the bottom surface of the seat cushion S1. However, as the fore and aft dimension in the lower part of the front space 177 is not substantially different from that in FIG. 24(A), the effective luggage capacity of the front space 177 is not inferior to the case shown in FIG. 24(A) if the luggage consists of a tall and narrow piece such as a potted plant. By arranging the seat S in this manner, two spaces which are both relatively spacious and convenient can be attained in the front and rear sides of the seat S.

FIG. 26(C) shows the case where the seat S in the condition shown in FIG. 26(B) is moved to the foremost position by using the slide mechanism 2. By arranging the seat S in this manner, two spaces having relatively large heights can be obtained while increasing the fore and aft dimension of the luggage space 176.

FIG. 26(D) shows the state of the seat S in the dive down condition. In this condition, the height which the front space 177 provided in the previous cases is not available, but a large space having a large fore and aft dimension and connected to the luggage space 176 is created above the seat S. In other words, the back side of the seat back S2 defines the bottom surface of the enlarged luggage space 176.

In the states of the seat S shown in FIGS. (A) to (C), the luggage may be pressed by the support surface 171 (FIG. 22) of the ottoman S4 or with the bottom surface of the seat cushion S1 by releasing the lock of the tip up mechanism 5 (FIG. 1) via the stand leg 37 and rotating the seat cushion S1 forward, or by releasing the lock of the reclining mechanism 3 (FIG. 1) via the handle 68 (FIG. 1) and rotating the seat cushion S1, along with the seat back S2, in the forward direction.

Owing to the fact that the seat S is provided with the reclining mechanism 3 for rotatably supporting the seat back S2, and the seat back S2 may be fixed at least in a forwardly tilted, angularly adjusted position by means of the reclining mechanism 3 while the seat S is in the tip up condition where the seat cushion S1 is fixed in the tip up position, the seat cushion S1 may be angularly adjusted while the seat cushion S1 is placed in the raised position. Therefore, the luggage stowed in the front space 177 can be effectively secured in position by pushing the luggage from the rearward or obliquely rearward direction.

Likewise, owing to the fact that the seat S is provided with the tip up mechanism 5, and the seat cushion S1 can be fixed at a desired angle with respect to the seat back S2 with the tip up mechanism 5, the seat cushion S1 may be angularly adjusted while the seat cushion S1 is raised up from the seating position. In this case also, the luggage stowed in the front space 177 can be effectively secured in position by pushing the luggage from the rearward or obliquely rearward direction.

Because the reclining mechanism 3 allows the seat back S2 to be retained in the upright angular position, as shown in FIGS. 26(B) and 26(C), a convenient space for the luggage space 176 having a convenient height can be created behind the seat S by retaining the seat back S2 in the upright position by using the reclining mechanism 3 while the seat cushion S1 is kept in the tip up position. Also, the front space 177 can be used for stowing tall luggage.

In the illustrated embodiments, the ottoman S4 that can be deployed to the front of the seat cushion S1 is provided on the seat cushion S1, and the ottoman S4 can be retracted to the position extending along the bottom surface of the seat cushion S1. Therefore, in the states illustrated in FIGS. 26(A) to 26(C) and in the states where the seat cushion S1 is rotated forward from such positions, the front facing support surface 171 of the ottoman S4 in the retracted position can be used for pressing onto the luggage. Because the support surface 171 of the ottoman S4 is defined by the ottoman pad P4 having a high resiliency, the impact of the luggage that may hit the seat S owing to the vibrations caused by the motion of the vehicle can be favorably absorbed, and damage to the luggage can be avoided in an even more favorable manner than using the bottom surface of the seat cushion S1 to hold the luggage.

In some of the illustrated embodiments, as shown in FIG. 22, the two projections 173 extended along either lateral end of the support surface 171 of the ottoman S4 from the rotational center line side to the free end side. More specifically, in the states illustrated in FIGS. 26(A) to 26(C) or in the states where the seat cushion is rotated further forward, the projections 173 on either side of the support surface 171 project forward from the front surface (support surface 171) of the ottoman S4 in the retracted position. Therefore, the luggage in the front space 177 is prevented from tilting or shifting in the lateral direction also by placing the luggage between the two projections 173.

In the illustrated embodiments, as shown in FIG. 11, the pillar support portions 141 supporting the respective ottoman pillars 135 on either side of the ottoman S4 are attached to the cushion front member 86 with the axial lines of the pillar support portions 141 extending in the fore and aft direction so that the ottoman S4 is enabled to slide substantially in parallel with the bottom surface of the seat cushion S1, and can be retained at selected slide positions corresponding to the engagement grooves 146 with respect to the seat cushion S1. Therefore, in the states illustrated in FIGS. 15(F1) to 15(F3), 15(G2) and 15(G3) where the seat cushion S1 is raised from the seating position, the ottoman S4 may be moved upward or forward, and fixed in a desired position so that the ottoman S4 is enabled to hold the luggage in a position corresponding to the size of the luggage from the rear or from an oblique rear direction.

Because the seat S is provided with the slide mechanism 2, in the states shown in FIGS. 15(F1) to 15(13), 15(G2) and 15(G3) where the seat cushion S1 is raised from the seating position, also by moving the seat S to a desired fore and aft position, the luggage may be held by the bottom surface of the seat cushion S1 or the ottoman S4 in a position corresponding to the size of the luggage from the rear or from an oblique rear direction.

Modified Embodiment

As discussed in conjunction with FIG. 2, in the illustrated embodiment, the angle adjustment mechanism 6 of the ottoman S4 permits the rotation of the right ottoman side frame 131 relative to the base member 130 over the angular range between the half retracted position and the fully deployed position. However, the angle adjustment mechanism 6 may also be arranged such that the rotation of the right ottoman side frame 131 is prohibited not only in the direction toward the retracted position but also in the direction toward the fully deployed position. Alternatively, the angle adjustment mechanism 6 may be arranged such that the rotation of the right ottoman side frame 131 relative to the base member 130 is prohibited in both the directions over the entire angular range. Such an arrangement can be realized by using a per se known mechanism such as the one discussed in conjunction with the reclining mechanism 3 illustrated in FIG. 9.

By arranging the angle adjustment mechanism 6 in such a manner, the ottoman S4 can be retained at an angular position where the ottoman S4 presents an upward slope from the side of the base member 130 or from the rotational center line side to the free end side in the tip up condition where the seat cushion S1 is held at the tip up position. When the ottoman S4 is retained at such an angular position, in the case where the seat S is at the position shown in FIG. 15 (F) or FIG. 15 (G), the ottoman S4 can be fixed at the position indicated by the imaginary lines in FIG. 27 (H) or FIG. 27(I) so that cargo that is stowed in the front space 177 can be retained by the ottoman S4 from above or from rearward. If the angle adjustment mechanism 6 is arranged such that the ottoman S4 can be secured over the entire angular range, the ottoman S4 can be fixed at the position indicated by the broken lines in FIG. 27 so that the cargo that is stowed in the front space 177 can be retained by the ottoman S4 from below or from rearward.

The foregoing embodiments are merely exemplary, and the present invention can be modified in various ways without departing from the spirit of the present invention. For instance, the foregoing embodiments were directed to seats S for land vehicles, but the present invention is equally applicable to seats S for aircraft and watercraft.

The seat back angle adjustment mechanism in the foregoing embodiments was described as being a reclining mechanism 3 that can retain the seat back S2 at any desired angle that is permitted by the pitch of the external teeth 59 and the internal teeth 61 over the entire angular range of the seat back S2 as shown in FIG. 9. However, the seat back angle adjustment mechanism may consist of any other mechanism that can retain the seat back S2 at one or more angular positions including a forwardly tilted angular position of the seat back S2. In such a case, it suffices for the seat back angle adjustment mechanism to be able to retain the seat back S2 in the forwardly tilted position even if the mechanism is unable to retain the seat back S2 in the upright position.

The seat S may not be provided with an ottoman S4. Even when an ottoman is provided, the ottoman is not required to be rotatably attached to the seat cushion S1, but may also be configured to be deployed by any per se known link mechanism or slide mechanism. The support surface 171 of the ottoman S4 may not be provided with a projections 173 such as those used in the foregoing embodiment.

The projections 173 of the ottoman S4 extended from the end on the side of the rotational axis of the ottoman S4 to the free end side of the ottoman S4, but may not extend in a continuous manner, and may also consist of a plurality of discrete projections 173 arranged in a similar manner. The ottoman S4 is not required to be slidable substantially in parallel with the seat surface of the seat cushion S1.

In the foregoing embodiments, the seats S were provided with a slide mechanism 2, but it is not essential for the present invention. Furthermore, the specific structures, arrangements, numbers, angles and materials of the various components and parts can be modified freely without departing from the spirit of the present invention. All of the various components of the seats S of the embodiments described above are not entirely essential for the present invention, but can be modified, substituted or omitted without departing from the spirit of the present invention.

GLOSSARY OF TERMS

| | | | |
|---|---|---|---|
| S | seat | S1 | seat cushion |
| S2 | seat back | S3 | head rest |
| S4 | ottoman | F | seat frame |
| F1 | cushion frame | F2 | back frame |
| F3 | head rest frame | F5 | ottoman frame |
| P | pad | P1 | seat cushion pad |
| P2 | seat back pad | P3 | head rest pad |
| P4 | ottoman pad | SK | skin member |
| 2 | slide mechanism | 3 | reclining mechanism |
| 4 | floor | 5 | tip up mechanism |
| 6 | angle adjustment mechanism | 17 | rail lock member |
| 26 | seat base | 28 | link mechanism |
| 31 | first rail cable | 34 | stand base |
| 37 | stand leg | 45 | pipe frame |
| 46 | back side frame | 63 | reclining cable |
| 68 | handle | 85 | cushion side frame |
| 86 | cushion front member | 87 | cushion rear member |
| 91 | center support member | 93 | arm |

-continued

GLOSSARY OF TERMS

| | | | |
|---|---|---|---|
| 94 | cross member | 118 | first grip member |
| 125 | front end surface | 127 | grommet |
| 130 | base member | 131 | right ottoman side frame |
| 132 | ottoman front member | 134 | ottoman auxiliary member |
| 135 | ottoman pillar (connecting member) | | |
| 138 | base member pad | 141 | pillar support portion |
| 142 | support | 143 | recess |
| 146 | engagement groove | 147 | engagement member |
| 148 | operation portion | 171 | support surface |
| 172 | front end surface | 173 | projection |
| 174 | central part | 176 | luggage space |
| 177 | front space | 178 | floor surface |
| 204 | inner bore | 205 | guide hole |
| 207 | through hole | 210 | passage |
| 215 | notch | 216 | skin member |
| 218 | engagement portion | 220 | passage |
| A | axial line of inner bore (pillar support portion) | | |

The invention claimed is:

1. A vehicle seat comprising a seat back, a seat cushion and an ottoman fitted to the seat cushion, wherein the seat cushion is provided with a cushion frame including a pair of cushion side frames extending along either side of the seat cushion and pivotally attached to the seat back at base ends thereof, a cushion front member connecting front ends of the cushion side frames with each other and a cushion rear member connecting rear parts of the cushion side frames with each other; and wherein the cushion front member is provided with a pair of recesses extending in a fore and aft direction, and a pair of pillar support portions each consisting of a tubular member extending in the fore and aft direction are received in the respective recesses, the ottoman including a pair of ottoman pillars inserted into the respective pillar support portions, wherein the recesses are formed on a lower side of the cushion front member, and upper parts of the pillar support portions are received in and connected to the respective recesses, and wherein the cushion front member comprises a pipe having a circular cross section except for portions where the recesses are formed, and defines a planar surface in each recess.

2. The vehicle seat according to claim 1, wherein each recess is complementary in shape to the upper part of the corresponding pillar support portion.

3. A vehicle seat comprising a seat back, a seat cushion and an ottoman fitted to the seat cushion, wherein the seat cushion is provided with a cushion frame including a pair of cushion side frames extending along either side of the seat cushion and pivotally attached to the seat back at base ends thereof, a cushion front member connecting front ends of the cushion side frames with each other and a cushion rear member connecting rear parts of the cushion side frames with each other; and wherein the cushion front member is provided with a pair of recesses extending in a fore and aft direction, and a pair of pillar support portions each consisting of a tubular member extending in the fore and aft direction are received in the respective recesses, the ottoman including a pair of ottoman pillars inserted into the respective pillar support portions, wherein the ottoman includes a base member extending laterally, base ends of the ottoman pillars being connected to the base member in such a manner that the ottoman pillars curve downward toward front ends thereof, and connected to the base member at front sides of vertically extending sections of the base ends thereof when the seat cushion is in a seating position.

4. The vehicle seat according to claim 1, wherein the seat back and the seat cushion are attached to a floor via a slide mechanism, and the ottoman is fitted to the seat cushion so as to be selectively deployed in a forward direction from the seat cushion; and wherein the slide mechanism is provided with a lock mechanism for prohibiting a slide movement of the seat relative to the floor, and an operation member for releasing the lock mechanism by being pulled is provided with a free end projecting from a front end surface of the seat cushion to an upper or a side position of the ottoman.

5. The vehicle seat according to claim 4, wherein the ottoman includes a pair of connecting members attached to the cushion frame and a main body supported by the connecting members in a vertically rotatable manner, and the free end of the operation member is positioned in a higher position than the main body when the main body is in an upwardly rotated deployed position.

6. The vehicle seat according to claim 5, wherein the free end of the operation member is passed through a pulling opening in the front end surface of the seat cushion, and projects out of the pulling opening, the pulling opening being located higher than the main body of the ottoman.

7. The vehicle seat according to claim 6, wherein the vehicle seat is a rear seat of a motor vehicle, and the pulling opening is located on an inboard side of the front surface of the seat cushion.

8. A vehicle seat comprising a seat back, a seat cushion and an ottoman fitted to the seat cushion, wherein the seat cushion is provided with a cushion frame including a pair of cushion side frames extending along either side of the seat cushion and pivotally attached to the seat back at base ends thereof, a cushion front member connecting front ends of the cushion side frames with each other and a cushion rear member connecting rear parts of the cushion side frames with each other; and wherein the cushion front member is provided with a pair of recesses extending in a fore and aft direction, and a pair of pillar support portions each consisting of a tubular member extending in the fore and aft direction are received in the respective recesses, the ottoman including a pair of ottoman pillars inserted into the respective pillar support portions, wherein the seat back is attached to a seat base provided on the floor in a rotatable manner, and the seat cushion is attached to the seat back in a rotatable manner so that the seat cushion performs a dive down action by moving in an obliquely downward and forward direction toward the floor from a position suitable for seating in response to a forward rotating movement of the seat back; and wherein, when the seat cushion is in the position suitable for seating, the ottoman can take a first retracted position where the ottoman droops down from a front part of the seat cushion, and a deployed position where the ottoman extends forward from the front part of the seat cushion, the ottoman being enabled to take a second retracted position where the ottoman is not interfered by the floor when the seat cushion is caused to perform the dive down action from the first retracted position.

9. The vehicle seat according to claim 8, wherein the ottoman is provided on the seat cushion in a rotatable manner around a laterally extending axial line, and is configured to rotate toward the second retracted position by a force applied from the floor when the ottoman in the second retracted position abuts the floor as a result of the dive down action.

10. The vehicle seat according to claim 9, wherein the second retracted position is positioned so as to be closer to a bottom side of the seat cushion than the first retracted position.

11. The vehicle seat according to claim 10, wherein a biasing device urges the ottoman toward the second retracted position when the ottoman is beyond a prescribed angular position toward the second retracted position.

12. The vehicle seat according to claim 10, wherein the ottoman is configured to rotate to the second retracted position while sliding over the floor when the dive down action is performed with the ottoman placed in the first retracted position.

13. The vehicle seat according to claim 10, wherein a projection is formed on a free end side of a leg support surface of the ottoman.

14. The vehicle seat according to claim 1, wherein the seat cushion is attached to the seat back so as to be rotatable between a seating position and a tip up position where the seat cushion is tilted upward toward the seat back, and the vehicle seat further comprises a tip up mechanism for retaining the seat cushion at least in the tip up position and a seat back angle adjustment mechanism for selectively setting the seat back at least in a rearward inclined position suitable for seating and a forwardly inclined position.

15. The vehicle seat according to claim 14, wherein the seat back angle adjustment mechanism is configured to retain the seat back in an upright position when the seat cushion is in the tip up position.

16. The vehicle seat according to claim 14, wherein the ottoman is provided on the seat cushion so as to be deployable in a forward direction from a retracted position along a bottom surface of the seat cushion.

17. The vehicle seat according to claim 16, wherein projections are formed along either edge of a leg support surface of the ottoman from a rotational axial line side to a free end side thereof.

18. The vehicle seat according to claim 1, wherein the seat cushion is attached to the seat back so as to be rotatable between a seating position and a tip up position where the seat cushion is tilted upward toward the seat back, and the vehicle seat further comprises a tip up mechanism for retaining the seat cushion at least in the tip up position, the tip up mechanism being configured to retain the seat cushion at least in an angular position intermediate between the seating position and the tip up position.

* * * * *